(12) United States Patent
Lasker

(10) Patent No.: US 8,037,686 B2
(45) Date of Patent: Oct. 18, 2011

(54) UNCOUPLED, THERMAL-COMPRESSOR, GAS-TURBINE ENGINE

(76) Inventor: George Lasker, Claremont, CA (US)

( * ) Notice: Subject to any disclaimer, the term of this patent is extended or adjusted under 35 U.S.C. 154(b) by 1132 days.

(21) Appl. No.: 11/825,303

(22) Filed: Jul. 3, 2007

(65) Prior Publication Data

US 2011/0000182 A1   Jan. 6, 2011

Related U.S. Application Data

(63) Continuation-in-part of application No. 10/952,411, filed on Sep. 28, 2004, now abandoned, which is a continuation-in-part of application No. 10/286,227, filed on Nov. 1, 2002, now Pat. No. 6,796,123.

(51) Int. Cl.
  *F01K 13/00*   (2006.01)
(52) U.S. Cl. ............... 60/677; 415/65; 415/68; 415/77
(58) Field of Classification Search ............ 60/677–680; 415/65, 68–69, 77
  See application file for complete search history.

(56) References Cited

U.S. PATENT DOCUMENTS

| | | | |
|---|---|---|---|
| 2,127,286 A | 8/1938 | Bush | |
| 2,175,376 A | 10/1939 | Bush | |
| 2,526,409 A * | 10/1950 | Price | 416/37 |
| 2,981,066 A * | 4/1961 | Johnson | 60/728 |
| 3,717,004 A | 2/1973 | O'Neil | |
| 3,921,400 A | 11/1975 | Pitcher | |
| 3,991,586 A | 11/1976 | Acord | |
| 4,133,173 A | 1/1979 | Schadow | |
| 4,840,032 A | 6/1989 | Claudet et al. | |
| 4,984,432 A | 1/1991 | Corey | |
| 5,025,635 A | 6/1991 | Rockenfeller et al. | |
| 5,473,899 A | 12/1995 | Viteri | |
| 5,590,528 A | 1/1997 | Viteri | |
| 5,894,729 A | 4/1999 | Proeschel | |
| 6,470,679 B1 | 10/2002 | Ertle | |
| 6,796,123 B2 | 9/2004 | Lasker | |
| 7,037,430 B2 | 5/2006 | Donaldson | |

OTHER PUBLICATIONS

Aronson, R. B., "Stirling-Engine: Can Money Make It Work?", Machine Design, p. 20 Apr. 24, 1980.
Beck, D.S/Wilson, D.G., *Gas-Turbine Regenerator*, Chapman and Hall, pp. 52-55, 1996.
Bralla, J.F., *Design for Manufacturability Handbook*, McGraw Hill, pp. 2.96 and 4.185, 1999.

(Continued)

*Primary Examiner* — Hoang Nguyen
(74) *Attorney, Agent, or Firm* — Christie, Parker & Hale, LLP

(57) ABSTRACT

The invention is for a continuous-combustion, closed-cycle, gas turbine engine with a regenerator and a displacer. It has embodiments that remove heater and cooler interior volumes during gas compression, which enable it to scale well to very large sizes. Low combustion temperatures insure very low emissions. The displacer levitated by an integral gas bearing and small clearance seal and given oscillatory translational motion by electromagnetic forces operates without surface wear. The turbine blades, subjected only to warm gases, are durable and inexpensive. Thus, this engine has a very long, continuous, maintenance-free service life. This gas turbine engine also operates without back work allowing high efficiency for both low and rated output. Pressurized encapsulation permits use of low-cost ceramics for high temperature components. The invention includes a unique monolithic ceramic heater, a compact high-capacity regenerator and a constant-power gas turbine.

3 Claims, 49 Drawing Sheets

OTHER PUBLICATIONS

Glassford, A. P. M., "Adiabatic Cycle Analysis for the Valved Thermal Compressor," AIAA, J. Energy vol. 3, No. 5, Sep.-Oct. 1979, p. 306.

Hamrock, B. J., *Fundamentals of Fluid Film Lubrication*, McGraw Hill, p. 351, 1994.

Hands, B.A., *Cryogenic Engineering*, Academic Press, p. 449, 1986.

Heywood, J. B., *Internal Combustion Engine Fundamentals*, McGraw-Hill, p. 572, 1988.

Lamm, M., "The Big Engine That Couldn't," American Heritage of Invention and Technology, vol. 8, No. 3, p. 40, Winter 1993.

Shepherd, D. G., *Principales of Turbomachineruy*, Macmillan, pp. 320-323, 1954.

\* cited by examiner

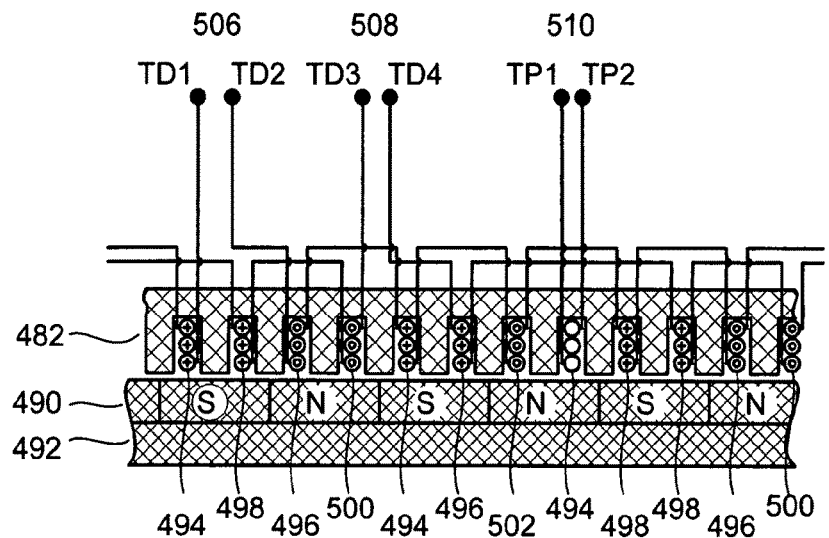
Fig. 20
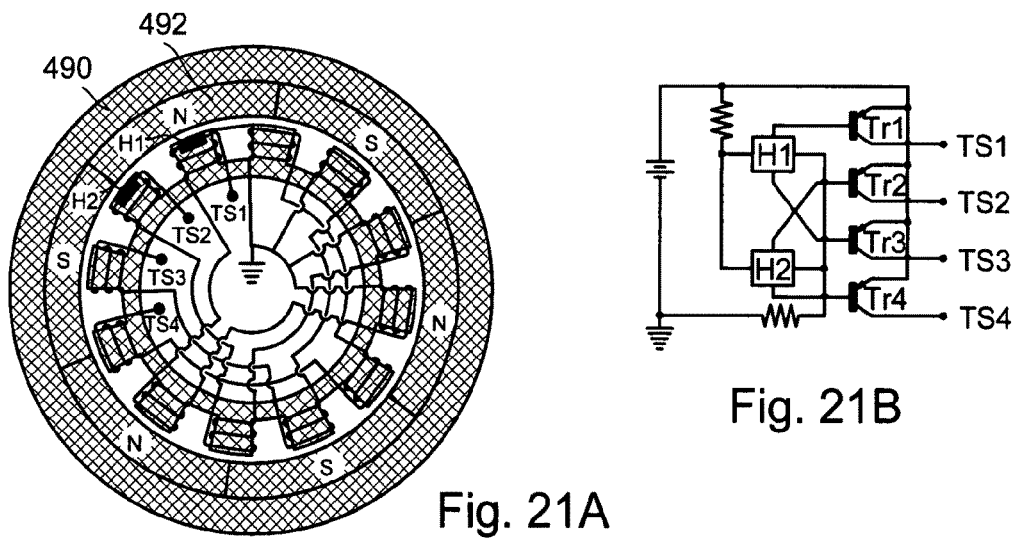
Fig. 21A
Fig. 21B
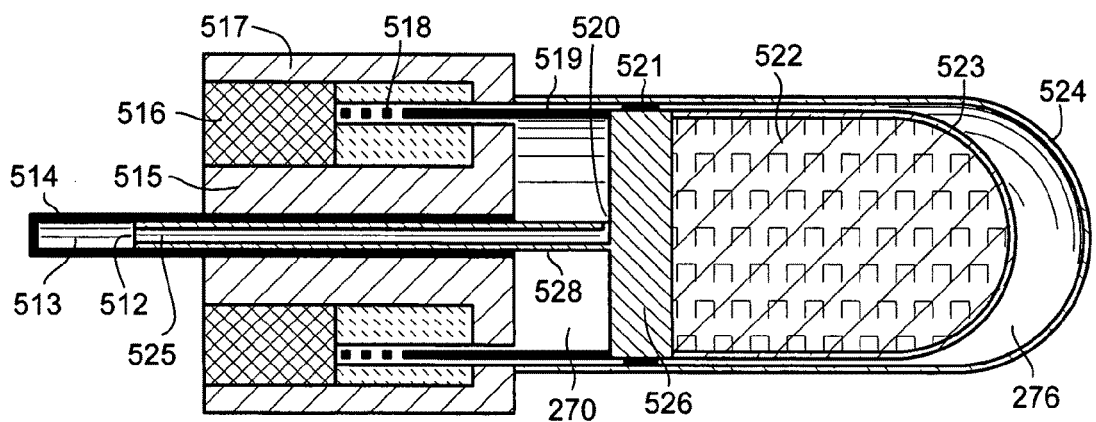
Fig. 22A

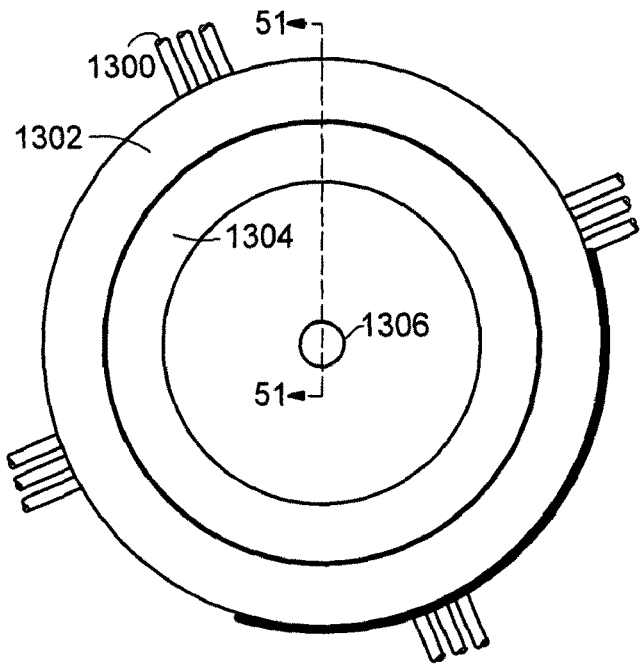
Fig. 50
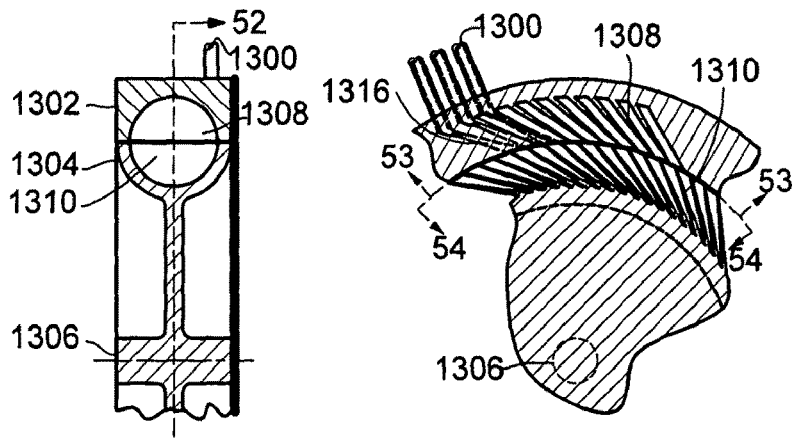
Fig. 51   Fig. 52
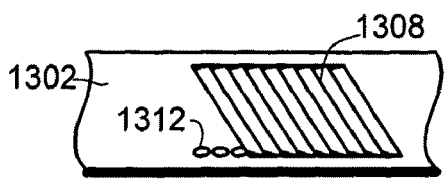 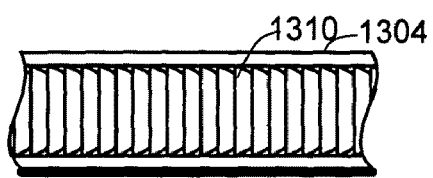
Fig. 53   Fig. 54

$$R = \left(\frac{p_A}{p_O}\right)^{\frac{\gamma-1}{\gamma}}$$

$$\eta_{CARNOT} = \eta_{ERICSSON} = \frac{T_H - T_O}{T_H}$$

$$\eta_{EC} = \frac{T_H - T_O R}{T_H}$$

$$\eta_{IC} = \frac{T_H - T_O\left(\frac{R-1}{\ln R}\right)}{T_H}$$

FOR $$\frac{p_A}{p_O} = 2, \quad \gamma = 1.4, \quad T_H = 1300°K, \quad T_O = 320°K$$

$$\eta_{CARNOT} = 75\%$$

$$\eta_{EC} = 70\%$$

$$\eta_{IC} = 72\%$$

- $p_A$ = COMPRESSOR DISCHARGE PRESSURE
- $p_O$ = COMPRESSOR INTAKE PRESSURE
- $\gamma$ = RATIO OF GAS CONSTANTS
- $\eta_{CARNOT}$ = CARNOT CYCLE EFFICIENCY
- $\eta_{ERICSSON}$ = ERICSSON CYCLE EFFICIENCY
- $\eta_{EC}$ = EXTERNAL COMBUSTION TC GAS DRIVE ENGINE CYCLE EFFICIENCY
- $\eta_{IC}$ = INTERNAL COMBUSTION TC GAS DRIVE ENGINE CYCLE EFFICIENCY
- $T_H$ = HEAT INTAKE TEMPERATURE
- $T_O$ = HEAT DISCHARGE TEMPERATURE

Fig. 64

$$\frac{\Delta P}{L} = \frac{f_o k^2}{(1-k)^3} \frac{\mu v}{d^2} + \frac{f_1 k \rho v^2}{(1-k)^3 d}$$

- $v$ = AVERAGE GAS VELOCITY THROUGH THE REGENERATOR
- $f_0$ = LAMINAR FLOW CONSTANT AND IS TYPICALLY 100
- $f_1$ = TURBULENT FLOW CONSTANT AND IS OF THE ORDER OF UNITY
- $k$ = FILLING FACTOR = SOLID VOLUME/TOTAL VOLUME
- $\mu$ = WORKING FLUID VISCOSITY
- $d = 4kV_r/S$ = EQUIVALENT DIAMETER OF MATRIX MATERIAL
- $V_r$ = TOTAL VOLUME OF REGENERATOR
- $S$ = TOTAL SURFACE AREA FOR HEAT TRANSFER
- $\rho$ = WORKING FLUID DENSITY

Fig. 65

$$\frac{d[NO]}{dt} = K(T)\sqrt{[O_2]_e}[N_2]_e$$

- $t$ = TIME IN SECOND
- $T$ = TEMPERATURE IN DEGREES KELVIN
- $[\ ]$ = SPECIES CONCENTRATIONS IN MOLES PER CUBIC CENTIMETER
- $\dfrac{d[NO]}{dt}$ = THE INITIAL $NO$ FORMATION RATE
- $[\ ]_e$ = EQUILIBRIUM CONCENTRATION FOR ONE-WAY EQUILIBRIUM RATE REACTION $$O + N_2 = NO + N$$

- $K(T)$ = FUNCTION OF $T$ ONLY AND RELATED BY $$K(T) = \frac{6 \times 10^{16}}{\sqrt{T}} \exp\left(\frac{-69,090}{T}\right)$$

- $\dfrac{K(1300)}{K(2700)} = 1.55 \times 10^{-12}$

Fig. 66

DEFINED SCALING LAW $$L_S = \alpha L_O$$

$$t_S = \alpha t_O$$

$$\rho_S = \rho_O$$

DEDUCED RELATIONSHIPS $$A_S = \alpha^2 A_O$$

$$V_S = \alpha^3 V_O$$

$$p_S = p_O$$

$$v_S = v_O$$

$$a_S = \alpha^{-1} a_O$$

$$W_S = \alpha^3 W_O$$

$$P_S = \alpha^2 P_O$$

$$SP_S = \alpha^{-1} SP_O$$

$L$ = LENGTH  
$t$ = TIME  
$S$ = SUBSCRIPT INDICATES SCALED PARAMETER  
$O$ = SUBSCRIPT INDICATES REFERENCE PARAMETER  
$\alpha$ = SCALE CONSTANT  
$V$ = VOLUME  
$A$ = AREA  
$v$ = VELOCITY  
$a$ = ACCELERATION  
$\rho$ = DENSITY  
$p$ = PRESSURE  
$P$ = POWER  
$W$ = WEIGHT  
$SP$ = SPECIFIC POWER

Fig. 67

$$\eta_{EC} = \eta_{CE}\eta_H\eta_T\eta_P\eta_D\eta_G$$

$$\eta_{IC} = \eta_{CI}\eta_A\eta_T\eta_P\eta_D\eta_G$$

FOR $\eta_{CE}$ = 0.60 – 0.74

$\eta_{CI}$ = 0.74 – 0.80

$\eta_H$ = 0.80 – 0.90

$\eta_A$ = 0.80 – 0.95

$\eta_T$ = 0.80 – 0.95

$\eta_P$ = 0.90 – 0.98

$\eta_D$ = 0.60 – 0.91

$\eta_G$ = 0.95 – 0.98

THEN $\eta_{SE}$ = 0.19 – 0.55

$\eta_{SI}$ = 0.24 – 0.63

$\eta_{SE}$ = SYSTEM EFFICIENCY EXTERNAL COMBUSTION
$\eta_{SI}$ = SYSTEM EFFICIENCY INTERNAL COMBUSTION
$\eta_{CE}$ = CYCLE EFFICIENCY EXTERNAL COMBUSTION
$\eta_{CI}$ = CYCLE EFFICIENCY INTERNAL COMBUSTION
$\eta_H$ = HEATER EFFICIENCY
$\eta_A$ = COMPRESSOR AND EXPANDER BACKWORK DEGRADATION
$\eta_T$ = THERMAL COMPRESSOR EFFICIENCY
$\eta_P$ = GAS DYNAMIC PIPE EFFICIENCY
$\eta_D$ = DRIVE OR TURBINE EFFICIENCY
$\eta_G$ = GENERATOR EFFICIENCY

Fig. 68

| EMTC COGENERATION, 20 KW, TURBO-GENERATOR SPECIFICATIONS ||
|---|---|
| ITEM | SPECIFICATION |
| GENERATOR OUTPUT | 0-20 KW, 60HZ, AC |
| TURBINE OUTPUT TO GENERATOR | DIRECT, CONSTANT SPEED |
| TURBINE RADIUS | 30 CM |
| SYSTEM PRESSURIZATION | 7.0 MPA |
| SYSTEM PRESSURE RATIO | 1.4 |
| TC TYPE | UNCOUPLED COOLER |
| TC DRIVE | LINEAR ELECTROMAGNETIC |
| DISPLACER VOLUME | 300 CM$^3$ |
| WORKING FLUID | NITROGEN |
| FUEL | NATURAL GAS |
| HEATER AIR CIRCULATION | FORCED DRAFT WITH RECUPERATOR |
| HEATER COMBUSTION STAGES | 10 |
| HEATER HEAT EXCHANGER TYPE | PRESSURIZED MONOLITHIC |
| HEATER MATERIAL | AL$_2$O$_3$ |
| COMBUSTION TEMPERATURE | 1400°K |
| WORKING FLUID HEATER TEMPERATURE | 1100°K |
| SERVICE LIFE (MTBF) | 100,000 HRS |
| SYSTEM EFFICIENCY AT RATED OUTPUT | 38% |
| SYSTEM EFFICIENCY AT 10% OF RATED OUTPUT | 35% |

Fig. 69

| COGENERATION SOLAR RECEIVER TC SYSTEM SPECIFICATIONS ||
|---|---|
| ITEM | SPECIFICATION |
| TC OUTPUT | 0-2 KW |
| PARABOLIC MIRROR PROJECTED AREA | 5 M$^2$ |
| SYSTEM PRESSURIZATION | 7.0 MPA |
| SYSTEM PRESSURE RATIO | 1.4 |
| TC TYPE | UNCOUPLED |
| TC DRIVE | LINEAR PERMANENT MAGNET |
| DISPLACER VOLUME | 300 CM$^3$ |
| WORKING FLUID | NITROGEN |
| FUEL | NATURAL GAS |
| HEATER TYPE | PRESSURIZED SOLAR RECEIVER |
| HEATER MATERIAL | AL$_2$O$_3$ |
| HEATER HOT WALL TEMPERATURE | 1600°K |
| WORKING FLUID HEATER TEMPERATURE | 1500°K |
| TC EFFICIENCY | 60% |
| SERVICE LIFE (MTBF) | 100,000 HRS |

Fig. 70

| SPACE SOLAR THERMAL POWER SYSTEM SPECIFICATIONS | |
|---|---|
| ITEM | SPECIFICATION |
| GENERATOR OUTPUT | 100 KW |
| PARABOLIC MIRROR PROJECTED AREA | 200 M$^2$ |
| SYSTEM PRESSURIZATION | 7.0 MPA |
| SYSTEM PRESSURE RATIO | 1.4 |
| TC TYPE | UNCOUPLED |
| TC DRIVE | LINEAR ELECTROMAGNETIC |
| DISPLACER VOLUME | 1600 CM$^3$ |
| WORKING FLUID | HELIUM |
| HEATER TYPE | PRESSURIZED SOLAR RECEIVER |
| HEATER MATERIAL | AL$_2$O$_3$ |
| HEATER HOT WALL TEMPERATURE | 1600°K |
| WORKING FLUID HEATER TEMPERATURE | 1500°K |
| WORKING FLUID COOLER TEMPERATURE | 600°K |
| EFFICIENCY AT RATED OUTPUT | 50% |
| SERVICE LIFE (MTBF) | 150,000 HRS |

Fig. 71

| ICTC TURBO-GENERATOR COGENERATION SYSTEM SPECIFICATIONS | |
|---|---|
| ITEM | SPECIFICATION |
| GENERATOR OUTPUT | 0 - 200 KW, 60HZ, AC |
| TURBINE OUTPUT TO GENERATOR | DIRECT, CONSTANT SPEED |
| TURBINE RADIUS | 30 CM |
| TURBINE TYPE | 4 STAGE REACTION |
| TURBINE EFFICIENCY | 78% |
| SYSTEM PRESSURIZATION | 0.1 – 3.5 MPA |
| SYSTEM PRESSURE RATIO | 1.4 |
| AIR COMPRESSOR TYPE | 3 STAGE RADIAL WITH INTERCOOLERS |
| COMPRESSOR EFFICIENCY | 73% |
| AIR EXPANDER TYPE | 3 STAGE RADIAL WITH REHEATERS |
| EXPANDER EFFICIENCY | 78% |
| TC TYPE | IC WITH UNCOUPLED COOLER |
| TC DRIVE | CENTER ROD ELECTROMAGNETIC |
| DISPLACER VOLUME | 300 CM$^3$ |
| WORKING FLUID | AIR |
| FUEL | NATURAL GAS |
| COMBUSTION TEMPERATURE | 1400°K |
| SERVICE LIFE (MTBF) | 50,000 HRS |
| EFFICIENCY AT RATED OUTPUT | 41% |
| EFFICIENCY AT 30% OF RATED OUTPUT | 45% |

Fig. 72

| CENTRAL POWER ICTC TURBO-GENERATOR SPECIFICATIONS ||
|---|---|
| ITEM | SPECIFICATION |
| GENERATOR OUTPUT | 100 MW, 60HZ, AC |
| TURBINE OUTPUT TO GENERATOR | DIRECT, CONSTANT SPEED |
| TURBINE TYPE | THREE STAGE REACTION |
| TURBINE EFFICIENCY | 91% |
| SYSTEM PRESSURIZATION | 7 MPA |
| SYSTEM PRESSURE RATIO | 2.2 |
| AIR COMPRESSOR TYPE | 24 STAGE AXIAL, 3 STAGE INTERCOOLER |
| COMPRESSOR EFFICIENCY | 89% |
| AIR EXPANDER TYPE | 20 STAGE AXIAL, 3 STAGE REHEATER |
| EXPANDER EFFICIENCY | 91% |
| TC TYPE | IC WITH UNCOUPLED COOLER |
| TC DRIVE | BALANCED-PRESSURE CRANK |
| TC MAXIMUM SPEED | 3 HZ |
| NUMBER OF TC'S | 16 |
| TC DISPLACEMENT | 850 LITERS |
| WORKING FLUID | AIR |
| FUEL | NATURAL GAS |
| COMBUSTION TEMPERATURE | 1600°K |
| SERVICE LIFE (MTBF) | 50,000 HRS |
| EFFICIENCY AT RATED OUTPUT | 61% |

Fig. 73

| AUTO, 270 KW, ICTC GAS-TURBINE ENGINE SPECIFICATIONS ||
|---|---:|
| ITEM | SPECIFICATION |
| TC OUTPUT POWER | 0-280 KW |
| TURBINE TYPE | FULL FUNCTION CONSTANT POWER |
| TURBINE LOCATION | WHEEL-MOUNTED |
| NUMBER OF TURBINES | ONE DRIVE PER WHEEL |
| TURBINE MAXIMUM EFFICIENCY | 80% |
| SYSTEM PRESSURIZATION | 3.5 MPA |
| SYSTEM PRESSURE RATIO | 2.0 |
| AIR COMPRESSOR TYPE | 3 STAGE RADIAL WITH INTERCOOLERS |
| COMPRESSOR EFFICIENCY | 73% |
| AIR EXPANDER TYPE | 3 STAGE RADIAL WITH REHEATERS |
| EXPANDER EFFICIENCY | 78% |
| TC TYPE | IC WITH UNCOUPLED COOLER |
| TC DRIVE | CENTER ROD ELECTROMAGNETIC |
| TC SPEED | 60 HZ |
| NUMBER OF TC | 4 |
| EACH DISPLACER VOLUME | 1.0 LITER |
| WORKING FLUID | AIR |
| FUEL | LIGHT DISTILLATE |
| COMBUSTION TEMPERATURE | 1500°K |
| SERVICE LIFE (MTBF) | 20,000 HRS |
| EFFICIENCY AT RATED OUTPUT | 45% |
| EFFICIENCY AT 10% OF RATED OUTPUT | 49% |

Fig. 74

| HEAVY TRUCK ICTC HELICAL-DRIVE ENGINE SPECIFICATIONS ||
|---|---|
| ITEM | SPECIFICATION |
| TC OUTPUT POWER | 0-500 KW |
| GAS DRIVE TYPE | HELICAL (LYSHOLM) |
| HELICAL DRIVE EFFICIENCY | 90% |
| HELICAL DRIVE BUILT-IN EXPANSION RATIO | 2.0 |
| TRANSMISSION SPEEDS | 3 SPEED PLUS REVERSE |
| MAXIMUM SYSTEM PRESSURIZATION | 5.0 MPA |
| SYSTEM PRESSURE RATIO | 1.8 – 3.0 |
| AIR COMPRESSOR TYPE | 3 STAGE RADIAL WITH INTERCOOLERS |
| COMPRESSOR EFFICIENCY | 80% |
| AIR EXPANDER TYPE | 3 STAGE RADIAL WITH REHEATERS |
| EXPANDER EFFICIENCY | 85% |
| TC TYPE | IC WITH UNCOUPLED COOLER |
| TC DRIVE | CENTER ROD ELECTROMAGNETIC |
| TC MAXIMUM SPEED | 20 HZ |
| NUMBER OF THERMAL COMPRESSORS | 4 |
| EACH DISPLACER VOLUME | 5.7 LITERS |
| WORKING FLUID | AIR |
| FUEL | LIGHT OR MIDDLE DISTILLATE |
| COMBUSTION TEMPERATURE | $1500°K$ |
| SERVICE LIFE (MTBF) | 50,000 HRS |
| EFFICIENCY AT RATED OUTPUT | 54% |
| EFFICIENCY AT 30% OF RATED OUTPUT | 56% |

Fig. 75

| RAILROAD ICTC TURBO-GENERATOR SPECIFICATIONS ||
|---|---|
| ITEM | SPECIFICATION |
| GENERATOR OUTPUT | 0 - 5 MW, AC |
| TURBINE OUTPUT TO GENERATOR | DIRECT |
| TURBINE TYPE | THREE STAGE REACTION |
| TURBINE EFFICIENCY | 89% |
| SYSTEM PRESSURIZATION | 0.1 – 7.0 MPA |
| SYSTEM PRESSURE RATIO | 2.2 |
| AIR COMPRESSOR TYPE | 24 STAGE AXIAL, 3 STAGE INTERCOOLER |
| COMPRESSOR EFFICIENCY | 87% |
| AIR EXPANDER TYPE | 20 STAGE REACTION, 3 STAGE REHEATER |
| EXPANDER EFFICIENCY | 89% |
| TC TYPE | IC WITH UNCOUPLED COOLER |
| TC DRIVE | BALANCED-PRESSURE CRANK |
| TC MAXIMUM SPEED | 10 HZ |
| NUMBER OF TC'S | 4 |
| TC DISPLACEMENT | 5.7 LITERS |
| WORKING FLUID | AIR |
| FUEL | MIDDLE DISTILLATES |
| COMBUSTION TEMPERATURE | 1600°K |
| SERVICE LIFE (MTBF) | 50,000 HRS |
| EFFICIENCY AT RATED OUTPUT | 56% |

Fig. 76

| 200 MW COAL TC ELECTRIC POWER SYSTEM SPECIFICATIONS ||
|---|---|
| ITEM | SPECIFICATION |
| GENERATOR OUTPUT | 0-200 MW, 60HZ, AC |
| TURBINE OUTPUT TO GENERATOR | DIRECT, CONSTANT SPEED |
| SYSTEM PRESSURIZATION | 14 MPA |
| SYSTEM PRESSURE RATIO | 1.4 |
| TC TYPE | UNCOUPLED EXTERNAL COMBUSTION |
| TC DRIVE | BALANCED-PRESSURE CRANK |
| NUMBER OF THERMAL COMPRESSORS | 20 |
| DISPLACER VOLUME PER THERMAL COMPRESSOR | 2800 LITERS |
| WORKING FLUID | HYDROGEN |
| FUEL | COAL |
| HEATER TYPE | SIMILAR TO COAL FIRED STEAM BOILER |
| COMBUSTION TEMPERATURE | 1300°C |
| WORKING FLUID HEATER TEMPERATURE | 700°C |
| HEATER SERVICE LIFE (MTBF) | 12,000 HRS |
| SYSTEM EFFICIENCY AT RATED OUTPUT | 50% |
| SYSTEM EFFICIENCY AT 10% OF RATED OUTPUT | 50% |

Fig. 77

$$p_1 = p_o \left(1 - \frac{\gamma-1}{2}\frac{V_1^2}{a_o^2}\right)^{\frac{\gamma}{\gamma-1}}$$

$$p_6 = p_o \left(1 - \frac{\gamma-1}{2}\frac{V_6^2}{a_o^2}\right)^{\frac{\gamma}{\gamma-1}}$$

$$a_o = \sqrt{\frac{\gamma p_o}{\rho_o}}$$

- $p_1$ = PRESSURE BEFORE DISCHARGE
- $p_o$ = PRESSURE AFTER DISCHARGE
- $p_6$ = PRESSURE AFTER INTAKE
- $\gamma$ = RATIO OF GAS CONSTANTS
- $V_1$ = GAS VELOCITY JUST AFTER DISCHARGE
- $V_6$ = GAS VELOCITY JUST BEFORE INTAKE
- $a_o$ = GAS SPEED OF SOUND AT PRESSURE $p_o$

Fig. 79 ness and durability of the engine. Thus, they are used on aircraft, tanks, missiles, warships, and as power generators for small to medium size power plants. However, gas turbines have several critical limitations. These include:

UNCOUPLED, THERMAL-COMPRESSOR, GAS-TURBINE ENGINE

CROSS-REFERENCE TO RELATED APPLICATION(S)

The present application is a continuation-in-part of U.S. patent application Ser. No. 10/952,411, filed Sep. 28, 2004 now abandoned, entitled UNCOUPLED, THERMAL-COMPRESSOR, GAS-TURBINE ENGINE which was a continuation-in-part application Ser. No. 10/286,227,filed Nov. 1, 2002, now of U.S. Pat. No. 6,796,123 issued on Sep. 28, 2004 entitled UNCOUPLED, THERMAL-COMPRESS, GAS-TURBINE ENGINE, the entire disclosure of which is incorporated herein by reference.

REFERENCES CITED

U.S. PATENT DOCUMENTS

| | | | |
|---|---|---|---|
| 2,127,286 | August 1938 | Bush | 62/6 |
| 2,175,376 | October 1939 | Bush et al. | 62/3.1 |
| 3,991,586 | November 1976 | Acord | 62/6 |
| 4,133,173 | August 1977 | Cataldo | 60/39.63 |
| 4,984,432 | January 1991 | Corey | 62/87 |
| 5,473,899 | December 1995 | Viteri | 60/684 |
| 5,590,528 | January 1997 | Viteri | 60/684 |
| 5,894,729 | October 1997 | Proeschel | 60/508 |

OTHER PUBLICATIONS

R. B. Aronson, "Stirling-Engine: Can Money Make It Work?" Machine Design, pp. 20, Apr. 24, 1980.

D. S. Beck and D. G. Wilson, *Gas-Turbine Regenerators*, Chapman and Hall, pp. 52-55, 1996.

J. G. Bralla, *Design for Manufacturability Handbook*, McGraw Hill, pp. 2.93 & 4.194-4.195, 1999.

A. P. M. Glassford, "Adiabatic Cycle Analysis for the Valved Thermal Compressor," American Institute of Aeronautics and Astronautics, J. Energy, Vol. 3, No. 5, September-October, 1979, p 306.

B. J. Hamrock, *Fundamentals of Fluid Film Lubrication*, McGraw Hill, pp. 362-366, 1994.

B. A. Hands, *Cryogenic Engineering*, Academic Press, pp. 449, 1986

J. B. Heywood, *Internal Combustion Engine Fundamentals*, McGraw-Hill, pp. 575, 1988.

M. Lamm, "The Big Engine That Couldn't," American Heritage of Invention and Technology, Volume 8/Number 3, pp. 40, Winter 1993.

D. G. Shepherd, *Principles of Turbomachinery*, Macmillan, pp 320-323, 1954.

BACKGROUND

This invention is for a heat engine that:
1. uses a regenerator,
2. uses a displacer,
3. uses a turbine or other gas drive,
4. uses an energy source derived from continuous combustion or solar energy,
5. uses a quasi-constant-pressure process,
6. has very-low emissions,
7. has a very-long, continuous-use service life,
8. operates with an efficiency near the Carnot cycle,
9. operates efficiently when operating at a small fraction of rated output, and
10. belongs to the family of Ericsson cycle engines.

The regenerative gas turbine belongs to the family of Ericsson cycle engines. It is the preferred small gas turbine configuration. This engine has important limitations:
1. back work (work required to drive the compressor) puts a premium on turbine and compressor component efficiency, i.e., a small drop in component efficiency results in a much larger drop in engine efficiency;
2. small engines have low operating efficiencies;
3. turbine blade life is limited by high temperature metal fatigue and creep failure, significantly adding to operating cost and lowering service life;
4. the engine operates best as a constant output engine, i.e., operating efficiency can be poor at, say, 10% of rated output and thus not useful for many applications;
5. the regenerator requires a high pressure and high temperature gas seal; however, this problem can be overcome by accepting a lower efficiency and using a recuperator in place of the regenerator; and
6. it is costly relative to some engine types.

Gas turbines such as those used on aircraft have gained wide use because they have a low specific weight and are powerful, reliable and durable. However, to achieve good efficiency they require high combustion temperature that results in considerable emissions, and use turbine blades that require costly materials and typically fail due to creep failure or fatigue failure. In addition, they have very poor efficiency when operating at a small fraction of rated power.

Steam power plants operate on the Rankine cycle. There is essentially no back work for this system; however, the efficiency of the Rankine cycle is substantially lower than the Carnot cycle and steam plants consequently are limited to efficiency near 40%. Steam power plants operate efficiently only at a constant output and require a long time to power up.

The spark ignition (SI) engine has a moderate specific weight, cost and efficiency. It has gained universal use as a light-duty automotive engine. The SI engine requires an elaborate emission control system. The SI engine's high wear rates and service requirements preclude its use for applications requiring long continuous operation. Although better than the gas turbine or steam turbine, it has poor efficiency when operating at a small fraction of rated power.

Compression ignition (diesel) engines have become the premier heavy truck and industrial engine type. They have high emissions, significant wear and require regular maintenance. This engine is not stable at very low engine speeds.

Another regenerative gas cycle engine is the Stirling cycle engine that uses a constant-volume process as opposed to constant-pressure processes. Stirling cycle engine limitations include low volumetric efficiency and high-pressure, pushrod seal wear.

Another regenerative gas cycle engine that uses constant-pressure processes is the Ericsson engine. This engine has not gained significant market acceptance except for small engines and has high wear characteristics.

U.S. Pat. Nos. 2,127,286; 2,175,376; 3,991,586; 4,133,173; 4,984,432; 5,473,899; 5,590,528 and 5,894,729 have information on several Ericsson cycle engines or related information. However, each of these references suffers from the disadvantages of gas turbines and/or diesel and/or Stirling cycle engines.

Cogeneration units that generate electricity and use rejected heat to provide space heating and to heat water have gained limited acceptance for medium-size commercial and industrial facilities. They are essentially nonexistent for home use. Cogeneration reduces energy consumption and can offer considerable economic advantages to the user. Small cogeneration units such as for a single-family house or small business have not been successful because a heat engine with the necessary requirements has not been available. Such an engine ideally should:

1. operate continuously for at least ten years without the need for servicing;
2. have very low exhaust emissions over the ten-year interval;
3. have a good efficiency at both a very low and high output;
4. have a low manufacturing cost; and
5. ideally, be compatible with solar-based energy augmentation.

Small (5 kW) solar-thermal heat engine driven electric generators have failed to enter the market because the required engine has not been available. Such an engine would be low cost, have a ten-year maintenance-free service life and have a high efficiency.

A large (100 kW) space solar thermal power system has not been used because the required engine has not been available. Such an engine would have a fifteen-year, continuous, maintenance-free service life and have a high efficiency.

Due to cost, coal is the fuel of choice for electric power generation. Coal plants almost exclusively operate on the Rankine cycle and are typically limited to 40% energy conversion efficiencies. They operate as base power plants with a constant output.

Large natural gas electric power plants operate on either (1) the Rankine cycle and are typically limited to 40% efficiencies or (2) a gas turbine cycle and are typically limited to somewhat less than 40% efficiencies or (3) a combined cycle and are typically limited to less than 50% efficiencies.

Engines used with ground transportation systems operate at high combustion temperatures; consequently, they require complex and costly emission control systems, and operate at efficiencies that are much lower than are theoretically possible.

For the foregoing reasons, there is a need for a gas-cycle heat engine with the following capabilities:

1. scales well from 1 kW to 1 GW;
2. has a very long, continuous, maintenance-free service life;
3. has very low emissions without the need for a costly emission control device;
4. operates with an efficiency near the Carnot cycle so that relatively low combustion temperature can be used;
5. has responsive controls;
6. has a version that can be used as part of a home cogeneration unit;
7. has a version that can be used as part of a low-cost, solar-thermal, power system;
8. has a version that can be used as part of a space solar thermal power system;
9. has a version that operates with coal for large power plant use;
10. has a version that can use natural gas very efficiently for large power plants; and
11. has a version that is light and compact so it can operate with ground transportation vehicles, and in addition provide high torque at low speed or ideally a constant power output.

SUMMARY

The present invention, a heat engine, satisfies the needs stated in the background. The engine uses continuous combustion, a quasi-constant-pressure process, a thermal compressor (TC) that compresses gas and a drive that transforms the energy in the compressed gas into spinning shaft power. The TC compresses gas directly with heat. Internal pressure is typically high and varied as a means of varying torque output. The TC comprises a means of bringing heat into the engine, a cooler that removes heat, and a TC displacer drive. The engine brings heat in with a heater that uses external combustion or a heater that uses continuous internal combustion or continuous combustion directly in the hot chamber of the TC.

The engine has embodiments that remove (uncouple) heater and/or cooler interior volumes during gas compression. This improves volumetric efficiency, improves fuel use efficiency and enables the engine to scale well to large sizes. The engine cycle closely approximates the efficiency of the Carnot cycle and yields a high efficiency while limiting combustion temperature. Low combustion temperatures allow the engine to operate with very low emissions.

The continuous internal combustion version, which uses air as the working fluid, requires a clean fuel such as natural gas or clean distillates in order to avoid regenerator clogging. It requires a means of compressing air to the internal operating pressure and a means of extracting energy from the products of combustion before discharging them back into the atmosphere. This version can be light, small and powerful.

A version of the engine uses an innovative electromagnetic displacer drive. The displacer is spun and levitated with an integral small clearance seal and gas bearing. A linear electromagnetic motor induces oscillatory translational motion. By inducing a gas-dynamic bounce at the end of each stroke, engine speed increases. This version operates without the need for displacer wear surfaces and is a preferred version for applications, which require a long continuous service life. Another version uses a motor powered crank and pushrod as the displacer drive. A unique method obviates the high-pressure, pushrod-seal, wear problem. Another version of displacer drive uses a slender center rod to support the displacer and a linear electromagnetic drive. Very-low push rod or center rod seal wear occurs by means that equalize the pressure across this seal.

Encapsulation of high-temperature elements in a pressurized chamber and a partial vacuum in the interior of the displacer minimizes tensile stresses in ceramic components and allows the use of low cost ceramics for high temperature components.

The engine uses an innovative staged combustion heater with very low emissions. It does not require a catalytic converter. A compact version of the heater has a monolithic ceramic structure that implements staged combustion.

The engine innovation includes a constant power gas turbine drive. In essence, this drive can vary output torque so that power output remains constant over an operating speed range.

For a small, natural gas home cogeneration system a version of the engine uses an external combustion heater, electromagnetic displacer drive, decoupled cooler, and an impulse turbine that directly drives a constant-speed, 60 Hz, AC generator (costly frequency conversion power electronics are not required). The invention includes a version for use in outer space, as a solar thermal power system that can meet the stringent long continuous, maintenance-free requirements. For an automobile, a version of the engine uses several continuous internal combustion TCs and a constant power turbine drive. For a variable-output, coal power plant a version of the engine uses an external combustion heater, which is similar to a coal boiler. It also uses multiple crank-powered TCs; decoupled heater and cooler; constant speed turbo generator;

and a pump system for varying system pressurization as a means for varying turbine torque.

BRIEF DESCRIPTION OF THE DRAWINGS

In the specification the numbers 1 to 200 were reserved for figures and numbers larger than 200 are used for figure callouts.

The description given in the Summary and other features, aspects, and advantages of the present invention will become better understood with regard to the following description, appended claims, and accompanying drawings where:

FIG. 20 shows a wiring schematic of the two-phase push-pull drive coils that induce translation for the FIG. 15 configuration.

FIG. 21A shows a partial wiring schematic of the two-phase push-pull coils that spin the displacer for the FIG. 15 configuration.

FIG. 21B shows a partial schematic that completes the FIG. 21A schematic

FIG. 22A shows a descriptive drawing of the invention with the embodiments of a displacer and closed container where the displacer drives use a magnet and sound-speaker-like linear coil drive and a center rod with balanced pressure.

FIG. 6 is a schematic, which includes this embodiment.

FIG. 50 shows a front view of a constant power turbine.

FIG. 51 shows a section view as indicated in FIG. 50.

FIG. 52 shows a section view as indicated in FIG. 51 and shows stator and turbine blade details.

FIG. 53 shows an unfolded and flattened view of the stator blades for the constant power turbine as defined in FIG. 52.

FIG. 54 shows an unfolded and flattened view of the of the turbine blades for the constant power turbine as defined in FIG. 52.

FIG. 64 gives equations and numerical values for ideal system efficiencies.

FIG. 65 gives the equation for gas-flow pressure drop in porous materials used to estimate the pressure drop in the regenerator.

FIG. 66 gives equations for the initial NO formation rate as a function of temperature and is used to show that the invention can operate efficiently without producing significant NO compounds.

FIG. 67 gives a defined scaling law and deduced relationships.

FIG. 68 gives system efficiency equations, related parameters and computed range of efficiencies.

FIG. 69 gives the specifications for a small home cogeneration unit that uses the embodiments of this invention to generate electricity and uses rejected heat to provide space heating and heat water.

FIG. 70 gives the specifications for a solar receiver TC system that uses the embodiments of this invention and can operate with the home cogeneration unit of FIG. 69.

FIG. 71 gives the specifications for a space solar thermal power system that can operate continuously and maintenance free for 17 years.

FIG. 72 gives the specifications for a cogeneration ICTC turbo generator, which uses the embodiments of this invention.

FIG. 73 gives the specifications for a base-load, central-power-plant, ICTC turbo generator, which uses the embodiments of this invention.

FIG. 74 gives the specifications for an automotive, ICTC engine, which uses the embodiments of this invention.

FIG. 75 gives the specifications for a heavy-truck, ICTC engine, which uses the embodiments of this invention.

FIG. 76 gives the specifications for a railroad, ICTC turbo generator, which uses the embodiments of this invention.

FIG. 77 gives the specifications for a TC turbo generator system that uses a helium-cooled, coal-fired heater, which uses the embodiments of this invention.

FIG. 79 gives the equation for gas jet and relates pressure to the jet velocity for an inviscid

DESCRIPTION

1. Definitions

Figure 1:
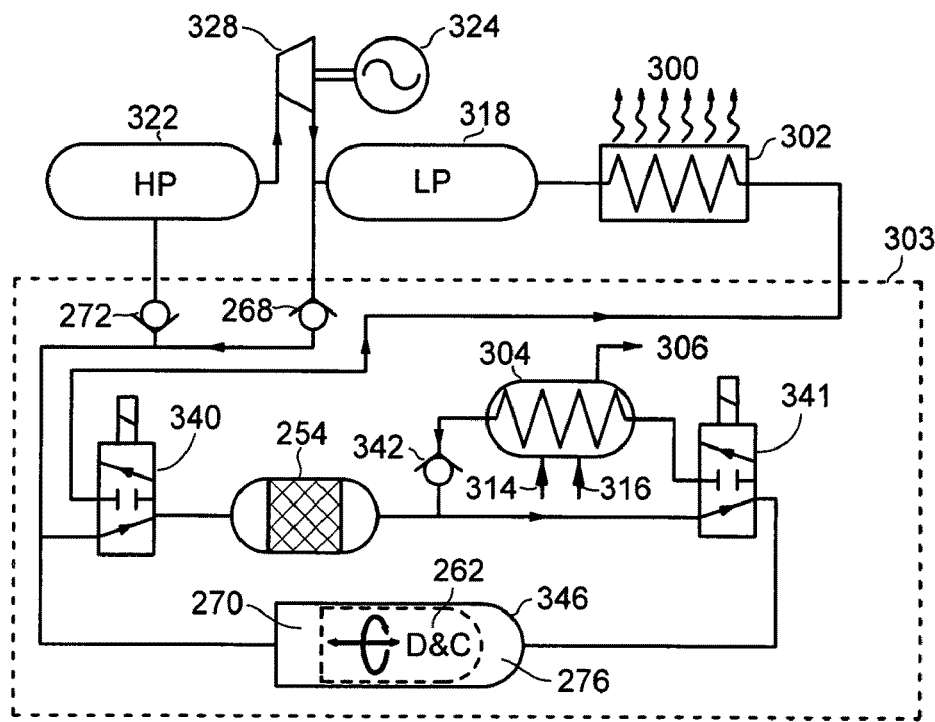
FIG. 1 is a simplified engine schematic of a thermal compressor powering a turbo-generator. It is a version of the invention with an electromagnetic thermal compressor drive and an integral small clearance seal and gas bearing. This engine also includes valves and connectors required by a decoupled heater and decoupled cooler.

Presented below are the definitions of some of the specialized terms used in this specification:

A: regenerator area (see Section 3.14)

Adjustable turbine nozzle: a set of converging-diverging turbine nozzles and a means to turn them on and off, or a device that performs the equivalent function Back iron: iron used in a magnetic circuit Bounce valve: a valve used with electromagnetic drive TCs to stop gas flow out of either the TC hot chamber or TC cold chamber in order to cause gases to compress in the chamber and induce an adiabatic gas compression bounce of the displacer C: controller $C_P$: specific heat of a gas at constant pressure Ceramic heater valve assembly: a valve assembly constructed from refractory materials that perform three valve functions and effectively cause gases to either pass through the heater or bypass the heater Closed container: a closed chamber containing a displacer which separates a cold chamber at one end with a hot chamber at the other Cold chamber: the low temperature volume formed by the displacer and closed container Constant-power turbine: an impulse turbine that uses velocity compounding to vary torque and achieve a constant power output as the speed changes (see Section 3.19)

Constant-pressure process: a heat engine cycle with pressure-volume curves which include two constant pressure lines Cooler: a device that removes heat from the engine Coupling coils: A pair of coils, one stationary and one rotating, used to energize a rotating circuit CP: constant power turbine D: displacer diameter D&C: displacer and closed container Displacer: a piston-like structure that moves in a closed container and divides it into hot and cold chambers Displacer drive coil: an electromagnetic coil mounted on the displacer and used to induce longitudinal oscillatory motion in the displacer Displacer drive: an assembly of components that perform the function of inducing oscillatory motion in the displacer Displacer exciter coil: a coil attached to the displacer that has AC current induced in it by the stationary exciter coil, the resulting current is rectified and used to power the displacer-mounted drive, spin and position coils Displacer volume: the volume defined by the displacer cross-section area times the displacer stroke length Drive coil: a coil used to induce translational motion in a displacer ECH: external combustion heater Eddy current clutch: a clutch that does not require contact and transfers torque using a coil and hysteresis loses Electromagnetic drive: a displacer drive system, which uses electromagnetic forces to induce translational and rotational motion in the displacer Engine specific weight: the engine weight divided by the rated power Exciter: a device used to induce a current in a moving circuit External combustion thermal compressor: a TC that receives heat through a heat exchanger Gas drive: compressed gas motor and gear system Gas-dynamic bounce: gas-dynamic spring effect caused by the closed container and displacer GD: gas drive or gas motor H: Hall sensor HE: heat exchanger Heat exchange module: a monolithic ceramic heat exchanger Heater: a device that transfers heat into the system Herringbone-groove journal bearing: a gas bearing with helical groves that improves gas-bearing stability High performance regenerator: a regenerator with a small volume but a large throughput and configured as a folded heat absorbing media Hot chamber: the high temperature volume formed by the displacer and closed container HPT: high-pressure tank ICH: continuous internal combustion heater ICTC: continuous internal combustion TC, combustion in the hot chamber of the TC or along the path between the hot chamber and the regenerator Continuous internal combustion thermal compressor: a TC that uses air as the working fluid and receives heat by means of combustion in the interior of the TC at a hot region L: regenerator length (see Section 3.14)

LPT: low-pressure tank

M: motor

Magnetic window: a structure with a very low magnetic permeability used to pass magnetic fields from a high-pressure zone to a low-pressure zone Monolithic ceramic heater: a complete ceramic heater fabricated by sintering a stack of ceramic plates Motion response sensor: a device, such as an accelerometer, that senses motion on a structure MTBF: mean time between failures N: magnetic North Pole O: oxygen sensor Oil-gas separator: a liquid-gas separator used to separate oil from the working fluid P: turbine power $P_O$: maximum turbine power Position sensor slit: long thin optically transparent window, part of a sequential set Position transducer: a coil used with a permanent-magnet displacer-drive-system to establish the position of the displacer Pressure-equalizing bellow: a closed bellow located in the oil-flooded crankcase of a displacer drive with the interior of the bellow containing gas with a pipe to the cold chamber of the thermal compressor Q: heat symbol Quasi-constant-pressure process: a engine cycle process that can output a constant pressure and when pressure does change it is slow when compared to the cycle time R: resultant velocity vector Radiation-cone mirror: a conical structure with a mirrored surface in the interior of the displacer used to insulate the cold end from the hot end Recuperator: a device that transfers heat across a surface Regenerator: a device that receives and returns heat across the same surface Regenerator filling factor: regenerator heat-absorbing media solid volume divided by its total volume Regenerator length: the average distance between the hot and cold surfaces of the regenerator heat-absorbing media Regenerator presented area: the area of the hot or cold surface where gas can enter the heat absorbing media Regenerator total volume: the total volume of the regenerator heat-absorbing media S: magnetic South Pole or entropy symbol Small-clearance seal: a seal established by forming a small clearance so that leakage is at an acceptable level Solar collection efficiency: the energy delivered to the turbine and hot water heat exchanger divided by the total solar energy striking the parabolic mirror Solar receiver: a heater that uses solar energy Specific weight: engine weight divided by rated power Spin coil: a TC coil, either stationary or spinning, used to induce displacer spin ST: storage tank Stationary drive coil: fixed coils that interact with coils on a displacer and induce longitudinal oscillatory motion Stationary exciter coil: fixed coils that interact with coils on the displacer and form a transformer that without contact transfers power to the moving displacer Stationary spin coils: the stationary coils of a spin motor that spin the displacer Stator blade mask: a structure that when positioned, effectively replaces turbine stator blades with a smooth surface and used to minimize the retarding force of a spinning turbine System pressurization: the low-pressure side of a TC system System support plate: the primary structure that support the thermal compressor and other system elements T: temperature sensor or turbine torque symbol $T_O$: turbine stall torque or system ambient temperature TC: thermal compressor Thermal compressor: a device that compresses gas with the direct action of heat and without mechanical work Thermal compressor (TC) displacement: the displacer-swept volume Tr: transistor Turbine, variable nozzle area: an impulse turbine that can vary the nozzle flow rate while maintaining a constant pressure drop through the nozzle U: turbine tip velocity UECTC: uncoupled, external-combustion thermal compressor Uncoupled thermal compressor: a thermal compressor that uses valves to effectively remove the interior volume of the heater and/or cooler from the thermal compressor and thus dramatically improve volumetric efficiency UTC: uncoupled thermal compressor V: gas velocity Velocity compounding: a method of using the fluid energy discharged by a turbine nozzle and consisting of multiple passes through turbine and stator blades so that each pass absorbs part of the discharged fluid energy and proportionately increases turbine torque (see Section 3.19

WT: water tank $\omega$: angular velocity $\eta$: cycle efficiency

2. Overview

The subsection numbers in Section 2 correlate to invention claim numbers, i.e., 2.1 correlates to claim 1, and so on. The material in these subsections gives an overview of the corresponding claim.

2.1 The first claim is for a heat engine with a thermal compressor (TC) that receives low-pressure gas (system pressurization) and delivers high-pressure gas to an output gas drive 2.2 The second claim is for a version of the heat engine as recited in Section 2.1 and further comprising:
 (1) continuous internal combustion in the hot chamber of the thermal compressor, and further comprising,
 (2) a thermal compressor with combustion occurring in the hot chamber or at some point in the gas dynamic circuit in or between the hot chamber and the regenerator,
 (3) means of pumping fuel into the hot chamber of the thermal compressor, and
 (4) a pushrod-driven integral compressor, expander and displacer which respectively pressurizes air up to the system operating pressure, extracts energy from the products of combustion before discharging them into the atmosphere and provide system pressurization.

2.3 This claim is for a version of the heat engine as recited in Section 2.2 with the regenerator integrated into the close container so that none of the closed container structure is subjected to both high temperatures and high tensile stresses, and also comprising a regenerator that conforms to the hot chamber of the thermal compressor.

2.4 This claim is for a version of the heat engine as recited in Section 2.3 with elements that improve volumetric efficiency by effectively removing the cooler interior volume during compression, and further comprising a thermal compressor valve set configured so that:
 (1) during the compression stroke gas follows a path from the cold chamber, then through the regenerator and then into the hot chamber, (2) during the intake stroke gas follows a path from the hot chamber and regenerator and then discharges from the thermal compressors to an external cooler, and (3) simultaneously, during the intake stroke, fresh gas directly enters the cold chamber.

2.5 This claim is for a version of the heat engine as recited in Section 2.4 with elements that significantly reduce noise, friction and wear and further comprising:

(1) a pushrod that interfaces with the crank drive by means of an integral thrust bearing and spin motor, and in so doing the integral pushrod, compressor, expander and displacer assembly can spin continuously;

(2) a noise mitigator to transform the pulsating intake and exhaust gases into a near continuous intake and exhaust flow processes by means of a cylinder divided by a spring loaded piston wherein one side is connected to the intake and compressor and the other side is connected to the exhaust and expander;

(3) a heat exchanger that transfers heat of compression in the compressor to expanding gas in the expander;

(4) an integral lubrication and heat exchanger system that pressurizes oil, sprays it in compressor and expander chambers, and separates it from air and products of combustion; and (5) an integral cooler and exhaust gas scrubber comprising a gas to atmosphere heat exchanger, a chamber with means to form a dense water aerosol and a liquid-gas separator wherein the gas entering the cooler first through the heat exchanger, then the water aerosol and finally the liquid-gas separator.

2.6 This claim is for a version of the heat engine as recited in Section 2.1 with a TC displacer and a closed container that has no contact, and therefore no wear surfaces between the displacer and the closed container. The engine includes:

1. a gas bearing that supports the displacer relative to the closed container,
2. a small clearance seal consisting of two concentric cylinders with one attached to the displacer and one attached to the closed container,
3. a spin motor that induces axial rotation and an electromagnetic linear displacer drive that induces reciprocating motion of the displacer, and
4. a means of determining the position of the displacer relative to the closed container.

This innovation is ideal for systems that operate continuously and/or do not require maintenance beyond an annual air filter change.

2.7 This claim is for a version of the heat engine as recited in Section 2.6 and further comprises at least one TC valve configured so that confined gas cause a gas dynamic displacer bounce near the end of the displacer stroke at both ends of the closed container. This innovation conserves displacer kinetic energy and increases system performance by permitting a higher displacer speed.

2.8 This claim is for a version of the heat engine as recited in Section 2.7 and further comprising a set of nested cylinders attached to the displacer and interlaced with a set of nested cylinders that attach to the cold end of the closed container. These nested cylinders form:

1. a spin motor that magnetically induces a displacer torque,
2. a linear motor that magnetically induces a longitudinal force in the displacer,
3. a magnetic transducer system from which the position of the displacer can be determined, and
4. an integral air bearing and small clearance seal.

This innovation also allows the displacer to float and not contact the closed container walls and eliminates TC surface wear.

2.9 This claim is for a version of the heat engine as recited in Section 2.7 and further comprising an optical position sensor in place of a magnetic position sensor.

2.10 This claim is for a version of the heat engine as recited in Section 2.7 and further comprising a permanent magnet attached to the displacer in place of an electromagnet.

2.11 This is a claim for a version of the heat engine as recited in Section 2.7 and further comprising an optical position sensor in place of a magnetic position sensor.

2.12 This claim is for a version of the heat engine as recited in Section 2.1 with a TC displacer drive that uses a permanent magnet and sound-speaker like coil. This is the simplest version of the engine. A lubricated center rod supports the displacer and a dry displacer seal is used.

2.13 This claim is for a version of the heat engine as recited in Section 2.12, 2.31, 2.32, 2.33, 2.34 or 2.35 and further comprising a system for varying system pressurization as a means of varying gas-drive torque.

2.14 This claim is for a version of the heat engine as recited in Section 2.13 and further comprising a decoupled cooler.

2.15 This claim is for a version of the heat engine as recited in Section 2.13 and further comprising a decoupled heater.

2.16 This claim is for a version of the heat engine as recited in Section 2.15 and further comprising a decoupled cooler. Thus, both the heater and cooler are decoupled.

2.17 This claim is for a version of the heat engine as recited in Section 2.16 and further comprising:

1. an engine structure of ceramic manufacture,
2. an engine structure resistant to thermal fatigue and thermal shock failures, and
3. a pressure chamber that pressurizes high temperature ceramic components so that tensile stresses in ceramic components are small.

2.18 This claim is for a version of the heat engine as recited in Section 2.17 and further comprising integration into a cogeneration system. This system includes a heater, turbo generator and cooler incorporated into a hot water tank. This cogeneration system is ideal for both small and large systems.

2.19 This claim is for a version of the heat engine as recited in Section 2.17 and further comprising a coal-fired heater. This heater is similar to a steam power plant boiler except that gas circulates through it instead of water and steam. Unlike a steam power plant, the output of this plant can efficiently vary from rated output to a small fraction of rated output.

2.20 This claim is for a version of the heat engine as recited in Section 2.17 and further comprising a solar receiver used as a heater. The output of this system is compressed gas that drives a turbo generator, and warm gas used to heat water and/or supply space heating.

2.21 This claim is for a version of the heat engine as recited in Section 2.17 and further comprising a reaction turbine as the gas drive. The low temperature gases allow the use of durable, low-cost, complex, multistage reaction turbines for high torque, low speed applications. The reaction turbine is very efficient and low speeds allow minimization of overall system costs.

2.22 This claim is for a version of the heat engine as recited in Section 2.17 and further comprising elements for a space solar thermal power system that can operate continuously and maintenance free for a very long period.

2.23 This claim is for a version of the heat engine as recited in Section 2.1 with a natural gas power system augmented with solar energy, used in small and medium applications, and comprises a:

1. solar receiver and TC,
2. sun tracking parabolic mirror,
3. natural gas heater and TC,
4. hot water tank and heat exchanger, and
5. turbo generator.

With a clean mirror, at least 70% of solar energy is collected and then overall efficiency is 56%. Of the collected energy, 25% is transferred to hot water and 31% is converted to electricity.

2.24 This claim is for a version of the heat engine as recited in Section 2.1 with a TC displacer seal and integral gas bearing which permits a very durable engine by eliminating displacer wear surfaces. Elements include two concentric cylinders having a small clearance, configured from a material with a small coefficient of thermal expansion and high service temperature, and attached so that pressure equalizes on both sides of each cylinder.

2.25 This claim is for a version of the heat engine as recited in Section 2.1 with a motorized, center-rod bushing, a device that induces a displacer centering force, as a means of minimizing bushing and displacer seal wear. This device uses (1) a lubricated slender center rod which supports a displacer, (2) an inner bushing that is motor driven and provides a centering force against the center rod, (3) an outer bushing that interfaces with the inner bushing, (4) a support structure for the outer bushing, (5) a motor that drives the inner busing, and (6) a means to enable the gas pressure at the base of the center rod to equalize with the pressure of the closed container cold chamber. A TC version that uses a labyrinth seal and motorized center rod overcomes the TC wear problem. This motorized bushing maintains an oil film between the bushing and center rod and maintains a centering force on the center rod. Therefore, bushing wear and labyrinth seal wear is not significant after an initial wear-in period.

2.26 This claim is for a version of the heat engine as recited in Section 2.1 with an active vibration-mitigation system used with an electromagnetic-drive thermal compressor comprising:
1. system support plate,
2. a soft shock isolation spring,
3. an active damper drive coil and structure, and
4. an active damper armature.

2.27 This claim is for a version of the heat engine as recited in Section 2.1 with a gas compressor for gas cycle engines integrated with a vibration-mitigation sub-system, electromagnetic-drive TCs, a heater and a pressurization vessel.

2.28 This claim is for a version of the heat engine as recited in Section 2.1 with a high-throughput regenerator with a heat recovery media configured as a folded plate. Advantages of this regenerator are that it operates with a low-pressure drop, efficiently recovers heat and has a small interior volume.

2.29 This claim is for a regenerator as recited in Section 2.28 and further comprising means to both recover heat from the previous cycle and receive heat transferred from a heater.

2.30 This claim is for a regenerator as recited in Section 2.29 and further comprising a oxidation catalytic coating on the heat recovery material so that the regenerator serves the additional function as an oxidation catalytic converter.

2.31 This claim is for a version of the heat engine as recited in Section 2.1 with a heater with a sequence of combustion chambers and heat exchangers, and which can be used with a gas-cycle heat engine. Combustion occurs in stages with heat extracted and fuel added after every stage. The formation of $NO_x$ compounds is minimized by limiting fuel flow rates so that peak combustion temperatures are below some desired value.

2.32 This claim is for a gas-cycle heat engine heater as recited in Section 2.31, with a ceramic heat exchanger configured as a monolithic structure and formed by sintering a stack of alternating plates consisting of ceramic cloth and ceramic tubing.

2.33 This claim is for a gas-cycle, heat-engine heater as recited in Section 2.32, with a pressurized containment structure and so configured to minimize tensile stresses on components.

2.34 This claim is for a version of the heat engine as recited in Section 2.1 with a monolithic ceramic heater formed by sintering and comprised of a front and back plate plus a three-plate repeated sequence characterized as a cloth layer, a working fluid pipe plate layer and a fuel pipe plate layer.

2.35 This claim is for a version of the heat engine as recited in Section 2.1 with a TC structure with means to protect high temperature components against thermal fatigue and thermal shock failures. It comprises a pressure chamber that contains a high-pressure gas, encapsulates the TC structural assembly, and contains insulation between the pressure chamber and structural elements. Thus, high temperature elements predominantly experience compressive stresses. This allows the use of low cost ceramics for high temperature components.

In FIG. 1 the thermal compressor consists of the elements in box 303, the high pressure tank 322, the low pressure tank 318 and the cooler 302. The elements in box 303 are preferably an integrated unit in close proximity in order to minimize heat loss and maximize volumetric efficiency, whereas the high pressure tank 322, the low pressure tank 318 and the cooler 302 can be remotely located.

Note that heat from the heater 304 is first transferred to the regenerator 254 and then transferred from the regenerator 254 to the hot chamber 276. Thus the regenerator 254 in this application acts as a device that recovers the heat from the hot chamber 276 and stores the heat from the heater 304 for use in the subsequent cycle. This is done in order to effectively remove the interior volume of the heater during the gas compression stroke and thus improve the volumetric efficiency of the system. To efficiently perform this function the heat capacity (mass times specific heat) of the regenerator 254 must be larger than that required to only recover the heat in the hot chamber 276. If the heat capacity of the regenerator 254 is somewhat smaller than the heat capacity of the gas in the hot chamber 276 then the regenerator will saturate and heat will pass through the regenerator 254. A measure of the quality of a regenerator in a given application is referred to as its average efficiency or its heat-transfer 'effectiveness' $\epsilon$. The heat-transfer effectiveness is the ratio of the heat delivered to the hot chamber 276 by the regenerator 254 to the heat delivered to the regenerator 254 in the previous cycle. Typically $\epsilon$ is between 0.95 and 1 for a regenerator used in this application. In a typical design for this application the heat capacity of the regenerator is two to four times that of the gas in the hot chamber 276. The heat capacity is selected so that overall engine efficiency is maximized.

Figure 81A:
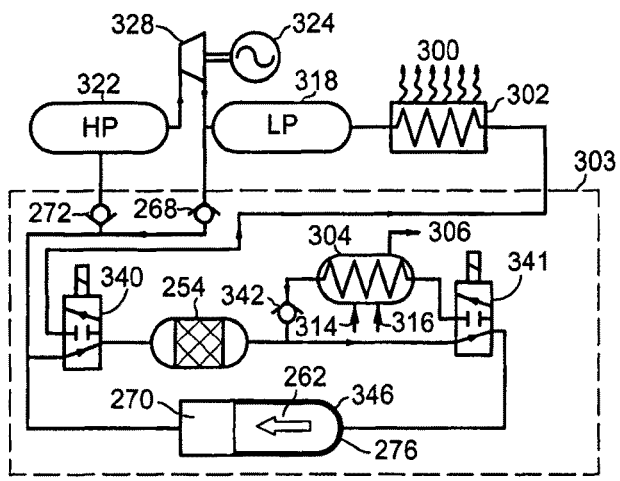
FIG. 81A is an engine schematic of the engine of FIG. 1 with the displacer 262 at the far right end with valves 340 and 341 in position as the displacer moves to the left.
Figure 81B:
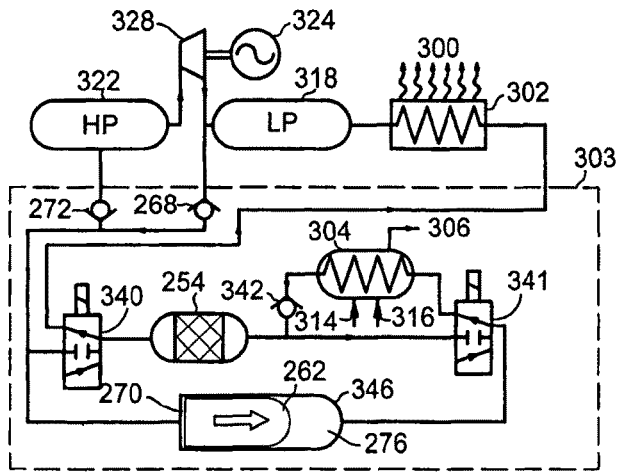
FIG. 81B is an engine schematic of the engine of FIG. 1 with the displacer at the far left end and valves 340 and 341 in position as the displacer moves to the right.
Figure 81C:
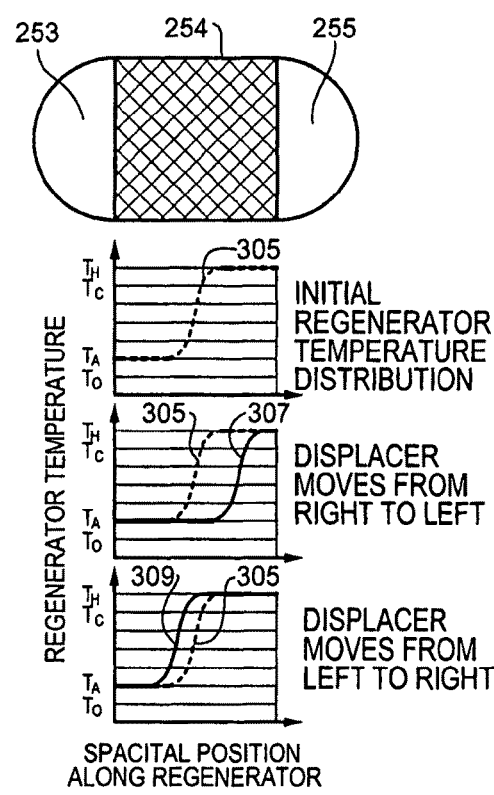
FIG. 81C is a chart showing three temperature distributions along the regenerator 254 between cold end 253 and hot end 255.

To further clarify this consider FIGS. 81A, 81B and 81C. FIG. 81A shows the FIG. 1 schematic with the displacer 262 at the far right and with the valves 340 and 341 in the position they would be as the displacer 262 moves to the left. FIG. 81B shows the FIG. 1 schematic with the displacer at the far left and with the valves 340 and 341 in the position they would be as the displacer moves to the right. FIG. 81C shows three temperature distributions (305, 307 and 309) along the regenerator 254 between the cold end 253 and the hot end 255. Implicit in these temperature distributions is that the heat capacity of the regenerator 255 is approximately four time that of the gas in the hot chamber 276 at its maximum.

When the displacer 262 moves from the far right to the far left, a portion of the gas moves from the cold chamber 270 through valve 340, regenerator 254, valve 341 and into the hot chamber 276. During this process the pressure in the circuit between the cold 270 and hot 276 chambers initially rises from that in the low pressure tank 318 to that in the high pressure tank 322, and then maintained at this pressure as part of this gas is discharged into the high pressure tank 322 through the check valve 272. The portion of the gas not discharged into the high pressure tank moves though the regenerator causing the temperature distribution to change from curve 305 to curve 307.

When the displacer moves from the far left to the far right the gas in the hot chamber 276 moves through valve 341, the heater 304, check valve 342, regenerator 254, valve 340, cooler 302 and into the low pressure tank 318. During this process the pressure in the high temperature chamber 276 drops from that in the high pressure tank 322 to the low pressure tank 318 causing the temperature in the hot chamber to drop from the heater value $T_H$ to a value $T_C$ associated with the adiabatic expansion. The heater 304 thus increases the temperature of the gas leaving the hot chamber from $T_C$ to $T_H$. As the gas moves through the regenerator 304 the temperature of the gas drops from $T_H$ to $T_A$. This causes the temperature distribution in the regenerator 254 to change from 307 to 309. As the gas passes through the cooler 302 the temperature of the gas drops from $T_A$ to $T_O$.

If the engine had no internal friction and the regenerator 254 was a perfect insulator with respect to heat conduction between the hot 255 and cold 253 ends then the temperature distribution 309 would coincide with the temperature distribution 305.

Figure 5A:
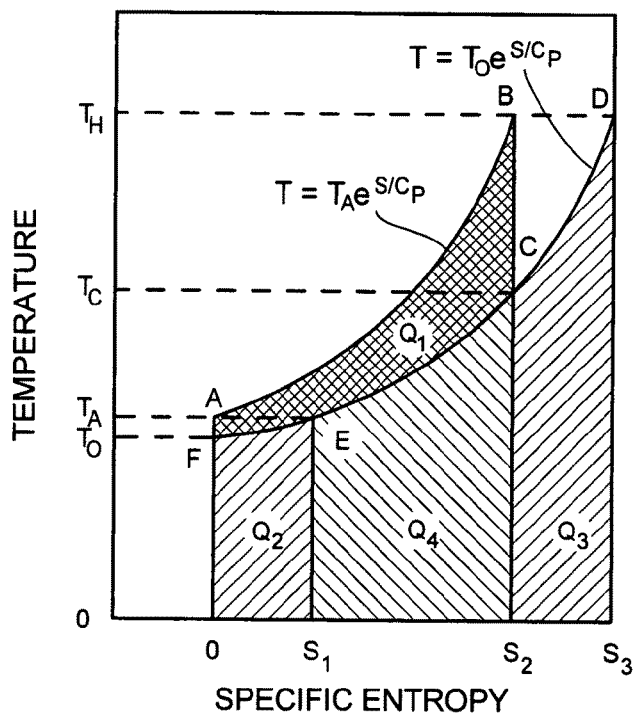
FIG. 5A shows ideal thermal-compressor, temperature-entropy curves of the present invention with the embodiments of a decoupled heater and cooler as shown in FIGS. 4A, 4B, 4C, 4D and 8.

FIG. 5A is a set of temperature-entropy curves of a gas particle for the FIGS. 1, 81A and 81B engine schematic. Point F corresponds to the state of the particle in the low pressure tank 318 and the cold chamber 270 before compression starts. As the particle is compressed in the cold chamber 270 from the pressure in the low pressure tank 318 to the pressure in the high pressure tank 322 the state of the particle moves from point F to point A. As the particle moves through the regenerator 254 from the cold side 253 to the hot side 255 the state of the particle changes from that of point A to that of point B. Point B corresponds to the state of the particle in the hot chamber 276 when the pressure in this chamber is that of the high pressure tank 322. As the pressure in the hot chamber 276 drops following an adiabatic expansion to the pressure of the low pressure tank 318, the state of the particle changes from that of point B to that of point C. As the particle moves through the heater 304, the state of the particle changes from that of point C to that of point D. As the particle moves through the regenerator from the hot side to the cold side, the state of the particle changes from that of point D to that of point E. As the particle moves through the cooler 302 the state of the particle changes from that of point E to that of point F. In FIG. 5A area $Q_3$ corresponds to the heat energy per unit mass transferred to the particle by the heater 304, area $Q_3+Q_4$ corresponds to the heat energy per unit mass transferred by the particle to the regenerator 304, area $Q_2$ corresponds to the heat energy per unit mass transferred by the particle to the cooler 302, area $Q_1$ corresponds to the work per unit mass performed by the particle to compress gas delivered to the high pressure tank 322 and area $Q_1+Q_2+Q_4$ corresponds to the heat energy per unit mass transferred by the regenerator to the particle.

The FIG. 1 schematic offers several benefits over the basic thermal compressor as put forward by Bush (U.S. Pat. Nos. 2,127,286 and 2,175,376). In essence this method effectively removes the interior volume of the heater and cooler during the compression stroke. The benefits include:

1. Improved volumetric efficiency—Increases throughput
2. Higher discharge pressure—This increases the utility of the thermal compressor and increases the operating efficiency by reducing the amount of energy stored by the regenerator.
3. Larger heater relative to the displacer swept volume can be used—This allows a high performance engine to operate at a much lower external combustion temperature so that NOx emissions can effectively be eliminated. This also can improve operating efficiency by permitting a higher internal operating temperature.
4. Larger cooler relative to the displacer swept volume can be used—This can improve operating efficiency by permitting a lower internal cold temperature.
5. Remotely located cooler can be used—Increases flexibility.

2.36 This claim is for a TC structure as recited in Section 2.35 and further comprising a structure of ceramic manufacture for high temperature elements.

2.37 This claim is for a version of the heat engine as recited in Section 2.1 with a gas-dynamic drive which maintains a near constant power output over a specified speed range. The drive comprises a turbine, a stator and a gas discharge nozzle configured to permit velocity compounding to occur. It can be designed with a stall torque more than 10 times the torque at rated power and thus act as both a turbine and transmission. It has a very high power-to-weight ratio.

2.38 This claim is for a gas-dynamic drive as recited in Section 2.37, and with more than one stator-blade set configured to nullify gas-dynamic forces, not inducing turbine drive torque.

2.39 This claim is for a gas-dynamic drive as recited in Section 2.38, and with a forward and reverse-retard capability, and further comprising an additional turbine, stator and nozzle that can induce a reverse torque.

2.40 This claim is for a gas-dynamic drive as recited in Section 2.39, and with a mask that covers the stator blades associated with the reverse-retard turbine when operating in the forward drive mode. This innovation minimizes unwanted retarding torques without the need for a clutch that disengages the reverse turbine.

2.41 This claim is for a gas-dynamic drive as recited in Section 2.40, and with a magnetic force means that transfers the torque of the turbine from a high-pressure chamber to a low-pressure chamber.

2.42 This claim is for a gas-dynamic drive as recited in Section 2.41, and with an electric clutch that transfers the torque of the turbine contained in a high-pressure chamber, to a low-pressure chamber.

2.43 This claim is for a gas-dynamic drive as recited in Section 2.42, and with:
1. a toroidal-shell pressure chamber containing the turbine,
2. the toroidal shell in contact with rotating elements when the toroid is not pressurized, and
3. a clearance gap, between the toroidal shell and interior rotating elements, when the toroid is pressurized.

This concept allows fabrication of the toroid as a fiber composite structure using the inner elements, some of which rotate, as the supporting structure used to form the toroid.

2.44 This claim is for a gas-dynamic drive as recited in Section 2.43, and with means to insure a smooth turbine torque output. The means comprising a turbine nozzle which can vary the flow rate, a pressure gauge which measures the pressure upstream of the nozzle and a nozzle controller which modulates the nozzle so that TC induced pressure fluctuations do not induce corresponding turbine-torque fluctuations. This innovation compensates for pressure fluctuations inherent in the TC output.

2.45 This claim is for a gas-dynamic drive as recited in Section 2.44 and configured for wheel mounting and further comprising a planetary reduction gear and a disk brake system. The power-to-weight ratio of this innovation can exceed 15 kW/kg. The light weight of this wheel-mounted drive insures good motor vehicle suspension-related drivability.

2.46. A gas dynamic drive with elements that can convert mechanical energy into compressed gas energy and comprising a turbine operating in reverse, a stator, a gas discharge nozzle, a gas intake nozzle, means that enable velocity compounding to occur and means to store the compressed gas.

3. Detailed Description of the Elements

The invention includes innovations at the system level and at the component level. These sections first give detailed describes of the invention at the system level and then give detailed descriptions of components.

3.1 Thermal-Compressor, Gas-Turbine Engine

Figure 2:
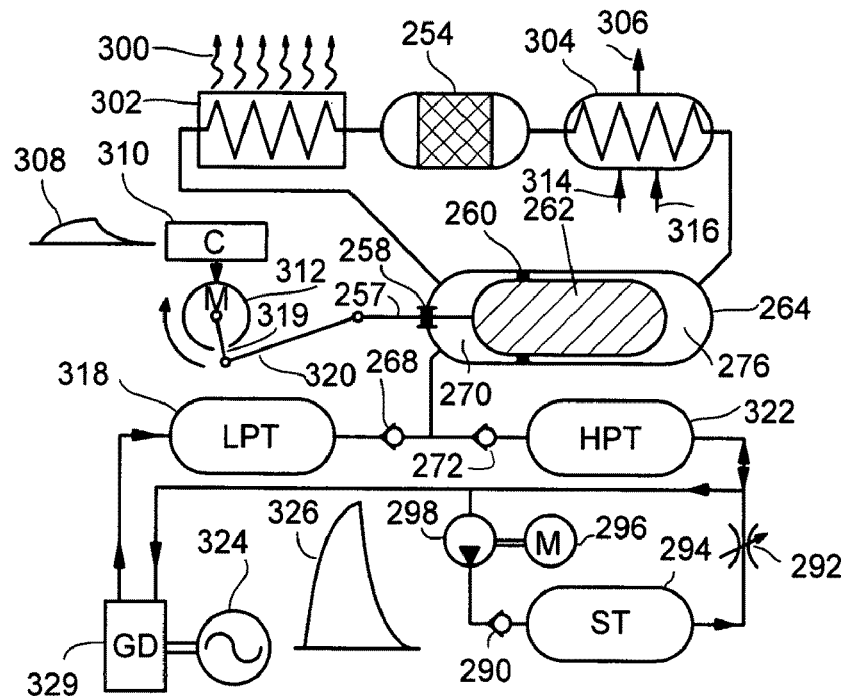
FIG. 2 is an engine schematic that shows the present invention as an amplifier that responsively transforms a low-power control signal into a high-powered output torque. The engine shown has a subsystem used to change system pressurization.

FIG. 2 shows a thermal-compressor based heat engine powering a generator. It is comprised of a cooler 302 that transfers heat from the working fluid to another media 300; a regenerator 254; a heater 304 that receives fuel 314 and air 316, and discharges the products of combustion 306; a closed container 264; displacer 262; displacer seal 260; a pushrod 257; a pushrod seal 258; a connecting rod 320; a crank 319; a drive motor 312; a controller 310; a low pressure tank 318; an intake check valve 268; a discharge check valve 272, a high-pressure tank 322; a gas drive 329; a generator 324; a depressurization pump 298, motor 296, check valve 290 and storage tank 294 all used to reduce system pressurization; and variable-flow-rate, pressurization valve 292 which is used to increase system pressurization. Start with the displacer at the far right so that the hot chamber is essentially empty and the cold chamber is full. As the displacer moves to the left, gas is driven through the cooler, regenerator and heater causing the average temperature of the gas to go up and consequently the pressure to go up. At some operating pressure, some gas starts to discharge through the exhaust check valve. Gas continues to discharge until the displacer reaches the far left position. As the displacer moves to the right, the average temperature starts dropping with a corresponding drop in pressure. When the pressure drops below the intake pressure new low-pressure gas enters the cold chamber replacing the gas discharged at high-pressure. Varying system pressurization varies turbine torque. The engine controller 310 receives a command 308 and the engine induces a generator output response 326. The thermal compressor pressurizes the high-pressure tank that in turn drives the turbine. The displacer drive motor is responsive to the controller and, therefore, the heat engine is responsive. Increasing the size of the high-pressure tank decreases the pressure fluctuations at the turbine; however, in this case system responsiveness also decreases.

Closed cycle systems use ambient pressures as high as 200 atmospheres. Using engine system pressurization as a design variable as pressure goes up, specific volume improves at first and then peaks. This is due to a need for an ever-larger heater, cooler and regenerator that reduces volumetric efficiency. Poor volumetric efficiency limits the utility of this engine to small engine sizes. In addition, pressures of 200 atmospheres cause very difficult problems with the pushrod seal wear, making them impractical for many applications.

3.2 Uncoupled, External-Combustion, TC, Gas-Turbine Engine

Figure 3:
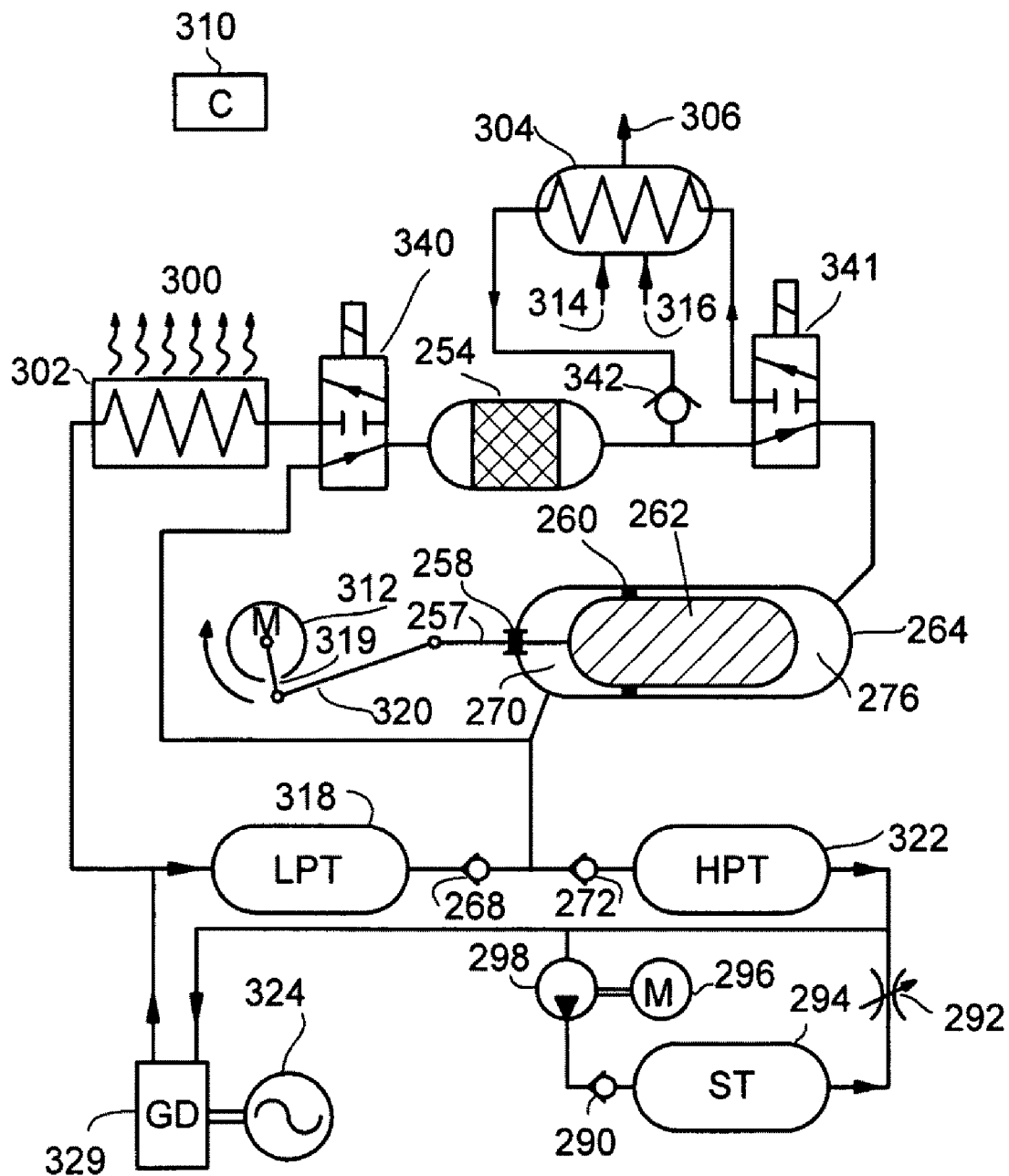
FIG. 3 is an engine schematic of the present invention and differs from FIG. 2 by including the embodiments that decouple a heater and cooler.

The engine schematic in FIG. 3 resolves the problem of poor volumetric efficiency associated with the schematic of FIG. 2. The addition of the three-valve set 340, 341 and 342 accomplished this by effectively removing the heater and cooler interior volumes. In this schematic, the valves are in the position for the compression stroke that corresponds to the displacer moving to the left. Both the cooler and the heater are not in the gas dynamic circuit. When the displacer starts moving to the right, valves 340 and 341 change position. In this changed position, gas exiting the displacer hot chamber 276 sequentially goes through the heater valve 341, heater 304, heater check valve 342, regenerator 254, cooler valve 340, cooler 302, and low-pressure tank 318. This process in essence transfers heat from the heater to the regenerator for use in the next compression stroke.

3.3 Uncoupled, ECTC with Electromagnetic Displacer Drive Gas-Turbine Engine

The engine defined by the FIG. 1 schematic obviates the high-pressure, pushrod-seal wear problem by eliminating the need for the seal. The use of an electromagnetic displacer drive does not require a pushrod seal. This engine obviates the adverse effect on volumetric efficiency due to heater and cooler interior volumes with a valve set that effectively removes these volumes during the compression stroke. The valve operation is the same as that for FIG. 3 described above. The heat engine in FIG. 1 comprises a turbine 328; a generator 324; a high-pressure tank 322; a low-pressure tank 318; a cooler 302 that transfers heat to a cooling media 300; a discharge check valve 272; an intake check valve 268; a heater 304 which receives fuel 314 and air 316, and exhausts products of combustion 306; a three-port, two-position solenoid valve 341 and a check valve 342 that operate to divert gases from the hot chamber 276 through the heater 304 and then through the regenerator 254 during the intake stroke and then operate to cause gases to flow directly from the regenerator into the hot chamber during the compression stroke; a three-port, two-position solenoid valve 340 that operates to divert gases directly to the cooler during the intake stroke and bypass the cooler during the compression stroke; and an integrated closed-container 346 and displacer 262. The displacer 262 spins about its axis, levitated by a gas bearing and given longitudinal motion by electromagnetic drive coils. A detailed description of the closed container, displacer and displacer drive is in Sections 3.10 and 3.11. Here we only note that two types of electromagnetic drive systems are used, e.g., a low-performance, low-cost, permanent-magnet drive and high-performance, electromagnetic drive. There are no dynamic contacting surfaces for either one of these systems.

Figure 4A:
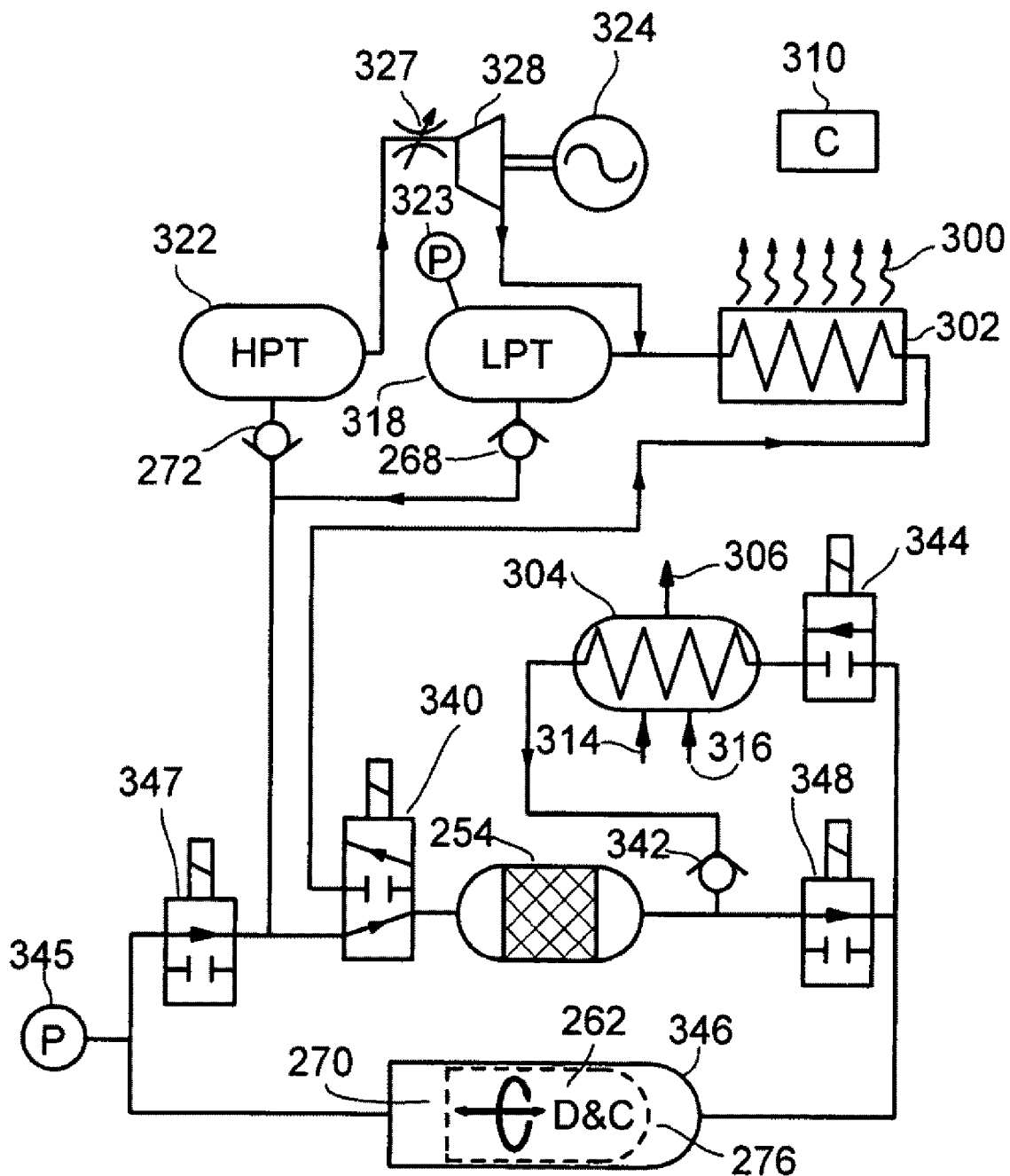
FIGS. 4A, 4B, 4C, and 4D are identical schematics except for valve position. These schematics are for the invention with the embodiments of an electromagnetic, linear displacer motor; bounce valves; heater and cooler decoupling valve; and external combustion heater.

The engine schematic in FIG. 4A is an enhancement of the FIG. 1 schematic by enabling gas dynamic bounce. It has more TC valves configured so that confined gas cause a gas dynamic displacer bounce near the end of the displacer stroke at both ends of the closed container. It is an uncoupled, external-combustion, thermal-compressor gas drive engine (UECTC) that powers a generator. FIGS. 4A, 4B, 4C and 4D are schematics for the same heat engine and differ by the position of the four-solenoid valves. These four drawings define the four distinct valve arrangements used in the engine cycle. The four arrangements are (1) compression, FIG. 4A; (2) cold end gas dynamic bounce, FIG. 4B; (3) gas intake, FIG. 4C; and (4) hot end gas dynamic bounce, FIG. 4D.

The heat engine in FIG. 4A comprises a turbine 328; a variable flow turbine nozzle 327; a generator 324; a controller 310; a high-pressure tank 322; a low-pressure tank 318; a pressure transducer 323; a cooler 302 that transfers heat to a cooling media 300; a discharge check valve 272; an intake check valve 268; a heater 304 which receives fuel 314 and air 316, and exhausts products of combustion 306; a two-port, two-position solenoid valve 344 and a check valve 342 that operate to divert gases from the hot chamber 276 through the heater 304 and then through the regenerator 254 during the intake stroke, and then operates to uncouple the heater during the compression stroke; a two-port, two-position solenoid valve 348 which is open during the compression stroke and closed during the intake stroke; a three-port, two-position solenoid valve 340 that operates to divert gases directly to the cooler during the intake stroke and bypass the cooler during the compression stroke; a two-port, two-position solenoid valve 347 that closes when the displacer comes close to the left end in order to trap gases and induce a gas dynamic bounce on the displacer; an integrated closed container 346 and displacer 262; and a pressure transducer 345 that measures the pressure in the cold chamber. The displacer 262 spins about its axis, levitated by a gas bearing and given longitudinal motion by electromagnetic drive coils. A detailed description of the closed container, displacer and displacer drive is in Sections 3.10 and 3.11. Here we only note that two types of electromagnetic drive systems are used, e.g., a low-performance, low-cost, permanent-magnet drive and high-performance, electromagnetic drive. There are no dynamic contacting surfaces for either one of these systems.

Figure 4B:
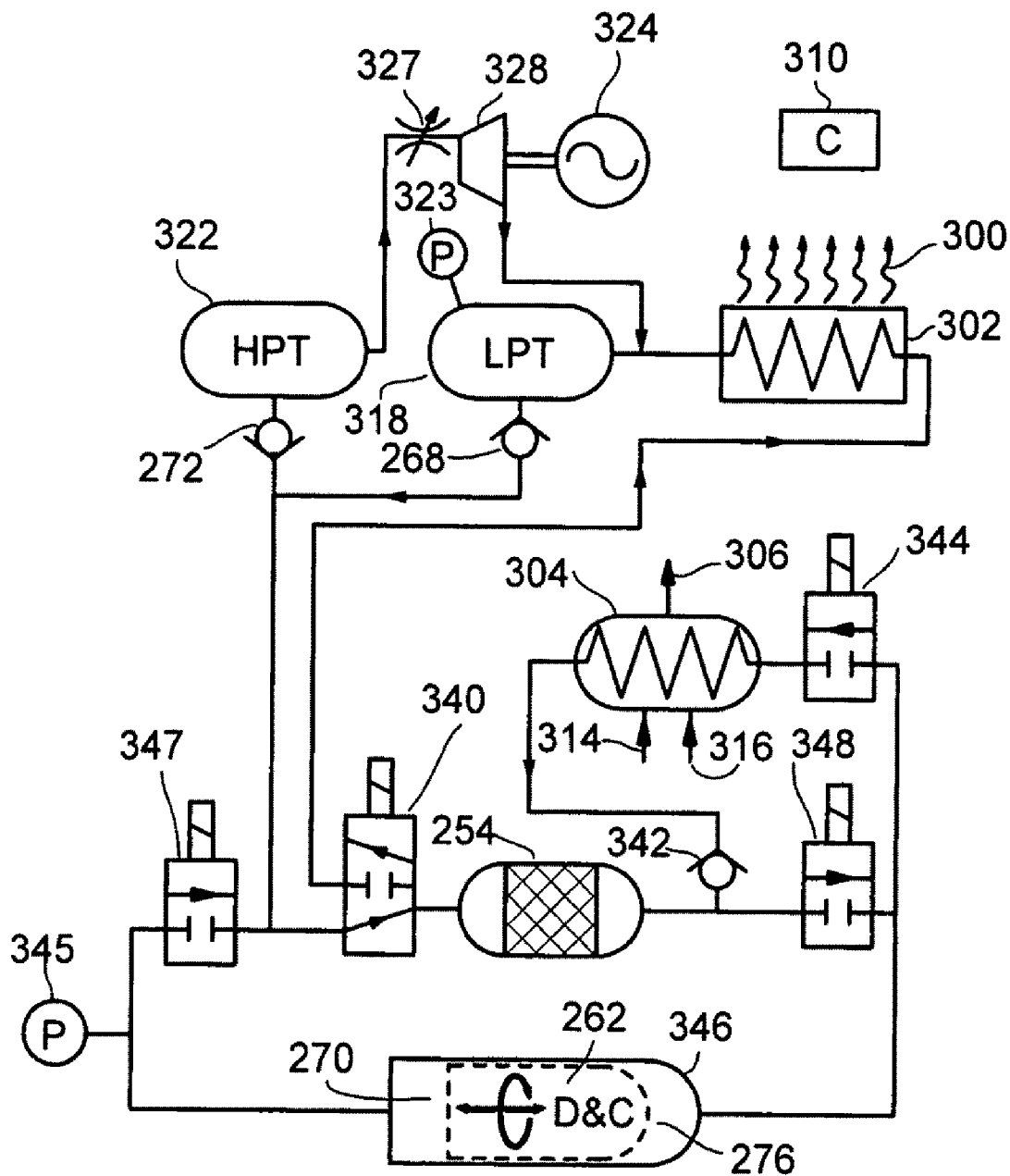
Figure 4C:
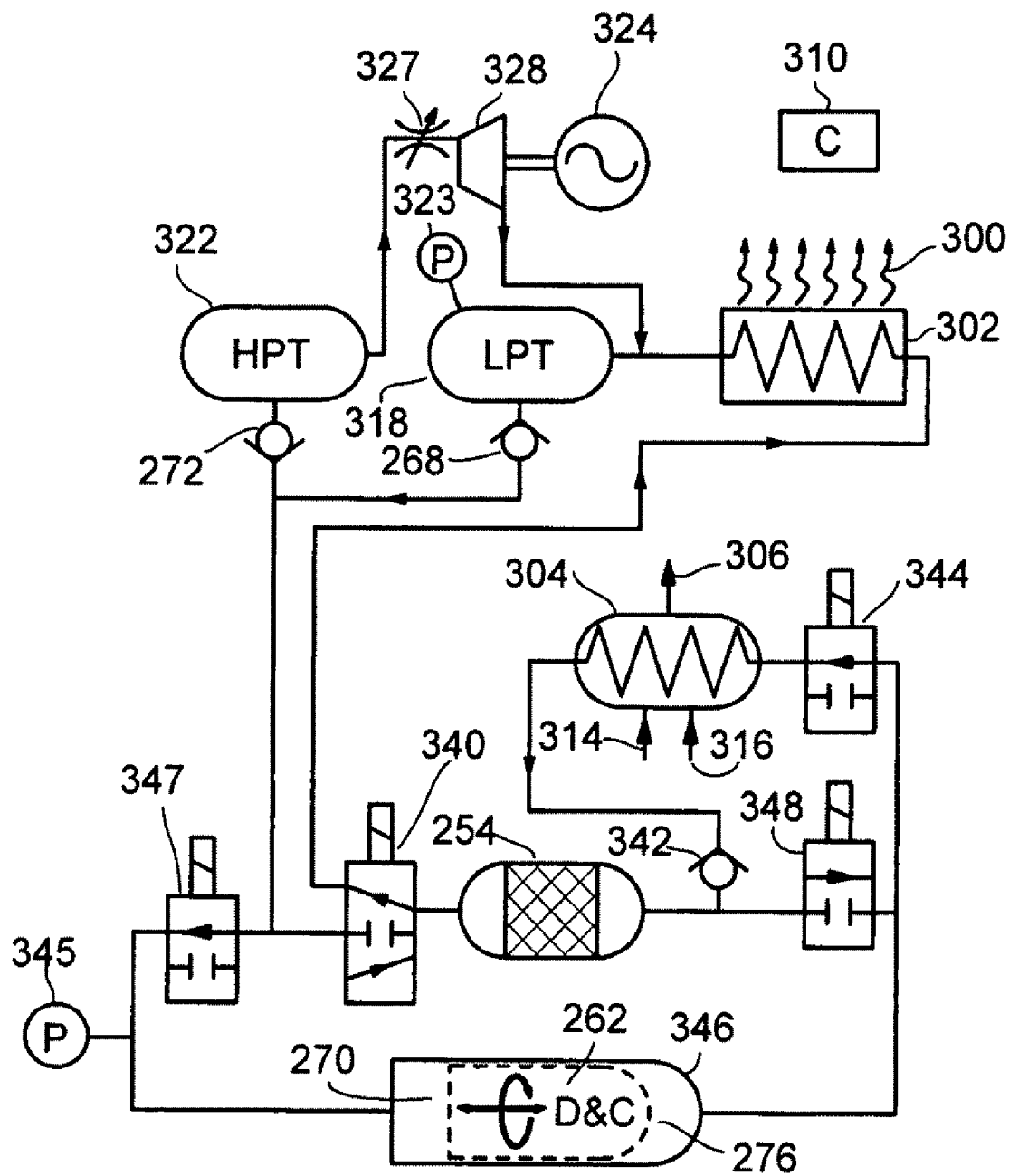
Figure 4D:
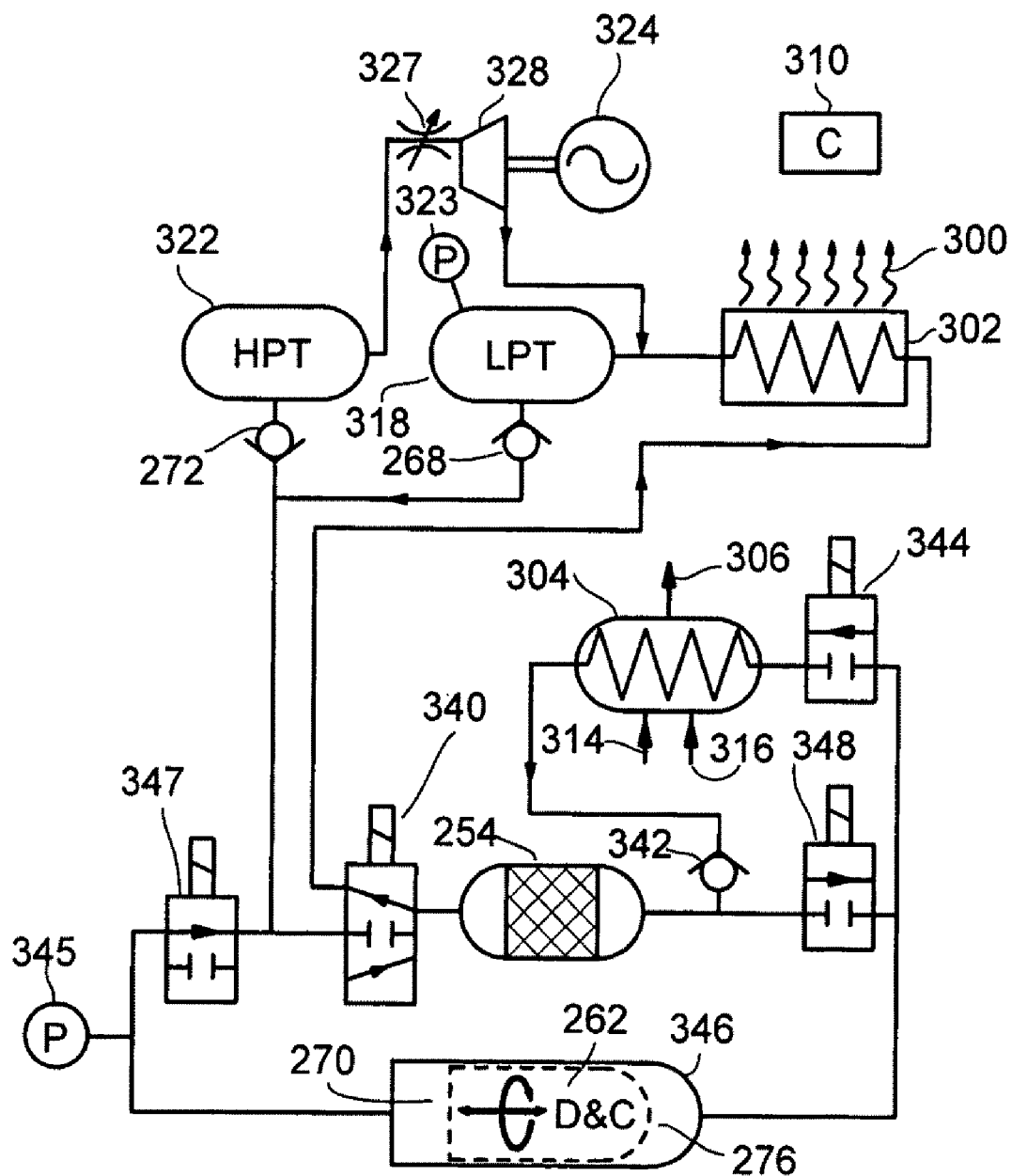

FIG. 4B, which characterizes the valve arrangement for cold end gas dynamic bounce, is identical to FIG. 4A except that the two valves 347 and 348 are in the switched positions. FIG. 4C, which characterizes the valve arrangement for gas intake, is identical to FIG. 4A except the two valves 340 and 344 are in a switched position. FIG. 4D, which characterizes the valve arrangement for hot-end, gas-dynamic bounce, is identical to FIG. 4A except the two valves 340 and 348 are in a switched position.

The UECTC cycle description starts with the displacer near the far-right end and moving to the left with the valves as shown in FIG. 4A. In this position, a path exists from the cold chamber 270, through the valve 347, through the valve 340, through the regenerator 254, then through the valve 348, and into the hot chamber; and a path exists from the cold 270 chamber, through the valve 347, through the discharge check valve 272 and into the high-pressure tank 322. In addition, in this position the pressure in the thermal compressor is at the ambient value. As the displacer moves to the left, gas starts moving from the cold chamber to the hot chamber, the average temperature starts rising in the volume including the hot and cold chambers and the path between them, and then a pressure rise follows. As soon as the pressure exceeds the pressure in the high-pressure tank 322, gases start flowing to it. When the displacer reaches a point near the far left position, the cold-chamber, bounce solenoid valve 347 closes. This causes the pressure in the cold chamber to start rising independent of the pressure in the hot chamber. This causes the displacer to decelerate and then reverse direction so that it is now moving to the right, which causes the cold-chamber pressure to start dropping. At this point, the cold-chamber pressure is higher than the pressure in the high-pressure tank 322 and the bounce solenoid valve 347 activates to open, however, the high bounce pressure inhibits it. As the cold-chamber pressure approaches that of the high-pressure tank, the bounce solenoid valve opens causing the pathway between the cold and hot chambers to open. As the displacer moves further to the right the pressure in both the hot and cold chambers drops until the pressure falls below the pressure of the low-pressure tank, then the intake check valve opens allowing gas to enter. In addition, as the intake valve 268 opens the heater solenoid valve 344 activates to open, the regenerator solenoid valve 348 activates to close and the cooler solenoid valve 340 activates to open a path to the cooler. This causes gases discharged from the hot chamber to go through the heater, then the regenerator, then through the cooler and finally into the low-pressure tank. When the displacer reaches a point near the right end, the heater solenoid valve 348 actuates causing the pressure in the hot chamber to raise independent of the cold chamber; that in turn causes the displacer to decelerate and reverse directions. As the pressure starts dropping, the regenerator solenoid valve activates to open; however, the high bounce pressure inhibits opening until the hot chamber pressure approaches the low-pressure tank pressure. After the regenerator valve opens, the cycle is complete.

Conceptually, when the displacer is at the far right, the cold chamber consists of two parts. The gases in one part undergo an adiabatic compression and discharge into the high-pressure tank; and the gases in the other part first move through the regenerator and into the hot chamber, then move through the heater and cooler, and discharge into the low-pressure tank. FIG. 5A gives conceptual, temperature versus specific-entropy curves for the gas that starts in the direction of the regenerator and implies an ideal regenerator. In FIG. 5A:
1. T designates temperature;
2. S designates entropy;
3. $C_P$ is the specific heat at constant pressure;
4. point F corresponds to the gases in the cold chamber at ambient pressure;
5. point A corresponds to the gases in the cold chamber after they are compressed;
6. point B corresponds to the gases after they move through the regenerator and into the hot chamber;
7. point C corresponds to the gases in the hot chamber after the pressure drops;
8. point D corresponds to the gases after they move through the heater;
9. point E corresponds to the gases after they again move through the regenerator; and
10. point F corresponds to the gases after they move through the cooler.

The symbol Q corresponds to heat transferred across a surface or mechanical energy extracted from the gas. In FIG. 5A the area:
1. $Q_1$ corresponds to the mechanical work extracted from the gases;
2. $Q_2$ corresponds to the heat extracted from the gases by the cooler;
3. $Q_3$ corresponds to the heat added to the gases by the heater; and
4. $Q_3+Q_4$ corresponds to the heat extracted from the gases by the regenerator in one cycle and delivered to the gases in the next cycle.

Figure 5B:
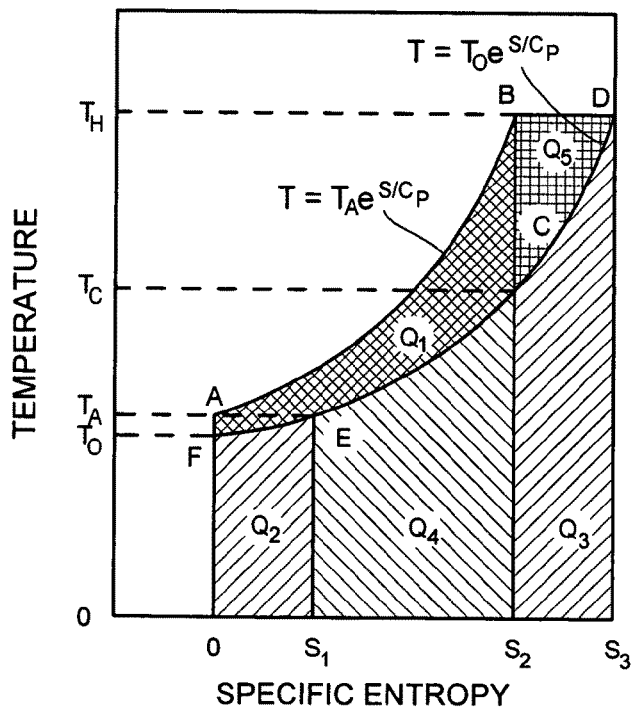
FIG. 5B shows ideal thermal-compressor, temperature-entropy curves of the present invention with the embodiments of a decoupled cooler and continuous internal combustion system as shown in FIGS. 7A and 7B.

FIG. 64 presents cycle efficiency equations for cycles defined in FIGS. 5A and 5B, and the Carnot and Ericsson cycles and respectively designated by $\eta_{EC}$, $\eta_{IC}$, $\eta_{CARNOT}$ and $\eta_{ERICSSON}$. Note that heat from the heater is first stored in the regenerator and then used.

This cycle approximates the Ericsson cycle. Another cycle, which approximates the Ericsson cycle, is the regenerative, gas-turbine cycle. In the regenerative, gas-turbine cycle, moving from point B to C corresponds to a perfect adiabatic expansion in the inlet nozzle, $Q_3$ is the heat of combustion and $Q_4$ is the heat recovered by the regenerator. Thus, the UECTC has thermodynamic similarities to the regenerative gas turbine, but differs by not requiring back work, i.e., extracting turbine energy to compress gases. The energy losses due to back work are more pronounced for small (100 kW) regenerative gas turbines and typically limit efficiencies to values below 30%, whereas uncoupled thermal compressors can typically achieve values above 50%.

3.4 Balanced-Pressure, Crank-Drive, TC, Gas-Turbine Engine

Figure 6:
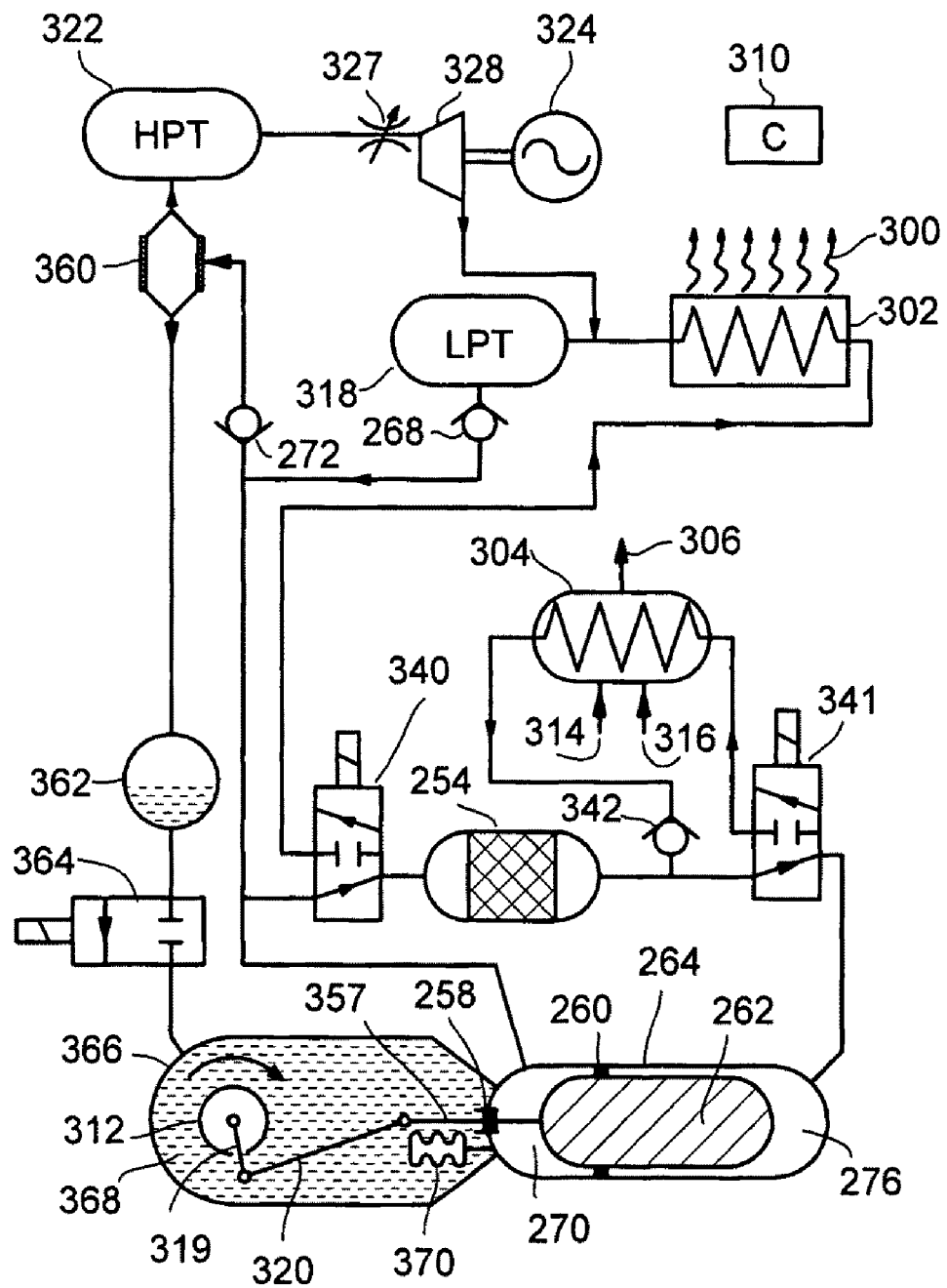
FIG. 6 is an engine schematic of the invention with the embodiments of a displacer crank. This crank is in an oil-flooded crankcase that maintains an equal pressure between the crankcase and TC cold chamber. It has an oil recovery system that compensates for oil leakage at the pushrod and displacer.

FIG. 6 shows another schematic of an external-combustion, uncoupled, thermal-compressor gas turbine driving a generator. This system principally differs from the FIG. 4A system by its use of a crank and pushrod driven displacer. This heat engine obviates the high-pressure pushrod seal problem by means of a unique pressure-balancing method. Service life is more than an order of magnitude larger than a reciprocating, spark-ignition engine. Only a very small differential pressure acts on the displacer seal.

The heat engine in FIG. 6 comprises a high-pressure tank 322; a variable flow turbine nozzle 327; a turbine 328; a generator 324; a controller 310; an oil-gas separator 360; a discharge check valve 272; an intake check valve 268; a low-pressure tank 318; a cooler 302; a cooling media 300; a heater 304 which receives fuel 314, air 316 and exhausts products of combustion 306; an oil sump 362 which is used to replenish crankcase oil 368; a three-port, two-position solenoid valve 340 that operates to directly divert gases to the cooler during the intake stroke and bypass the cooler during the compression stroke; a regenerator 254; a three-port, two-position solenoid valve 341 and a check valve 342 that operate to divert gases from the hot chamber 276 through the heater 304 and then through the regenerator 254 during the intake stroke and then operate to cause gases to flow directly from the regenerator into the hot chamber during the compression stroke; a crankcase 366; a drive motor 312; oil which floods the crankcase 368; a crank arm 319; a connecting rod 320; a pressure equalizing bellow 370 and low oil sensor which activates the solenoid valve 364 that restores lost crankcase oil; displacer pushrod 357; pushrod seal 258; a closed container 264; a displacer 262; a displacer seal 260; a hot chamber 276; and a cold chamber 270.

An important innovation of this system is the use of a crankcase 366 that is completely flooded with oil and the use of a bellow 370 that insures that the pressure in the crankcase and cold chamber 270 will be essentially equal during operation. Although there is a pressure drop across the regenerator at low speeds, it is very small and for a well-designed system at rated output, the maximum pressure drop can be below 30 psi. Consequently, the loads on the displacer seal, pushrod and crank bearings are all very low. With modest size crank bearings, an oil film thickness large enough to eliminate bearing wear is possible. Seal wear is generally proportional to the load. With low-pressure seal loads, an oil film is maintaining and very low displacer-seal wear rate and pushrod-seal wear rate occurs.

3.5 Continuous Internal-Combustion, Uncoupled, TC, Gas-Turbine Engine

Figure 7A:
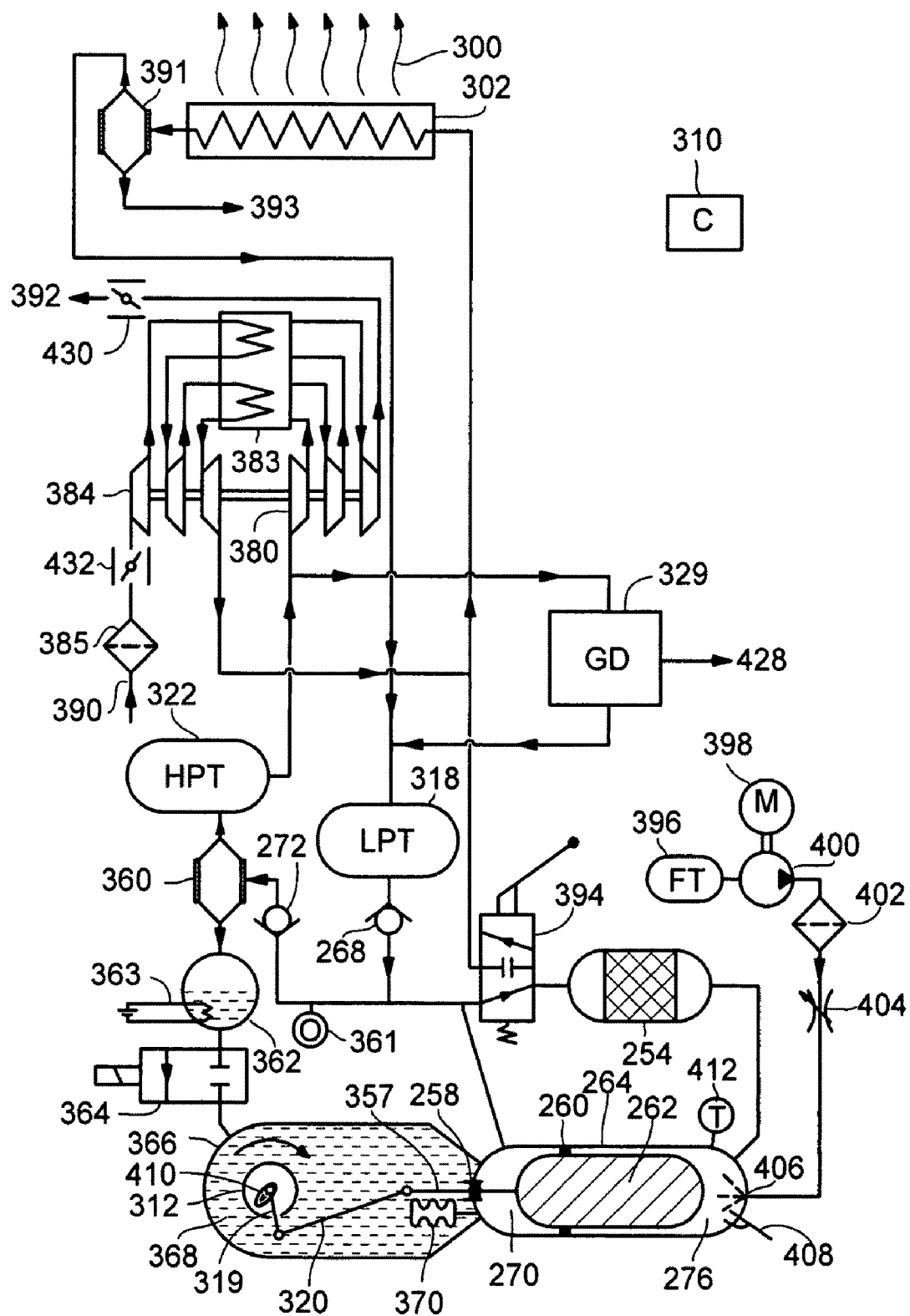
FIG. 7A is an engine schematic of the invention with the embodiments of a continuous internal combustion TC that uses a displacer crank, and maintains a constant pressure between the crankcase and TC cold chamber. This schematic includes a subsystem that compresses air from atmospheric pressure to the engine operating pressure. In addition, it uses an expander to extract compressed-gas energy from the products of combustion before discharging them into the atmosphere.
Figure 7B:
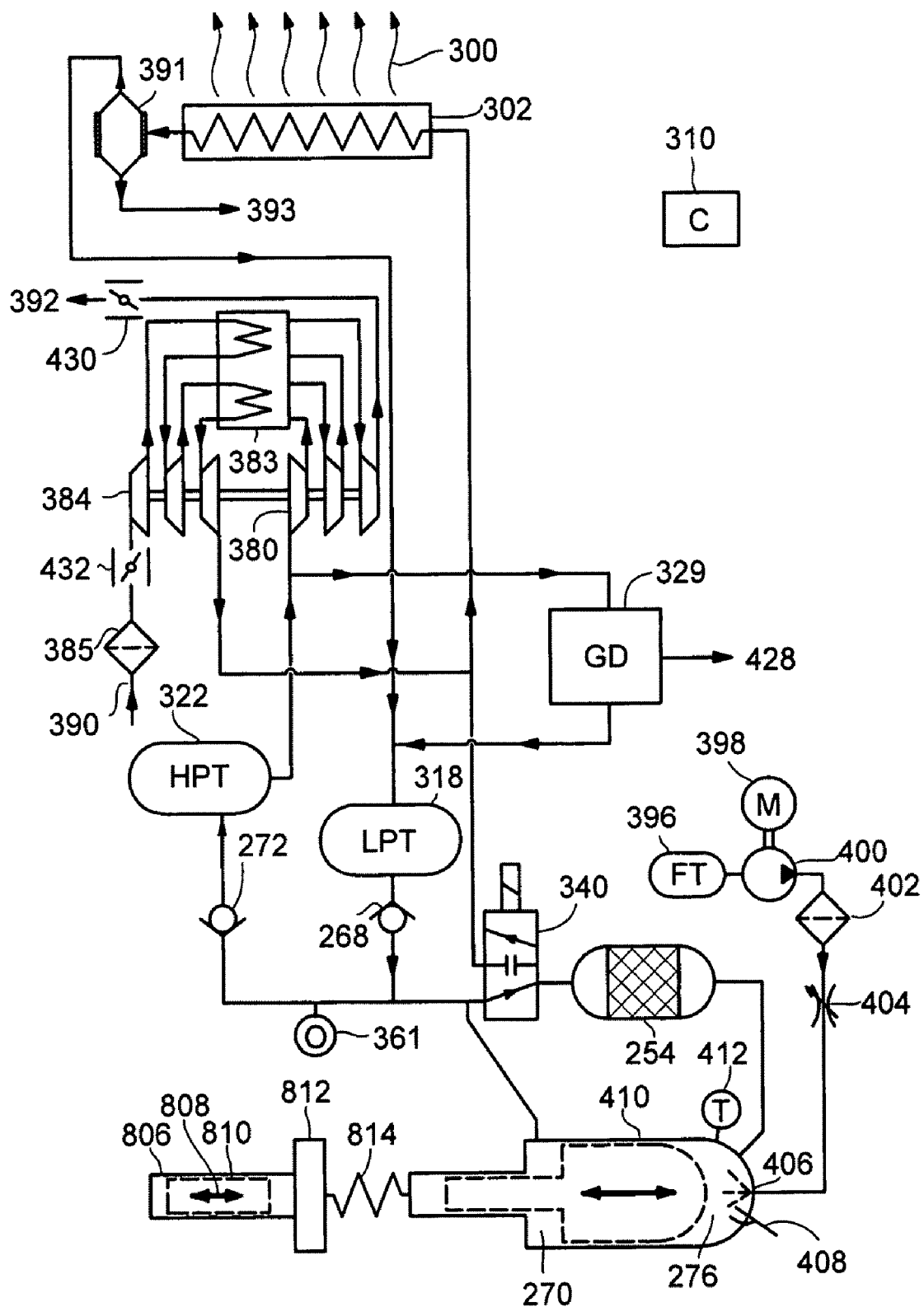
FIG. 7B is an engine schematic similar to the one in FIG. 7A except that the displacer crank drive is replaced with a displacer using a center rod and linear electromagnetic drive.

FIGS. 7A and 7B show schematics of continuous-internal-combustion, uncoupled, thermal-compressor, gas-turbine engines. These systems differs from the system in FIG. 4A by using air as the working fluid in place of hydrogen, helium or nitrogen, using continuous internal combustion in place of a heater, using a compressor to bring high-pressure air into the system and using an expander to extract energy from high-pressure exhaust gases before discharging them into the atmosphere. Note that air, once pressurized, circulates numerous times before it depressurizes and discharges back into the atmosphere. For typical operating conditions, combustion for one cycle will consume an amount of oxygen equal to a small proportion of that in atmospheric air.

The heat engine schematic in FIG. 7A uses a crank and cam activated cooler valve. The heat engine schematic comprises a controller 310; a cooler 302 discharging heat into a cooling media 300; a liquid-gas separator 391 that separates out water from the products of combustion and discharges the water 393; an expander 380; a compressor 384; a heat exchanger 383 that cools gases between compression stages and heats gases between expansion stages; an intake choke 432; an air intake filter 385; an air intake 390; an exhaust 392; an exhaust choke 430; a high-pressure tank 322; a gas drive 329 that outputs power to an output shaft 428; an oil-gas separator 360; a discharge check valve 272; a low-pressure tank 318; an intake check valve 268; a three-port, two-position, cam-actuated cooler valve 394; a regenerator 254; a fuel tank 396; a fuel pump motor 398; a fuel pump 400; a fuel filter 402; an adjustable, fuel flow control 404 which is regulated by the controller to maintain a constant temperature in the hot chamber 276; a pressurized, gravity, oil sump tank 362; an oil heater 363 that drives off water; an oxygen sensor 361; a two-port, two-position oil valve 364 which responds to commands to add oil to the crankcase; crankcase 366; a crankshaft cam 410 that drives the cooler valve 394; crank drive motor 312; crankcase oil 368; crank arm 319; connecting rod 320; a pressure-equalizing bellow and low-oil sensor 370 which activates the solenoid valve 364 that restores lost crank-case oil; displacer pushrod 357; pushrod seal 258; a closed container 264; a displacer 262; a displacer seal 260; a hot chamber 276; a cold chamber 270; a fuel-injection nozzle 406; an igniter 408; and a hot-chamber temperature transducer 412 which the controller monitors.

The heat engine schematic in FIG. 7B has a thermal compressor that uses a displacer with a center rod and a linear electromagnetic drive. This heat engine schematic comprises a controller 310; a cooler 302 discharging heat into a cooling media 300; a liquid-gas separator 391 that separates out water from the products of combustion and discharges the water 393; a three-stage expander 380; a three-stage compressor 384; a heat exchanger 383 that cools gases between compression stages and heats gases between expansion stages; an intake choke 432; an air intake filter 385; an air intake 390; an exhaust 392; an exhaust choke 430; a high-pressure tank 322; a gas drive 329 which outputs shaft power; output shaft 428; a discharge check valve 272; a low-pressure tank 318; an intake check valve 268; a three-port, two-position, solenoid cooler valve 340; a regenerator 254; a fuel tank 396; a fuel pump motor 398; a fuel pump 400; a fuel filter 402; an adjustable, fuel flow control valve 404 which is regulated by the controller to maintain a constant temperature in the hot chamber 276; an oxygen sensor 361; a center-rod, electromagnetic-displacer-drive TC 410; a hot chamber 276; a cold chamber 270; a fuel-injection nozzle 406; an igniter 408; and a hot-chamber temperature transducer 412 which the controller monitors.

FIG. 5B gives conceptual, temperature versus specific-entropy curves for a continuous-internal-combustion, uncoupled TC. By modulating the fuel flow into the combustion chamber, the TC hot chamber maintains a constant temperature. In FIG. 5B the area:

1. $Q_1+Q_5$ corresponds to the mechanical work extracted from the gases,
2. $Q_2$ corresponds to the heat extracted from the gases by the cooler,
3. $Q_3+Q_3$ corresponds to the heat added to the gases by fuel in the combustion chamber, and
4. $Q_3+Q_4$ corresponds to the heat extracted from the gases by the regenerator in one cycle and delivered to the gases in the next cycle.

This cycle more closely approximates the Ericsson cycle than that in FIG. 5A. The efficiency of this cycle is closer to the Carnot cycle since the efficiency of the Ericsson cycle is the same as the Carnot cycle. FIG. 64 gives the related calculations.

The heat engine in FIG. 7B is suitable for automotive applications where engine speed varies and often operates for long periods at a small fraction of rated output. Three or four thermal compressors operating in parallel are ideal in such an application since individual units can be turned on or off. Section 3.19 below gives a detailed description of a related automotive drive system.

The continuous-internal-combustion, uncoupled, thermal-compressor, gas-turbine engine has the lowest specific weight of the three engine systems in this specification. Because it performs back work, it can have a lower efficiency than the other two engine systems; however, this loss of efficiency can be more than offset by operating at a higher temperature, lowering the ambient pressure and more closely approximating the ideal Ericsson engine by maintaining a constant hot chamber temperature.

Figure 80:
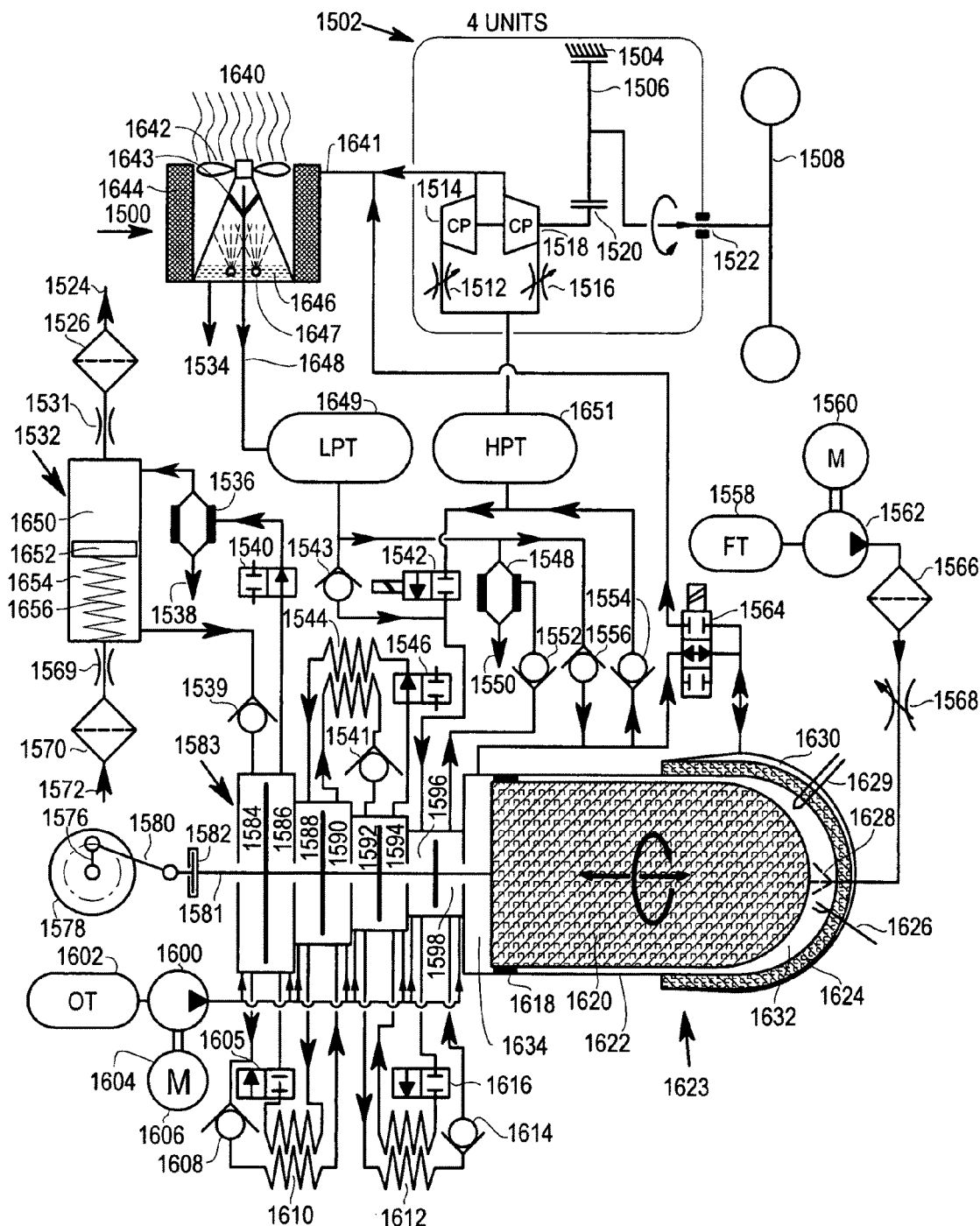
FIG. 80 is an engine schematic of the invention with the embodiments of a continuous internal combustion TC that uses a three stage reciprocal compressor, a three stage reciprocal expander and thermal compressor displacer, all on one shaft. An approximate isothermal compression and expansion results by removing heat in each stage of compression and transferred it to gas in each stage of expansion.

FIG. 80 is another version of the continuous internal combustion, uncoupled, thermal compressor, gas turbine engine configured for an automotive application. The engine uses high-pressure air in a closed cycle in which a thermal compressor compresses air and a turbine converts compressed air energy into mechanical energy. The engine uses a three stage reciprocal compressor, a three stage reciprocal expander 1583 and thermal compressor displacer 1620, all on one shaft. An approximate isothermal compression and expansion results by removing heat in each stage of compression and transferred it to gas in each stage of expansion. Three heat exchangers 1544, 1610 and 1620, and an oil spray system described below implement this heat transfer. The reciprocal compressor brings fresh air into the closed cycle and the reciprocal expander removes energy from the products of combustion before discharging then into the atmosphere. The isothermal process minimizes work required to compress air and maximizes energy extracted from the products of combustion during expansion.

The engine uses a noise mitigator 1532 to transform the pulsating intake and exhaust gases into a near continuous and thus near noise-free intake 1572 and exhaust 1524 flow processes. The engine uses a cooler 1500 that operates in the closed cycle, condenses water 1646 from the products of combustion and uses the water to absorb pollutants such as sulfur dioxide from the products of combustion.

The compressor-expander 1583 uses an oil spray system that lubricates the system and as noted above performs a heat transfer function. Two oil separators 1536 and 1548 discharge oil 1538 and 1550 that is delivered to the oil storage tank 1602. The oil pump 1600 powered by a motor 1606 receives oil from the oil tank 1602 and delivers it under pressure to spray nozzles in the four compressor chambers 1584, 1590, 1592 and 1598, and in the four expansion chambers 1586, 1588, 1594 and 1596. Oil entering the compression chambers works its way through and enters the oil separator 1548 where it separates and returns to the oil tank and oil entering the expansion chambers works its way through and enters the oil separator 1536 where it separates and returns to the oil tank. Oil in the compression chambers heats up and oil in the expansion chamber cools down. In the oil tank, the cool and warm oil mix.

The compression-expansion pistons and thermal compressor displacer are on a common push rod 1581. The push rod undergoes translational motion and it spins. The translational motion is required for it to perform its compression and expansion motion. Spin minimizes friction and wear. For a lubricated metal-on-metal surface, the coefficient of friction at low surface velocities is typically near 0.1 where as above 250 cm/s it typically is less than 0.001.

The regenerator 1624 is integrated into the close container 1622 so that no part of the closed container structure is subjected to both high temperatures and high tensile stresses. This allows the portion of the structure subjected to tensile stresses to be configured of metals that operate only at low temperature. The high temperature portion of the displacer is subjected only to compressive stresses.

Air enters the engine at the intake 1572, moves through the filter 1570 and flow control valve 1569, and then enters a noise-mitigator intake chamber 1654. The products of combustion leave the engine by first entering the noise-mitigator exhaust chamber 1650, then passing through the exhaust-flow control valve 1531 and exhaust filter 1526, and then discharged into the atmosphere 1524. The noise mitigation subsystem simultaneously discharges air to the compressor chamber 1584 and receives products of combustion from the expander chamber 1586. This occurs when the displacer is moving to the right. When the displacer is moving to the left, the noise mitigator does not receive gas from the expander or discharge it to the compressor. When the noise mitigator discharges and receives gas the noise mitigator piston 1652 moves down, and when it is not receiving or discharging gas the piston 1652 is moving up under the force of the noise-mitigator return-spring 1656. This motion of the noise mitigator piston largely eliminates a pulsating intake flow and pulsating exhaust flow. If the intake-flow control valve is replaced with a variable flow control valve, upstream pressure sensor and related control system, the variable-flow control valve can be modulated so the intake flow noise is essentially eliminated. In an analogist way, exhaust-related flow noise is essentially eliminated.

As the push rod moves to the right air is discharged from the noise, mitigation, intake chamber; moves through piping; the intake check valve 1539; and then into the first compressor chamber 1584. When the push rod begins moving to the left, air in the first compressor chamber 1584 with volume $V_1$ starts moving through the discharge check valve 1608, through the heat exchanger 1610, and then into the second compressor chamber 1590 with volume $V_2$. As gas moves from the first compressor chamber to the second compressor chamber the gas with volume $V_1$ is continuously compressed to a volume $V_2$ and heat of compression is removed as the gas passes through the heat exchanger. When the push rod again moves to the right the gas in the second compressor chamber 1590 moves through the heat exchanger 1544 and then into the third compressor chamber 1592. When the push rod again moves to the left the gas in the third compressor chamber 1592 moves through the heat exchanger 1612 and then into the fourth compressor chamber 1598. Finally, when the push rod moves to the right, again the gas in the fourth compression chamber 1598 is discharged and moves through the check valve 1552, through the oil separator 1548, into a pipe with gas coming from the low pressure tank 1649, through the thermal compressor intake check valve 1556, and then into the cold chamber 1634 of the thermal compressor.

When the displacer 1620 is at the far left the cooler divert valve 1564 is in the position shown in FIG. 80. In this position, the pressure in both the hot chamber 1632 and cold chamber 1634 is at the system high-pressure level and the two chambers are connected. As the displacer moves to the right the system pressure drops and when it approximately reaches the system low pressure level the cooler divert valve 1564 is activated. Then gas in the hot chamber 1632 moves through the regenerator 1624, into the plenum 1630, through the cooler divert valve 1564, and then into the cooler 1500. As the displacer moves to the right the pressure in the cold chamber 1634 drops and when if falls below the pressure of the low pressure tank 1649 gas from the low pressure tank moves first through the intake check valve 1556 and then into the cold chamber 1634. When the displacer reaches the far right the cooler divert valve 1564 actuates returning it to the configuration shown in FIG. 80 thus providing a clear passage between the cold chamber and the hot chamber. As the displacer moves to the left, cold gas moves through the regenerator and into the hot chamber, and thus the internal pressure starts rising and when it exceeds the pressure in the high pressure tank 1651 gas is discharged first through the discharge check valve 1554 and then into the high pressure tank 1651.

The hot chamber can be maintained at a near constant temperature by modulating the fuel flow into the hot chamber. The fuel system consists of a fuel tank 1558, fuel pump 1562, fuel pump motor 1560, fuel filter 1566, variable flow control valve, hot chamber fuel nozzle 1628, igniter 1626 and thermal couple 1629.

The cooler removes heat from the system and incorporates a water exhaust scrubber.

Combustion of automotive fuels and air produces carbon dioxide, $CO_2$ and water $H_2O$ among other compounds. For system pressures above 5 MPa condensation of $CO_2$ is an issue; however, we assume that the system will operate at nominal values of 3 MPa. Due to high system pressures water condensation will occur. This condensation predominately occurs when the thermal compressor hot chamber discharges gases. The cooler 1500 receives almost all of this gas and consequently the cooler will collect this water. The products of combustion, which flow into the cooler, will consist of both liquids and gas. These products of combustion entering the cooler first flow through the heat exchanger 1644, then discharge through cooler nozzles 1647 at the base of the scrubber chamber 1646 which contains condensed water, then through the liquid-gas separator 1643 which passes the gas and diverts the liquid back into the scrubber chamber. This process partially removes particulates, water-soluble gases and liquids. The liquid is discarded 1534 and the gas moves on to the low pressure tank 1649.

The expander consists of four piston chambers 1596, 1594, 1588 and 1586 which intake gas, perform three expansion stages and discharge the gas. The expander extracts as much energy as possible from the system gases before discharging them into the atmosphere. It receives gas from both the high-pressure tank 1651 and the low-pressure tank 1649. Partly receiving gas from the high-pressure tank allows the expander to operate as a drive motor for the engine push rod. The expander high-pressure valve 1542 controls the flow of high-pressure tank gas into the first stage expander. When the push rod is at the far right and just starts moving to the left the expander high-pressure valve is opened allowing gas from the high-pressure tank to flow into the first expander chamber 1596. After the push rod nominally moves ¼ of a stroke, the expander high-pressure valve closes. Then the gas in the first stage expander chamber expands and the pressure drops. When the pressure in this expander chamber drops below the pressure of the low temperature tank 1649 gas from this tank moves first through the expander intake check valve 1543 and then into the first stage expander chamber. When the push rod reaches the far left position, the pressure in the first stage expander chamber is nominally very close to the pressure of the low-pressure tank. To increase the speed of the engine, the portion of the stroke during which the expander high-pressure valve is open is increased and to decrease the engine speed the portion of the stroke during which the expander high-pressure valve is open is decreased. The configuration of the four-expander valves 1540, 1546, 1605 and 1616 as shown in FIG. 80 is for the case when the push rod is moving to the right. When the push rod reaches the far right, these four valves change positions. When the push rod moves to the left gas in the first expander chamber 1596 moves first through the heat exchanger 1612 and then into the second expander chamber 1594. In this process the gas continuously expands, cools and absorbs heat from the heat exchanger. Similarly, the gas continues to expand as it moves from the second expansion chamber 1594 to the third expansion chamber 1588 and from the third expansion chamber to the fourth expansion chamber 1586. When the gas discharges from the fourth expansion chamber, it first passes through the expansion valve 1540 and into the oil separator 1536 where oil and gas separates. Oil 1538 returns to the oil tank 1602 and the gas moves to the exhaust chamber 1650 of the noise mitigator 1532.

The push rod is kinematically constrained by a crank 1576 and crank rod 1580 system. The pushrod interfaces with the crank drive with an integral thrust bearing and spin motor 1582. This interface allows the push rod together with the attached pistons and displacer to spin. This allows maintenance of full lubrication for all bearing and seal surfaces throughout the cycle. This reduces both friction and wear by an order of magnitude.

The engine uses four wheel mounted turbine drive subsystems 1502. Each unit has a forward constant power turbine 1514; a reverse constant power turbine 1518 (see Section 3:19); two variable flow rate turbines 1512 and 1516; a planetary gear speed reduction gear set 1504, 1506 and 1520; a system pressure containment structure 1503; a high pressure seal 1522; and a wheel and tire assembly.

3.6 Internal-Combustion-Heater, Uncoupled, TC, Gas-Turbine Engine

Figure 8:
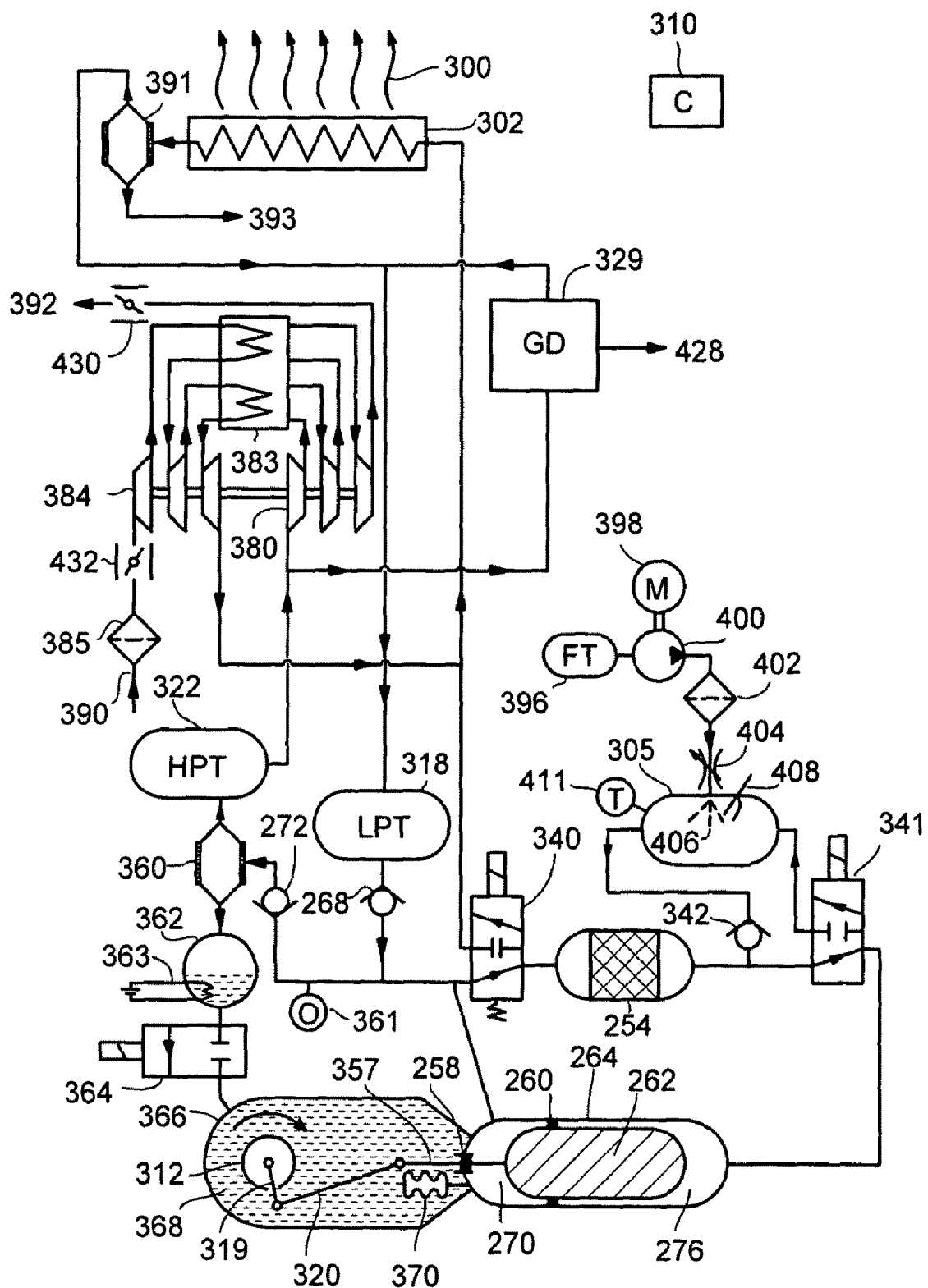
FIG. 8 is an engine schematic of the invention with the embodiments of an continuous internal combustion heater (ICH) that uses a displacer crank, and maintains a constant pressure between the crankcase and TC cold chamber. This schematic includes a subsystem that compresses air from atmospheric pressure to the engine operating pressure and uses an expander to extract compressed-gas energy from the products of combustion before discharging into the atmosphere.

FIG. 8 is a schematic for a continuous internal-combustion-heater, uncoupled, TC, gas-turbine engine. This heat engine comprises a controller 310; a cooler 302 discharging heat into a cooling media 300; a liquid-gas separator 391 that separates out water from the products of combustion and discharges the water 393; a three-stage expander 380; a three-stage compressor 384; a heat exchanger 383 that cools gases between compression stages and heats gases between expansion stages; an intake choke 432; an air intake filter 385; an air intake 390; an exhaust 392; an exhaust choke 430; a high-pressure tank 322; a gas drive 329 which outputs shaft power; output shaft 428; an oil-gas separator 360; a discharge check valve 272; a low-pressure tank 318; an intake check valve 268; a three-port, two-position, solenoid cooler valve 340; a regenerator 254; a fuel tank 396; a fuel pump motor 398; a fuel pump 400; a fuel filter 402; an adjustable, fuel flow control valve 404 which is regulated by the controller to maintain a constant temperature in the heater 305; a fuel-injection nozzle 406; an igniter 408; and a heater temperature transducer 411 which the controller monitors; a pressurized, gravity, oil sump tank 362; an oil heater 363 that drives off water; an oxygen sensor 361; a two-port, two-position oil valve 364 which responds to commands to add oil to the crankcase; crankcase 366; crank drive motor 312; crankcase oil 368; crank arm 319; connecting rod 320; a pressure-equalizing bellow and low-oil sensor 370 which activates the solenoid oil valve 364 that restores lost crankcase oil; displacer pushrod 357; pushrod seal 258; a closed container 264; a displacer 262; a displacer seal 260; a hot chamber 276; and a cold chamber 270.

The engine version in FIG. 8, with a continuous internal combustion heater, has advantages for some applications over the engine versions in FIGS. 7A and 7B, where continuous internal combustion occurs in the closed container hot chamber. Generally, the continuous internal combustion heater is preferable for large systems. With proper modifications, the use of a "dirty" fuel such as coal in a continuous internal combustion heater is possible. Necessary modifications include a bag filter that removes ash from the products of combustion before they exit the heater and a method of removing condensates such as $K_2O$ and $P_2O_5$ from the regenerator.

3.7 Solar-Energy, Thermal-Compressor, Gas-Turbine Power System

Figure 9:
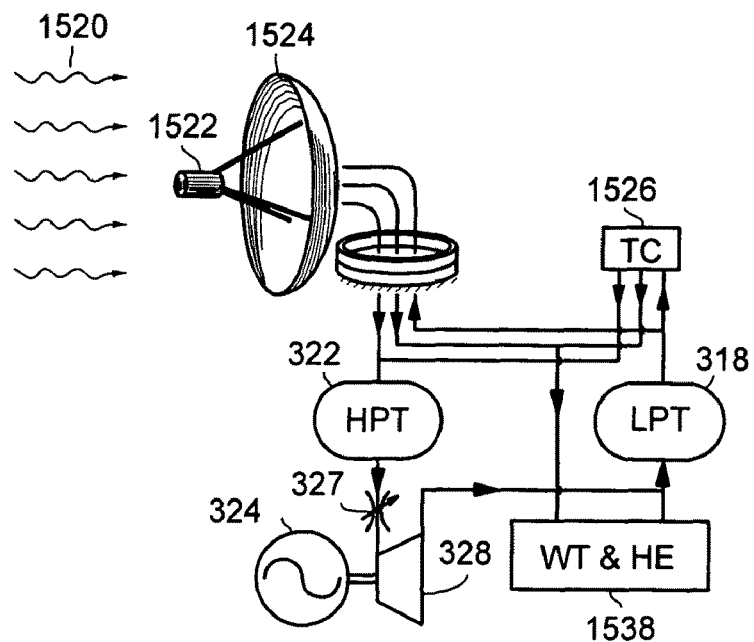
FIG. 9 shows a schematic of a home-based, natural gas cogeneration system augmented with solar power.

A schematic of a solar energy based thermal compressor power system is shown in FIG. 9 and is comprised of solar radiation 1520; solar receiver and thermal compressor 1522; sun tracking parabolic mirror 1524; natural gas heater and thermal compressor 1526; low pressure tank 318; high, pressure tank 327; hot water tank and heat exchanger 1538; generator 324; variable flow turbine nozzle 327; and turbine 328. Section 3.18 gives details of the solar receiver shown in FIG. 10.

The solar-energy thermal compressor operates in parallel with the natural-gas thermal compressor. This allows maximum solar energy use while natural gas provides energy as required. Energy delivered by the thermal compressor is in the form of warm compressed gas and warm gas. In a typical design a pressure ratio of 1.4 is used, compression causes the gas to heat up from an ambient temperature and cooling the compressed gas to the ambient temperature results in a loss of energy. This loss, however, is less than 4% and consequently transferring the compressed gas over long distances does not entail large losses. The warm gas that has not been compressed removes heat engine rejected heat ($Q_2$ in FIG. 5A). Typically, the uncompressed warm gas discharged by the solar receiver transfers about half the solar energy.

3.8 Integral Small-Clearance Seal and Gas Bearing

The displacer for the system shown in FIG. 4A does not use a lubricant other than the working fluid. This is possible since the displacer incorporates a gas bearing. The gas bearing serves the additional role of being a small-clearance seal. A tertiary role to that of gas bearing is a small-capacity regenerator that acts in parallel with the main regenerator. Thus, counter intuitively a small amount of leakage through the seal can improve efficiency. Clearances required for the differential thermal expansion and clearances resulting from pressurization far exceed acceptable leakage values for the seal.

Figure 11:
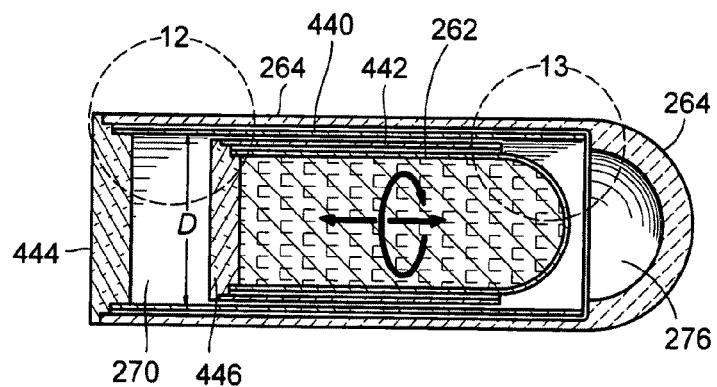
FIG. 11 is a schematic that shows how concentric glass ceramic cylinders form an integral gas bearing and small clearance seal.
Figure 12:
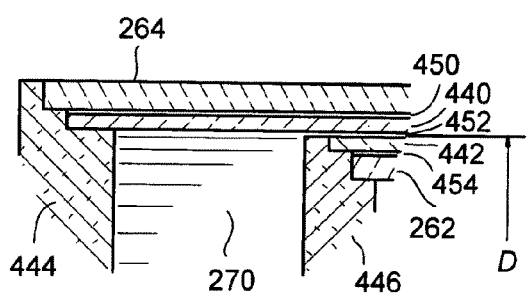
FIG. 12 shows an enlargement of the indicated area shown in FIG. 11. The figure shows one concentric cylinder attached to the displacer and the other attached to the closed container.
Figure 13:
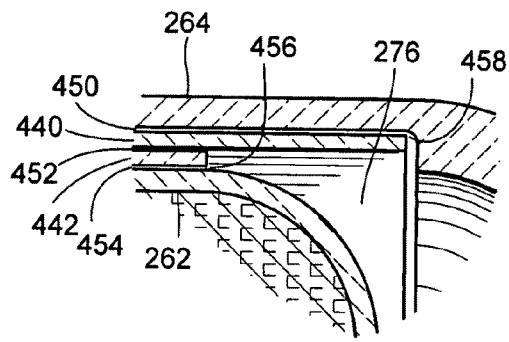
FIG. 13 shows an enlargement of the indicated area shown in FIG. 11. The figure shows how gaps insure pressure equalization on both sides of the two concentric cylinders forming an integral gas bearing and small clearance seal.

A unique, integral, small-clearance seal and gas bearing is shown in FIG. 11. FIGS. 12 and 13 are enlargements defined in FIG. 11. These figures describe the seal and bearing concept and do not incorporate a displacer drive system. The seal and bearing concept in FIGS. 11, 12 and 13 comprise a closed container 264; a displacer structure 262; a stationary seal cylinder 440; a displacer-mounted seal cylinder 442; a closed-container back plate 444; a displacer back plate 446; a cold chamber 270; a hot chamber 276; a gap between the closed-container structure and the stationary seal cylinder 450; a gap between the displacer structure and the displacer mounted seal cylinder 454; a gap between the stationary seal cylinder and the displacer mounted seal cylinder 452; an entrance for gas to flow between the displacer structure and the displacer seal cylinder 456; and an entrance for gas to flow between the closed container and the stationary seal cylinder 458.

This arrangement allows gas pressure to equalize on both sides of the stationary seal and both sides of the displacer seal. Let D designate the diameter of the mean point between the two seal cylinders 440 and 442 as shown in FIG. 11. D is the system diameter. The closed-container pressure fluctuates between a high and low value, causing its diameter to fluctuate between a high and low value. Let $\delta_C$ designate the difference between the high and low value of this diameter. For many applications, values of $\delta_C/D>0.004$ will occur. Similarly, $\delta_D$ designates the difference between the high and low value of the displacer structure diameter and $\delta_D/D>0.004$ can be expected. Slow-speed, high-value pressure fluctuations, however, will not cause the gap between the two seal cylinders to change significantly. When the displacer moves rapidly, the differential pressure between the hot and cold chambers will increase; however, for most applications this differential pressure should not exceed 30 psi. This pressure will cause the two seal cylinders to reduce the gap between them by an amount designated by $\delta_P$. For a 0.2 MPa differential pressure and a typical design, $\delta_P/D<0.0001$ with the maximum occurring at a region near the cold chamber.

The requirements for the seal material selection process include (1) a near zero coefficient of thermal expansion, (2) good refractory properties, (3) good dimensional stability over time, (4) have good honing and lapping qualities for high-volume precision manufacturing and (5) a tensile stress of at least 140 MPa. The family of glass ceramics offers the most promise; more specifically Pyroceram of the Corning Glass Works can meet these requirements. Pyroceram can have a coefficient of thermal expansion of $0.36 \times 10^{-6}$ cm/cm-°K, a softening point of 1300° C., a flexural tensile strength of 207 MPa and is used for telescope mirror blanks that require a high degree of dimensional stability and good honing and lapping qualities.

In a typical design, the maximum temperature difference between the moving displacer seal cylinder and the stationary seal cylinder can be 200° K. Let $\delta_T$ designate the maximum difference in the change in diameters between the displacer seal and the stationary seal due to thermal expansion. Then $\delta_T/D<0.0001$ and the maximum value of $\delta_T/D$ occur at the end of the hot chamber.

The seal leakage is laminar flow and easily calculated. Let $\delta_S$ designate the difference in diameter between the two seal cylinders. With normal high volume production an out of round, taper and waviness tolerance of $0.001>\delta_S/D>0.0001$ can readily be achieved. This value results in a leakage rate that will not cause a significant loss of efficiency for most applications.

Figure 14:
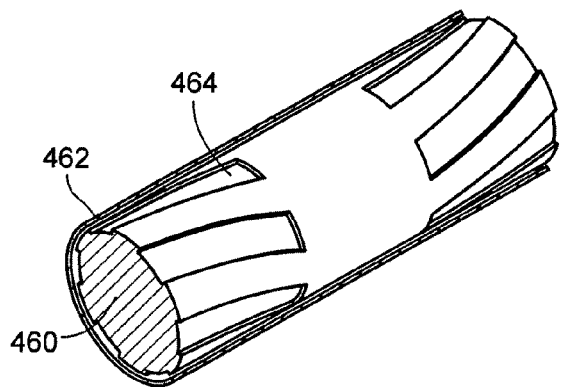
FIG. 14 shows an isometric of a herringbone gas bearing that can be incorporated into the small clearance seal.

The gas-bearing design is different from most gas-bearing applications by virtue of the very high-pressure gas used. As the pressure goes up the viscosity of the gas changes only a small amount; however, the compressibility of the gas increases proportionally to the pressure. At 100 atmospheres, the gas, in terms of how it affects the bearing characteristics, behaves more like an incompressible fluid than a gas. A smooth bushing type bearing should remain stable for most applications. If bearing stability is an issue, a herringbone-groove journal bearing design of a type shown in FIG. 14 is used. This design is very stable down to much lower pressures. The herringbone-groove journal bearing shown in FIG. 14 is comprised of a journal or shaft 460 with helically shaped grooves 464 at each end and a bearing 462.

3.9 Displacer Center Rod Support

Figure 22B:
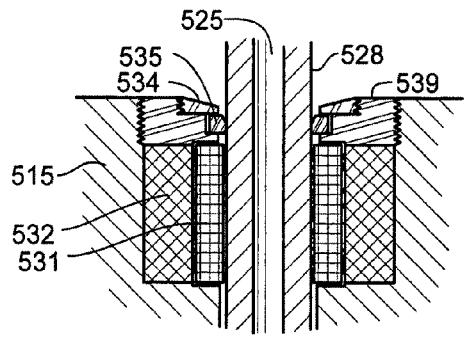
FIG. 22B shows a motorized bushing for use with a displacer center rod that eliminates both bushing and displacer labyrinth seal wear.

A low cost alternative to the integral small clearance and gas bearing as a means of minimizing TC wear is the use of a displacer center rod. This engine component, described in more detail below and in FIGS. 22A and 22B, is a version that uses a displacer labyrinth seal that has a small differential pressure and does not support the displacer relative to the closed container. The bushing that supports the displacer center rod can wear so that the labyrinth seal will in turn wear. By using the motorized bushing shown in FIG. 22B the wear problem is overcome. This motorized bushing maintains an oil film between the bushing and center rod and maintains a centering force on the center rod. Therefore, bushing wear and labyrinth seal wear is not significant after an initial wear in period. The center-rod oil seal can experience wear; however, the pressure across this seal is essentially zero so that maintaining a continuous oil film between the seal surface and center rod is not difficult.

The center rod and displacer drive in FIG. 22A comprises a displacer 523 supported by a lubricated slender center rod 528 with center channel 525, and end ports 512 and 520; center rod bushing 514 with busing base cavity 513; magnet 516 and magnetic circuit iron elements 515 and 517; displacer drive coil 519 with leads 518; displacer base 526, seal 521, and insulation 522; and closed container 524 with cold chamber 270 and hot chamber 276. The center rod 528 has a center channel 525 with openings at both ends 512 and 520 so that the gas pressure at the base of the center rod 513 equalizes with the pressure of the closed container cold chamber 270. The drive coil leads have a second function by being nonlinear springs that define the stroke length by bouncing the displacer (not shown). Sensors at each end of the displacer drive coil (not shown) cause current reversal when the displacer reaches the end of the stroke. A power supply powers the displacer drive coil.

The motorized bushing shown in FIG. 22B comprises a slender center rod 528 with center channel 525, a cylindrical bushing and integral permanent magnet 531, motor winding and iron core structure 532, displacer magnetic circuit iron elements 515, motor winding and iron core structure threaded fastener 539, center rod oil seal 535, and center rod oil seal threaded fastener 534.

An advantage of the center rod version is that it is simple and low cost. A disadvantage is that it is not maintenance free and contamination of closed systems is possible.

3.10 Permanent Magnet, Displacer-Drive System

This specification addresses three linear electromagnetic drive systems, e.g., two low-cost ones based on permanent magnets and a high-performance one that is completely electromagnetic. In volume production use of low-cost permanent magnets such as strontium ferrite results in a low-cost device; however, high-cost permanent magnets, such as ones based on neodymium-iron-boron alloys, may result in devices that are more costly than completely electromagnetic devices. Ultimately, electromagnetic drives can provide higher performance and do not suffer from potential demagnetization problems.

Figure 15:
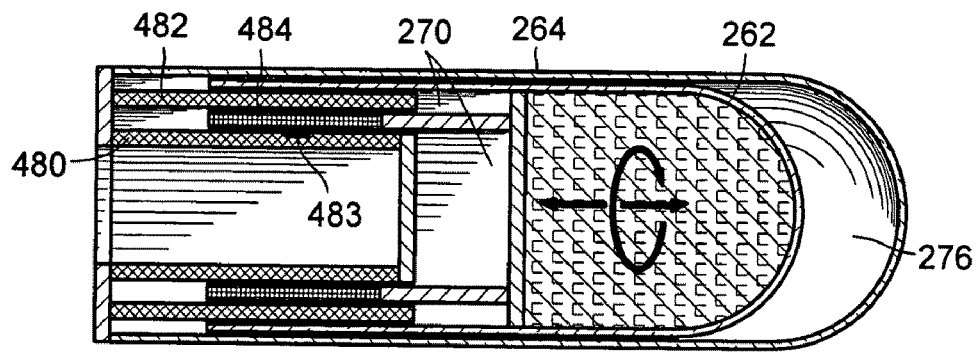
FIG. 15 shows a descriptive drawing of the invention with the embodiments of a displacer and closed container. For this displacer spin and translation are electro-magnetically induced. It uses a permanent magnet attached to the displacer.
Figure 16:
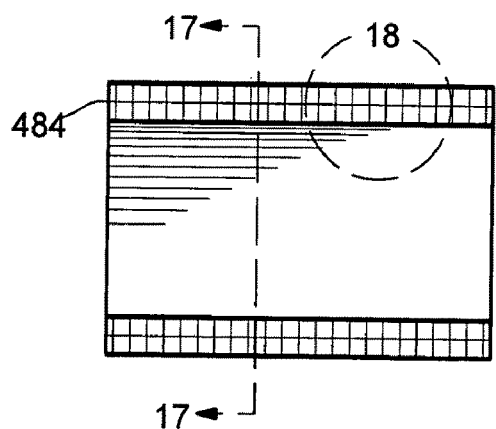
FIG. 16 shows a section parallel to the axis of the FIG. 15 permanent magnet.
Figure 17:
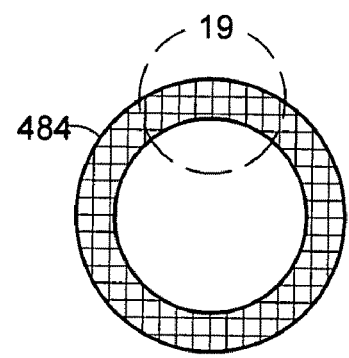
FIG. 17 shows a section perpendicular to the axis of the FIG. 15 permanent magnet.
Figure 18:
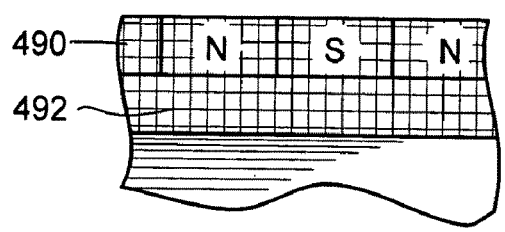
FIG. 18 shows an enlargement of a magnet region defined in FIG. 16. It shows magnet polarity of the outer portion of the magnet used to induce displacer translation.
Figure 19:
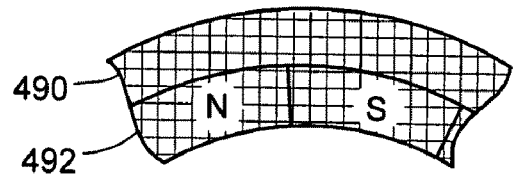
FIG. 19 shows an enlargement of the inner portion of the magnet region defined in FIG. 17. It shows the spin motor magnet polarity.

FIG. 15 is a conceptual drawing of a permanent magnet, displacer-drive system. It comprises a stationary, spin-coil assembly 480; stationary, linear-drive-coil assembly 482; Hall sensors 483; displacer-permanent-magnet cylinder 484; cold chamber 270; closed-container structure 264; displacer structure 262; and hot chamber 276. FIGS. 16, 17, 18 and 19 describe the thick-walled-cylinder permanent magnet magnetized to create magnetic poles for the spin motor on the inside and the drive motor on the outside. FIG. 16 comprises a section view of the permanent magnet 484 and FIG. 17 is a section view defined in FIG. 16. FIG. 18 is an enlargement defined by FIG. 16 and FIG. 19 is an enlargement defined by FIG. 17. These figures show the magnetized region consisting of ring-shaped poles 490 and the magnetized region of bar-shaped poles 492.

Drive-coil windings and position sensors include a three-phase winding or a two-phase, push-pull winding for the linear drive force and these include one or more electrical position transducers or electro-optical position transducers. FIG. 20 shows a segment of the stationary, linear-drive coil assembly with a two-phase, push-pull winding that induces longitudinal motion. FIG. 20 comprises a stationary, drive-coil assembly 482; a permanent magnet with linear-drive magnetized regions 490 and spin-motor magnetized regions 492; leads to the phase-A coils 506; leads to the phase-B coils 508; leads to position transducer 510; phase-A drive coils with a positive polarity 494; phase-A coils with a negative polarity 496; phase-B drive coils with a positive polarity 498; phase-B coils with a negative polarity 500; and a position-transducer coil 502. FIG. 21A shows a two-phase, push-pull, spin-drive-motor configuration using 6 permanent-magnet rotor poles, 12 stator poles and 2 Hall sensors. FIG. 21B is a basic circuit for a two-phase, push-pull, brushless DC motor.

Another type of displacer drive uses a sound speaker like coil and magnet system as shown in FIGS. 22A and 22B. Section 3.9 gives a description of this displacer drive.

3.11 Electromagnetic, Displacer-Drive System

Figure 23:
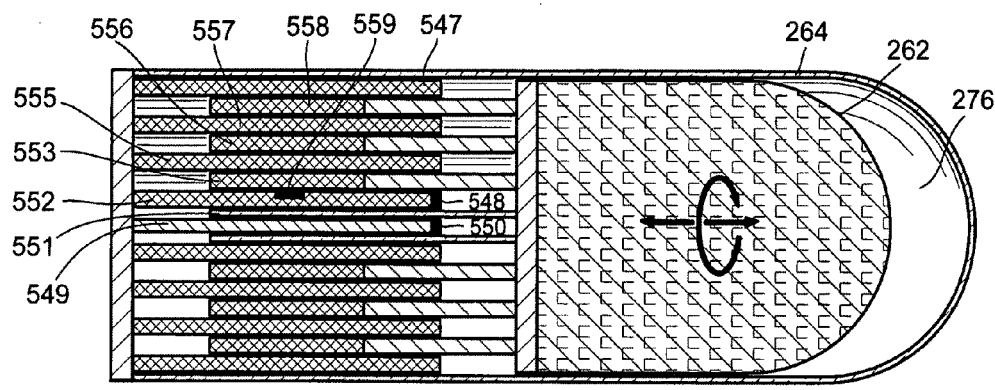
FIG. 23 shows a descriptive drawing of the invention with the embodiments of a displacer and closed container where spin and translation are electromagnetically induced, but does not use a permanent magnet. A linear brushless motor and a spin brushless motor in essence drive the displacer.

The electromagnetic, displacer drive is in essence a brushless, linear motor when it accelerates the displacer and a brushless, linear generator when it decelerates the displacer. Gas-dynamic forces associated with compression at either end of the stroke decelerates the displacer; however, electromagnetic, decelerating forces can shape the overall, decelerating force into a sinusoidal shape as part of a vibration-control system described below. FIG. 23 gives a conceptual description of the electromagnetic, displacer drive and comprises a set of nested, stationary cylinders 547, 557, 555, 552 and 549; a set of nested cylinders attached to the displacer and interlaced with the stationary cylinders 558, 556, 553 and 551; and displacer position sensor including a lamp 548, longitudinal slit 551, light receiver 550 and Hall sensors 559.

The electromagnetic, displacer-drive system has one moving part, e.g., the displacer. The displacer, levitated on a gas bearing, uses electromagnetic forces to induce oscillatory longitudinal motion. Therefore, no surface contact is required. The displacer speed is thermal limited, i.e., overheating of the drive coils limits the system speed. The drive system of the displacer consists of a set of nested cylinders, which during operation causes high velocity helium or hydrogen or nitrogen to move across the surface, resulting in a high capacity, coil-cooling system. Thus, this arrangement is suited to high-performance operation. This cooling function also retards the displacer; however, the largest retarding force is typically associated with the pressure drop across the regenerator. As described above, the displacer uses gas-dynamic forces to bounce off the ends of the closed-containment structure. Displacer retarding forces include the pressure drop across the regenerator and drive coil forces. Here the coils dissipate regenerator energy only as part of a vibration-control system. The resulting electrical energy can be stored in a capacitor and reused, or dissipated in a resister. It follows that minimizing displacer weight reduces displacer kinetic energy and improves efficiency.

Figure 24:
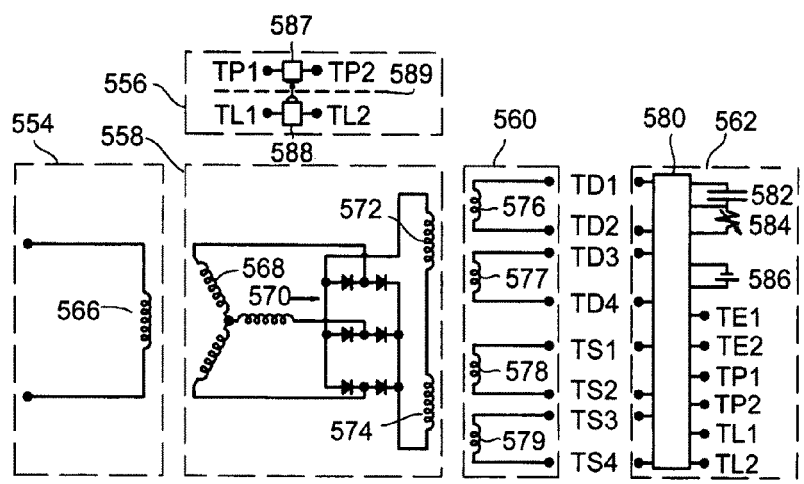
FIG. 24 shows a wiring schematic of the concept described in FIG. 23.

FIG. 24 is a wiring and position-sensor schematic for the electromagnetic, displacer-drive system. The elements in the figure are grouped into five blocks, e.g.: (1) the stationary-exciter circuit group 554 that includes the exciter winding 566 which induces power in the displacer circuits; (2) the displacer-mounted circuit group 558 comprising a three-phase exciter winding 568, a solid-state rectifier bank 570, a displacer-mounted, translation-drive winding 572, and a displacer-mounted, spin-drive winding 574; (3) the stationary, translation-circuit and spin-circuit group 560 comprising phase A translation drive windings 576, phase B translation drive windings 577, phase A spin drive windings 578, and phase B spin drive windings 579; (4) the group comprising the external controller, power-conditioning circuits, power supply and spin-drive circuits similar to those in FIG. 21 562; and (5) displacer-position-sensor group 556 comprising a lamp 588, a light receiver 587 and a translation slit 589.

The stationary-exciter coil 566 in FIG. 24 corresponds to the cylinder 552 in FIG. 23. The stationary exciter forms a set of magnetic poles on the cylinder 552. It has two modes of operation, e.g., the spin-starting mode and the spin-running mode. If the displacer is rotating, a DC current in the stationary-exciter coils 566 will induce a current in the three-phase, displacer exciter winding 568 which is rectified through the rectifier bank 570 and then delivered as a uniform DC current through displacer, spin windings 574 and displacer, drive windings 572. An AC current in the exciter winding 566 induces a current in the displacer spin and drive windings when the displacer is not spinning. Thus, an AC exciter current initiates displacer spinning and is then switched to a DC current. The stationary-spin windings 578 and 579 form part of a two-phase, push-pull spin motor and the stationary-translation windings 576 and 577 form part of a two-phase, push-pull translation drive.

The capacitor 582 stores electrical energy extracted from the displacer kinetic energy during deceleration and then reused. A resister 584 also dissipates kinetic energy. By shaping the acceleration curve to a sinusoidal shape, the task of noise and vibration reduction is simplified (no harmonic frequencies). Generally, any acceleration curve shaping will reduce operating efficiency slightly; however, this can sometimes be justified in order to achieve optimal noise and vibration reduction.

Figure 25:
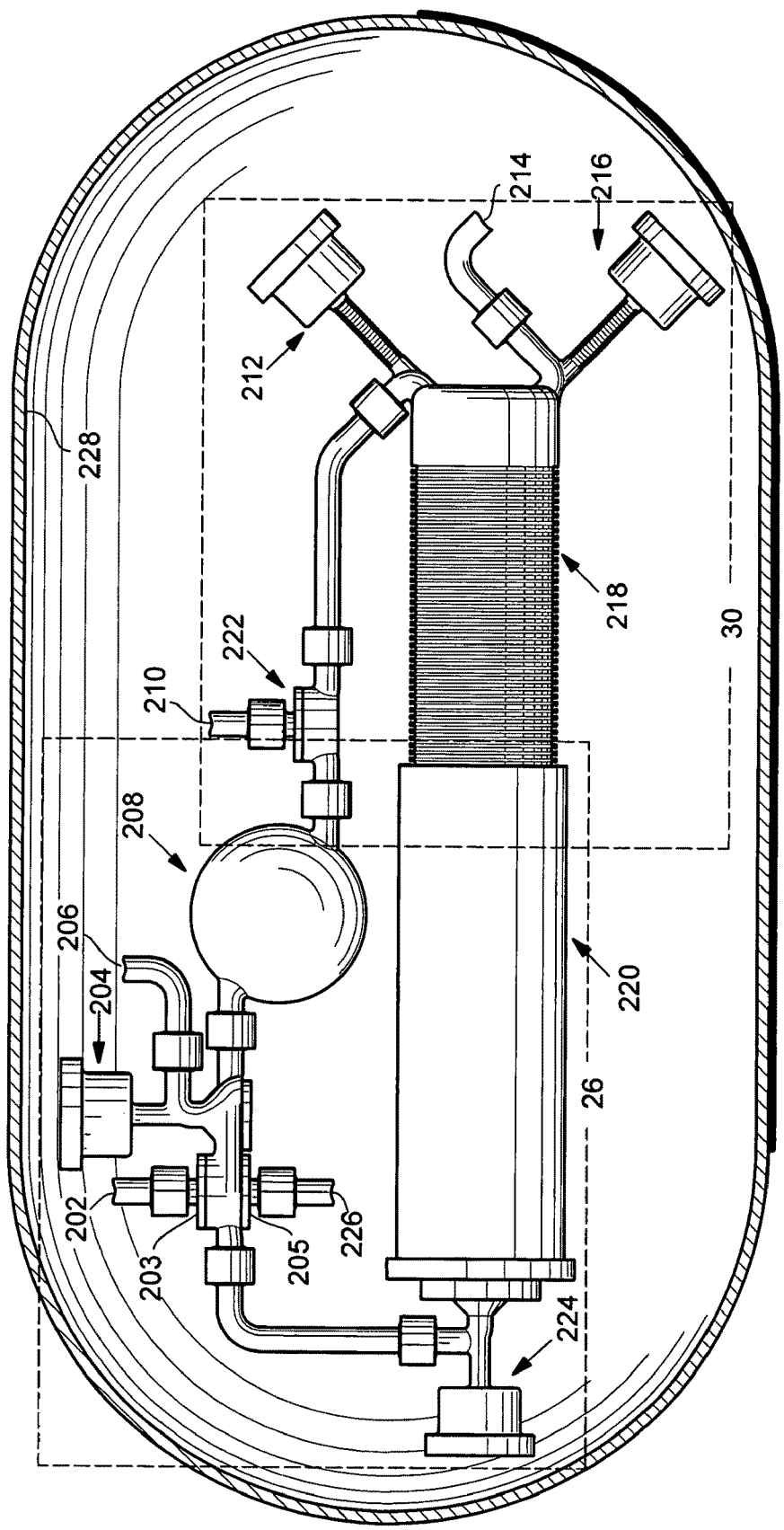
FIG. 25 is a descriptive elevation of elements of the invention including (1) an electromagnetic displacer drive and closed container assembly, (2) the valves and connectors required by a decoupled heater and decoupled cooler, (3) a set of valves used to induce a gas dynamic bounce at the end of a stroke, (4) an external pressurized ceramic cylinder which contains the displacer, (5) a high performance regenerator and (6) a pressurization chamber.
Figure 26:
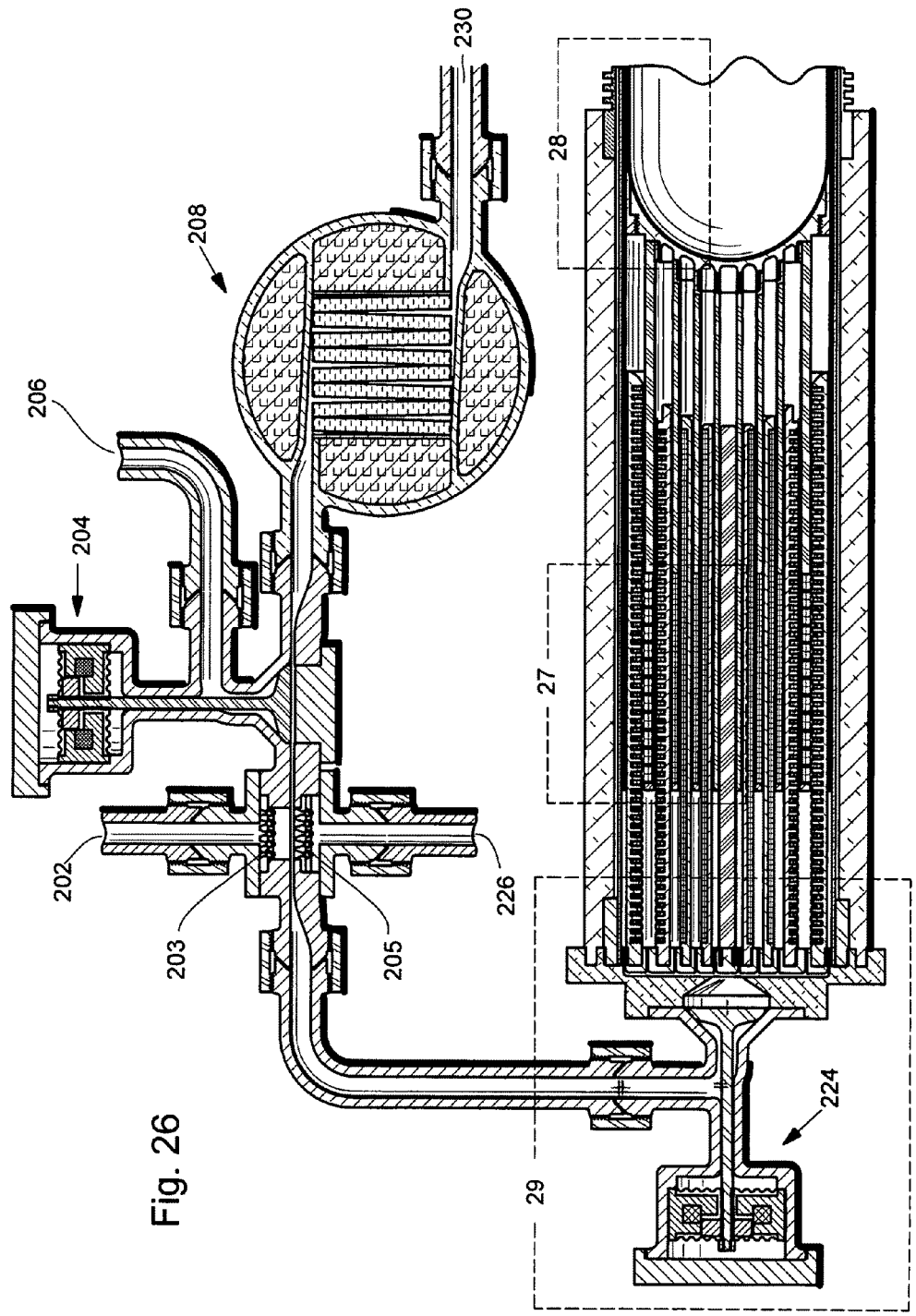
FIG. 26 shows an enlargement and section view of the aft coil region indicated in FIG. 25.
Figure 27:
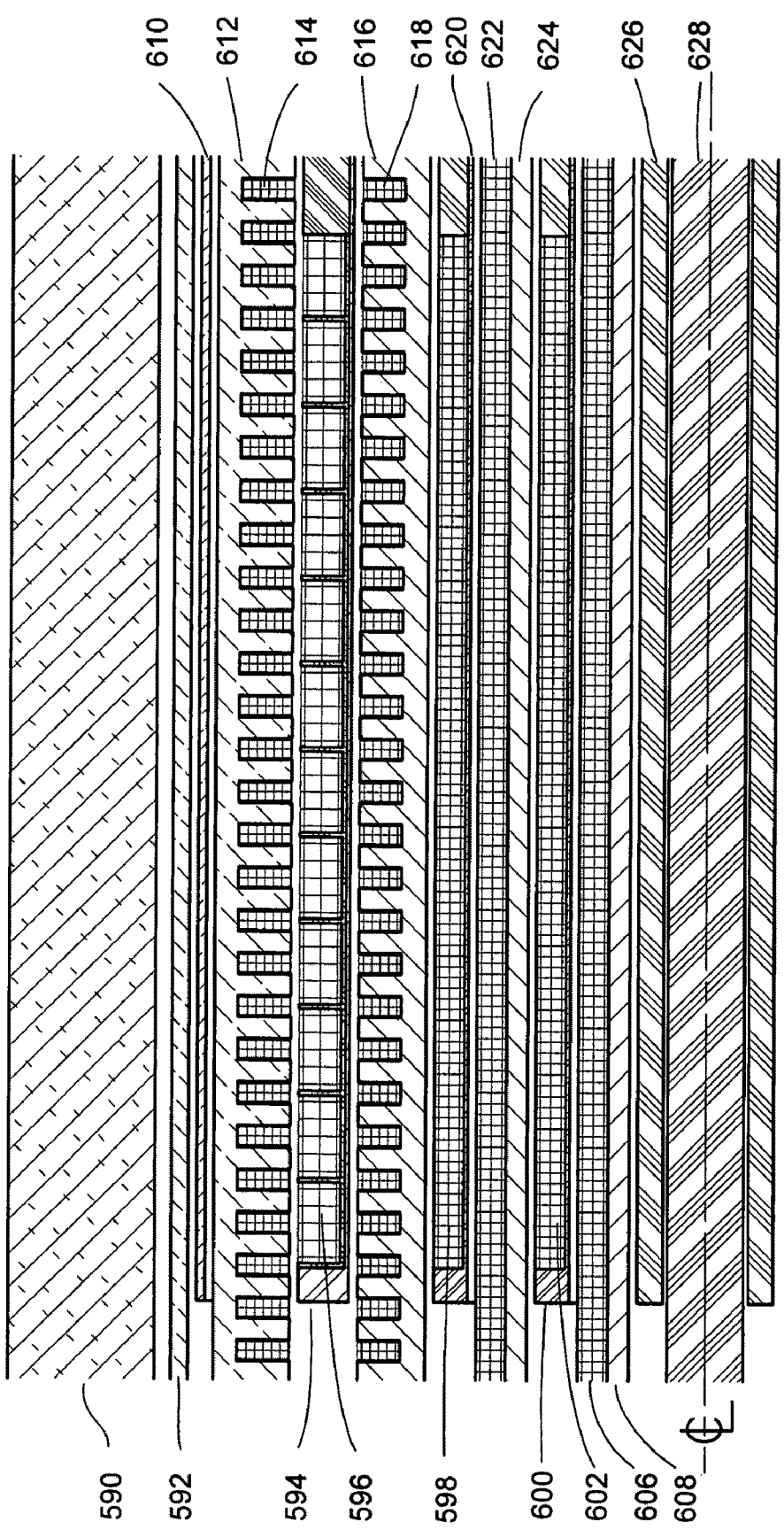
FIG. 27 shows an enlargement of the aft coil region indicated in FIG. 26.
Figure 28:
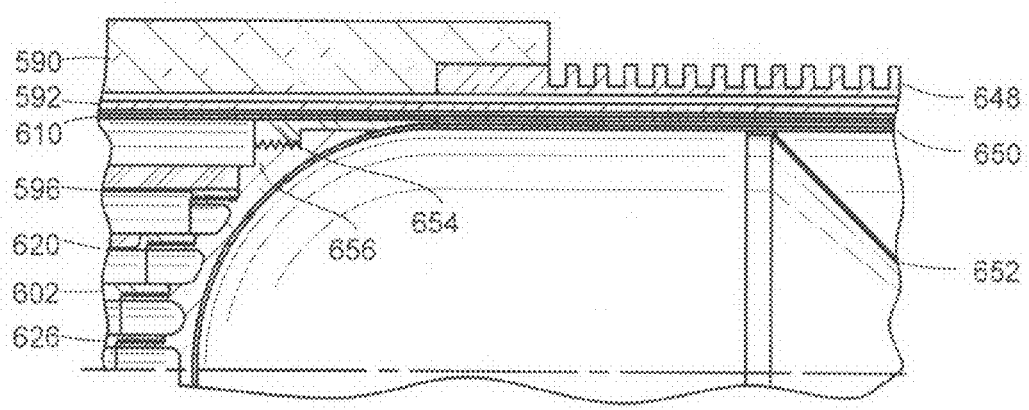
FIG. 28 shows an enlargement of the mid displacer region indicated in FIG. 26.
Figure 29:
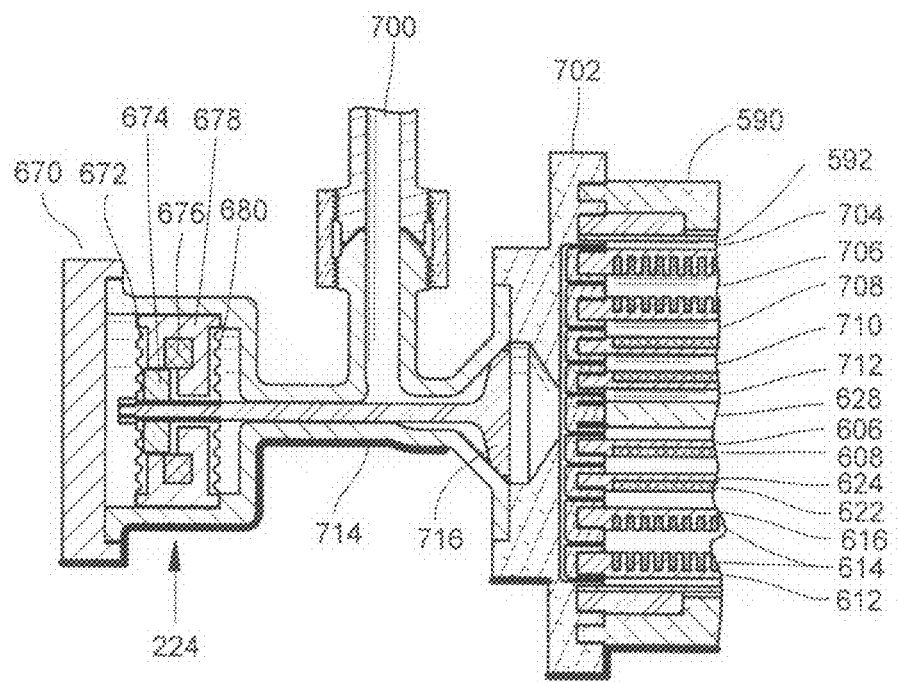
FIG. 29 shows an enlargement of the aft coil and bounce valve region indicated in FIG. 26.
Figure 30:
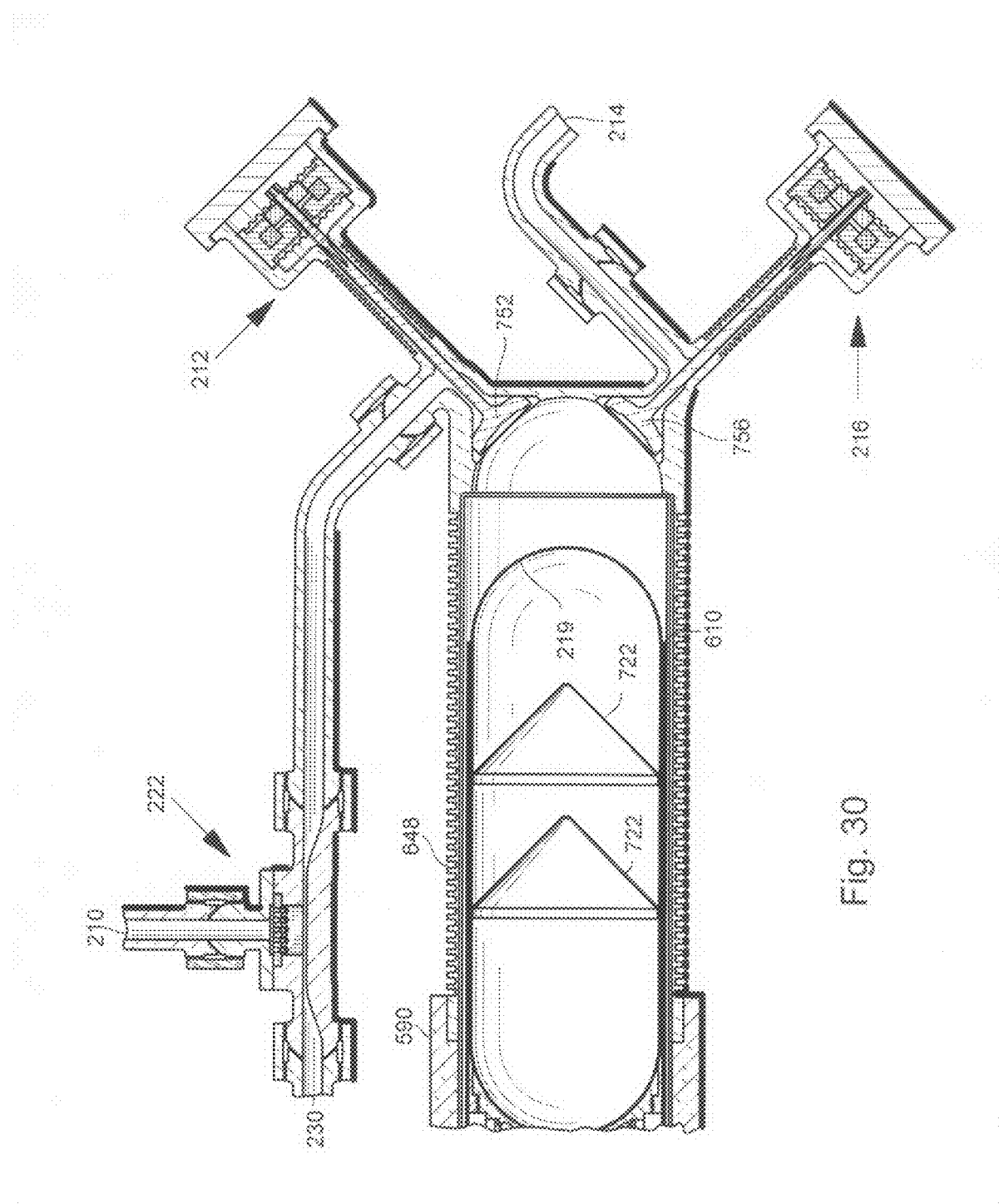
FIG. 30 shows an enlargement and section view of the hot chamber end indicated in FIG. 25.

FIG. 25 presents a section view of an electromagnetic-drive, thermal-compressor assembly. This figure is descriptive and not an engineering drawing. FIG. 25 includes the hot, closed-container segment 218; the cold, closed-container segment 220; valves 212, 216, 203, 204, 205, 222 and 224; regenerator 208; pressurization vessel 228; the discharge to the heater 214; the return from the heater 210; the discharge to the cooler 206; the intake from the low-pressure tank 202; the discharge to the high-pressure tank 226. FIGS. 26 and 30 are section views and enlargements defined in FIG. 25. FIGS. 27, 28 and 29 are enlargements defined in FIG. 26. FIGS. 25, 26 and 30 callouts correlate to those in FIG. 4A. Thus the gas intake 226 receives gases coming from the low-pressure tank 318; the gas discharge 202 sends gases to the high-pressure tank 322; the cooler, solenoid poppet valve 204 corresponds to the schematic valve 340; the cold-chamber, bounce poppet valve 224 corresponds to the schematic valve 347; the intake, check valve 203 corresponds to the schematic valve 268; the discharge, check valve 205 corresponds to the schematic valve 272; the return check valve 222 coming from the heater corresponds to the schematic valve 342; the heater, solenoid poppet valve 212 corresponds to the schematic valve 344; the regenerator, solenoid, poppet valve 216 corresponds to the schematic valve 348; the gas discharge 214 discharges gas from the hot chamber 276 to the heater 304; and the heater gas return is 210. The pipe outlet in FIGS. 26 and 30 designated by 230 are connected. A description of valve and regenerator details appears below.

FIG. 27 is an enlargement defined by FIG. 26 and comprises the ambient, closed-containment structure 590; the cylindrical, stationary, integral, small-clearance seal and gas bearing 592; displacer-mounted, seal and bearing cylinder 610; outer, stationary, translation-drive iron core 612 and windings 614; displacer-mounted, winding support structure 594; displacer-mounted winding 596; inner, stationary, translation-drive iron core 616 and winding 618; displacer-mounted, coreless-spin-motor winding 598; displacer-mounted, spin-motor-winding support structure 620; spin-motor stator winding 622; displacer-mounted, coreless, exciter-winding support structure 600; displacer-mounted, coreless, exciter winding 602; stationary, exciter winding 606; stationary, exciter iron core and lamp support 608; cylindrical, optical-slit support structure 626; and light-receiver support rod 628.

FIG. 28 is an enlargement defined by FIG. 26 and comprises the cold, closed-container segment 590; hot, closed-container segment 648; the cylindrical, stationary, integral, small-clearance seal and gas bearing 592; displacer-mounted, seal and bearing cylinder 610; displacer-mounted, seal and bearing cylinder, attachment ring 654; displacer-mounted, drive-attachment structure 656; displacer-mounted, translation-drive-winding support structure 596; displacer-mounted, coreless, spin-motor-winding support structure 620; displacer-mounted, exciter-winding support structure 602; displacer-mounted, optical-position-sensor, slit cylinder 626; a radiation cone 652; and a displacer, ceramic, vacuum bulb 650.

FIG. 29 is an enlargement defined by FIG. 26 and comprises a cold-chamber, bounce valve 224; a valve cover 670; upper, corrugated, disk spring 672; valve-stem, magnetic iron 674; solenoid winding 676; solenoid back iron 678; lower, corrugated disk spring 680; poppet valve 716; valve casing structure 714; cold-chamber port 700; closed-container, cold-chamber back plate 702; ambient-temperature, closed-containment structure 590; cylindrical, stationary, integral, small-clearance seal and gas bearing 592; the gap that accommodates the displacer-mounted, seal cylinder 704; the gap that accommodates the displacer-mounted, translation, drive winding 706; the gap that accommodates the displacer-mounted, spin-motor winding 708; the gap that accommodates the displacer-mounted, exciter winding 710; the gap that accommodates the displacer-mounted, position-sensor, slit cylinder 712; back-plate-mounted rod which supports the position-sensor light receiver 628; back-plate-mounted, exciter-winding support structure 606; back-plate-mounted exciter winding 608; back-plate-mounted, spin-motor-winding support structure 624; back-plate-mounted, spin-motor winding 622; back-plate-mounted, translation, inner-drive, core iron 616; back-plate-mounted, translation, outer-drive, core iron 612; back-plate-mounted, translation, drive winding 614; and back-plate-mounted, translation, inner-drive, core iron 616.

FIG. 30 is a section view of the high-temperature end of the displacer and closed container, comprising a vacuum bulb 219; an integral, small-clearance seal and gas bearing 610; two radiation cones 722; high-temperature end of the closed container 648; low-temperature end of the closed container 590; heater return check valve 222; regenerator solenoid poppet valve 212; heater solenoid poppet valve 216; discharge-to-heater pipe 214; regenerator, solenoid, poppet-valve stem 752; and heater, solenoid, poppet-valve stem 756. The vacuum bulb uses a vacuum in order to eliminate convective heat losses and requires a refractory material with a low coefficient of thermal conductivity such as refractory mullite. The two radiation cones with highly reflective surfaces essentially eliminate radiation heat losses. The radiation cones also require refractory material, although the temperature and stress requirements are less demanding, and Pyroceram is used. To insure low radiation losses the interior of the vacuum bulb and both sides of the radiation cones should receive a vapor deposited metallic coating. The interior temperature of the vacuum bulb will typically be below 1000° C. and consequently the reflective surface is copper since almost all the reflective energy will be in the infrared portion of the spectrum.

3.12 Balancing Systems for Electromagnetic Drive TCs

Figure 31A:
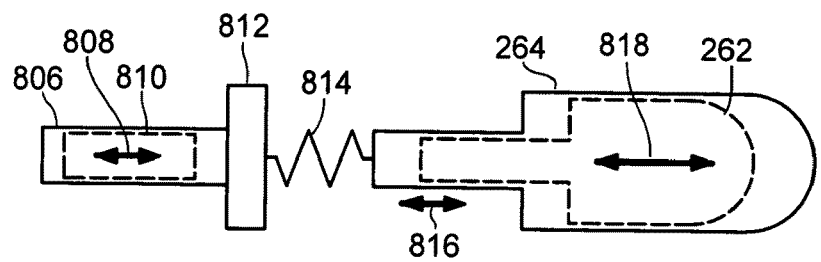
FIG. 31A shows a schematic of an active, vibration-mitigation system used with an electromagnetic-drive thermal compressor.

FIG. 31A is a schematic of an active, vibration-mitigation system that can be used with any of the electromagnetic-drive thermal compressors. In essence, the active damper induces a vibration that cancels the vibration caused by the displacer. The schematic in FIG. 31A comprises a closed container and drive coil structure 264 that interacts with the displacer and is subjected to longitudinal motion 816, a displacer and drive coil assembly 262 that interacts with the closed container structure and is subjected to longitudinal motion 818, a vibration isolation spring 814 that is attached to the closed container structure 264 and system support plate 812, an active damper drive coil and structure 806, and an active damper armature 810 that is subjected to longitudinal motion 808. By making the spring 814 soft, the force transferred from the closed container structure 264 to the system support plate 812 is small and the mass of the active damper armature 810 required to nullify system vibrations is small.

Figure 31B:
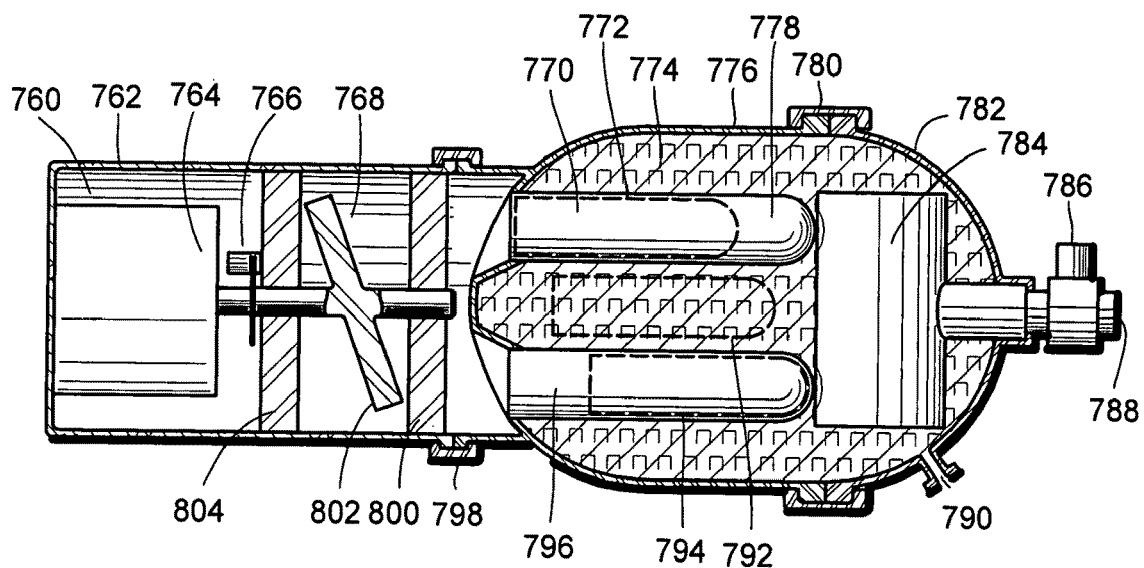
FIG. 31B shows an integrated, gas-compressor system assembly comprising four electromagnetic-drive thermal compressors; a heater; a tilted-disk, vibration-mitigation subsystem; and a pressurization vessel.

FIG. 31B is a section view for an integrated, gas-compressor, system assembly using four electromagnetic-drive TCs; a heater; a pressurization vessel; and a tilted-disk, vibration-mitigation subsystem. This figure is a concept drawing and does not include many details. This figure shows the invisible lines for three displacers. FIG. 31B comprises a tilted-disk, drive-motor chamber 760; vibration-mitigation-system, containment vessel 762; tilt-disk drive motor 764; angular-position sensor and slit disk 766; tilt-plate chamber 768; aft, tilt-plate, shaft, bushing support plate 804; front, tilt-plate, shaft, bushing support plate 800; tilt plate 802; aft clamp 798; closed-container structure 778 and 796; displacers 770, 792 and 794; insulation 774; aft section of pressurization vessel 776; front clamp 780; front section of pressurization vessel 782; heater 784; heater intake 786; heater exhaust 788; and pressurized-chamber intake port 790. If the four displacers have a sinusoidal motion and are circumferentially sequenced 90° out of phase, then the tilt plate can effectively nullify displacer-based vibrations.

3.13 Crank-Drive, TC Assembly

Figure 32:
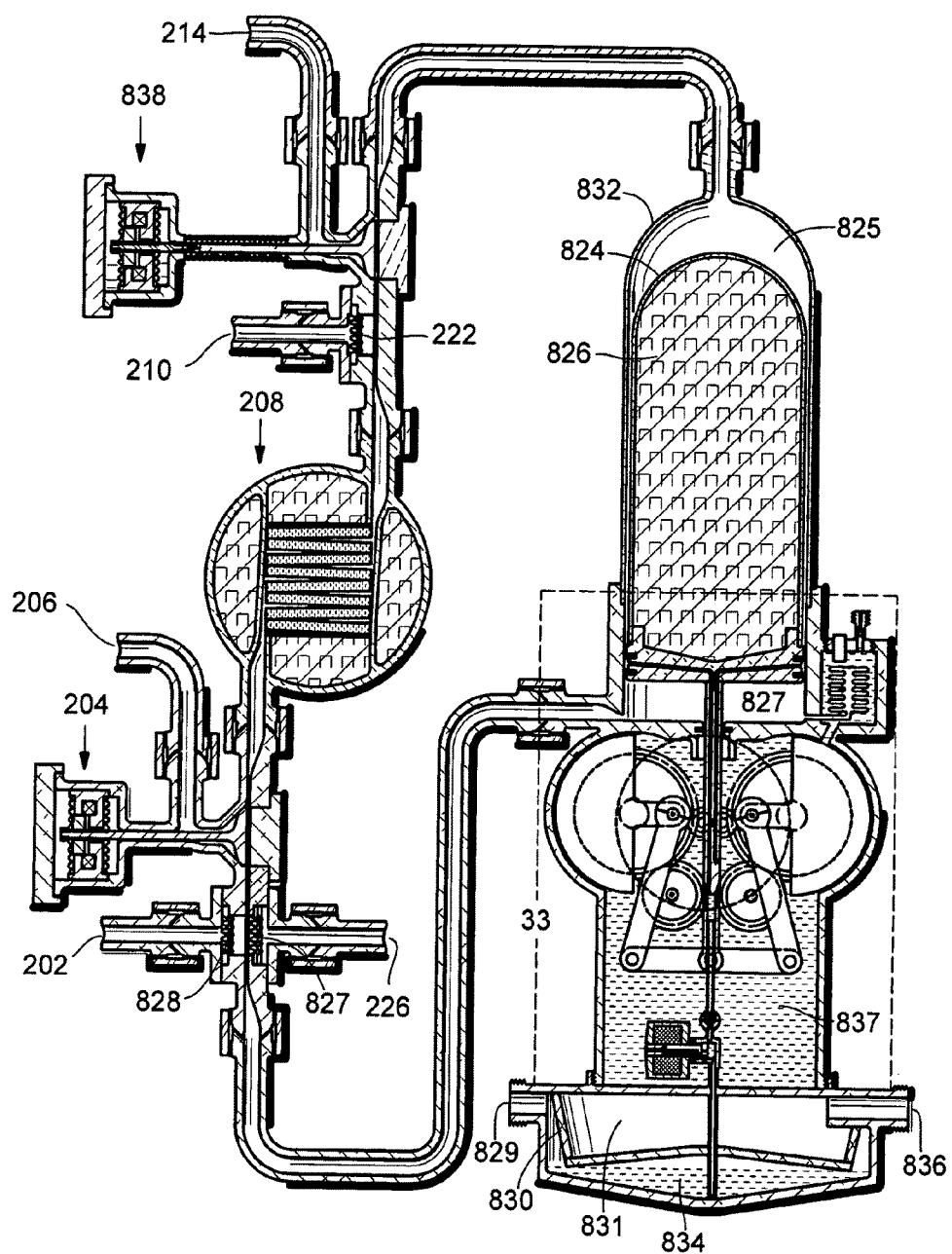
FIG. 32 is a section view of the invention with the embodiments of a crank-driven displacer that obviates the problem of high-pressure seals by using a bellow that equalizes the pressure between the cold displacer region and the crankcase.

FIG. 32 describes a TC together with its valves, regenerator and drive system. The system incorporates a symmetric-double-crank displacer drive. The configuration eliminates vibrations associated with the primary frequency and the second harmonic. The displacer seal uses seal rings and pressurized oil. An oil pump that uses two check valves and is integral to the push rod is used. The push rod uses seal rings. This configuration uses a pressure balance subsystem described in Section 3.4, which effectively prevents a pressure differential between the cold chamber 827 and the crankcase pressure 837. The elements in FIG. 32 conform to the schematic in FIG. 6.

FIG. 32 comprises an oil sump 834; a high-pressure tank 832; gas-liquid separator screen 830; high-pressure tank intake 829; high-pressure tank 831; high-pressure, tank discharge 836; crank-case chamber 837; thermal-compressor, cold chamber 827; displacer insulation 826; high-temperature, displacer shell 824; high-temperature, displacer chamber 825; high-temperature, closed-container shell 832; discharge-to-heater 214; heater, poppet valve 838; heater-return pipe 210; heater-return check valve 222; regenerator 208; discharge-to-cooler 206; cooler poppet valve 204; gas-intake pipe 226; intake check valve 227; discharge check valve 828; and discharge pipe 202.

Figure 33:
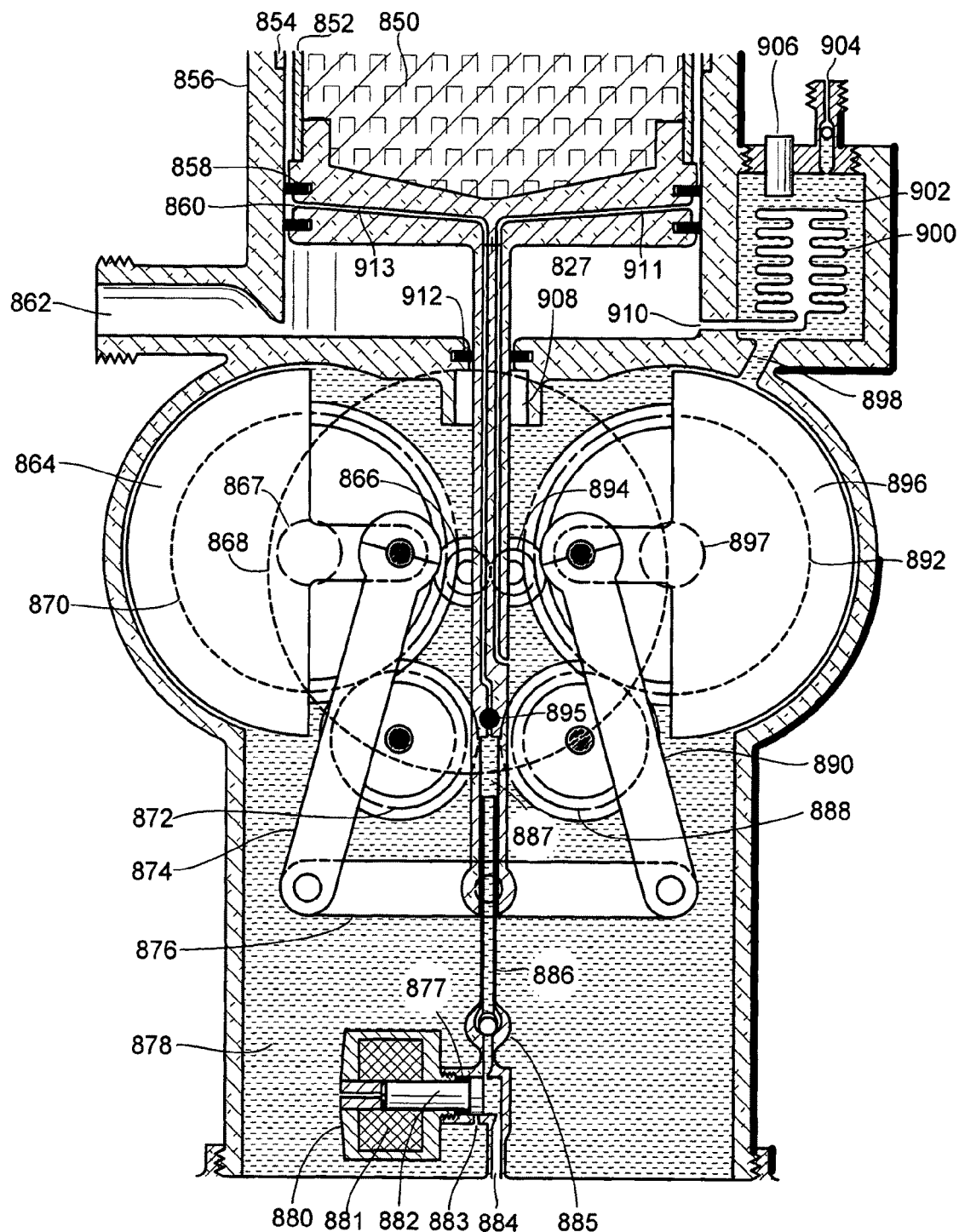
FIG. 33 shows an enlargement of the region indicated in FIG. 32.

FIG. 33 is an enlargement defined in FIG. 32 and comprises a crankcase, gas-discharge check valve 904; bellow sensor 906 used to activate the oil crankcase, refill, solenoid valve when the bellow contacts the sensor; bellow chamber 902; pressure-balance bellow 900; bellow gas intake 910; bellow-chamber oil intake 898; right crank and counter weight 896; left crank and counter weight 864; right-crankshaft 897; left-crankshaft 867; right-crank drive gear 892; left-crank drive gear 870; transfer gear 894; motor-drive gear 866; drive motor 868; right-connecting rod 890; left-connecting rod 874; crank cross bar 876; crankcase casting 856; displacer seal ring 858; cold chamber 827; ring-seal, oil-feed path 913; ring-seal, oil-return path 911; closed-container, high-temperature shell 854; displacer, high-temperature shell 852; displacer insulation 850; crankcase chamber 878; refill, solenoid-valve yoke 880; solenoid-valve coil 881; valve stem 882; valve-return spring 877; crankcase-oil intake 883; intake from oil sump 884; oil-pump-intake check valve 885; oil-pump-discharge check valve 895; oil-pump plunger and oil-feed pipe 886; and oil-pump interior cavity 887.

3.14 High-Performance, Ceramic Regenerator

A regenerator is a vessel containing a porous media and a path though the media. It absorbs heat from one cycle and uses it for the subsequent cycle. The porous media is a solid with a surface area portion $A_1$ over where hot gas enters the media and a surface area portion $A_2$ over where cold gas exits the media. Let $A=(A_1+A_2)/2$, i.e., A is the average of the two areas and will be referred to as the regenerator area. Let L, called the regenerator length, designate the average distance between the point at which a gas particle enters the porous media and the point at which it exits. Let $\Delta P$ designate the pressure drop across the regenerator. Let $v_1$ be the gas velocity just before it enters the media at surface $A_1$ and let $v_2$ be the gas velocity just as it leaves the media at surface $A_2$. The absolute temperature of the hot side of the regenerator can be four times that of the cold side. The velocity of a gas particle as it moves through the regenerator is approximately proportional to its temperature. Let v be the average velocity of the gas particle as it passes through the regenerator. The equation in FIG. 65 gives the pressure drop in porous materials due to gas flow. If we let q be the average volume flow rate of the gas through the regenerator, then q=Av. It follows that for a fixed flow rate $\Delta P$ decreases as L decreases and A increases. As L decreases, thermal-conduction heat loses increase, and an optimal design balances these loses.

Figure 34:
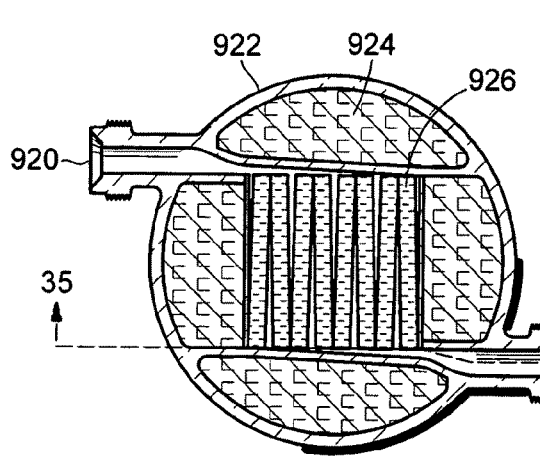
FIG. 34 shows a section view of a high-performance regenerator that has a large presented area achieved by means of a folded, heat-absorbing-media configuration. It has a short effective length and thus can rapidly absorb a large amount of heat while maintaining a low-pressure drop.
Figure 35:
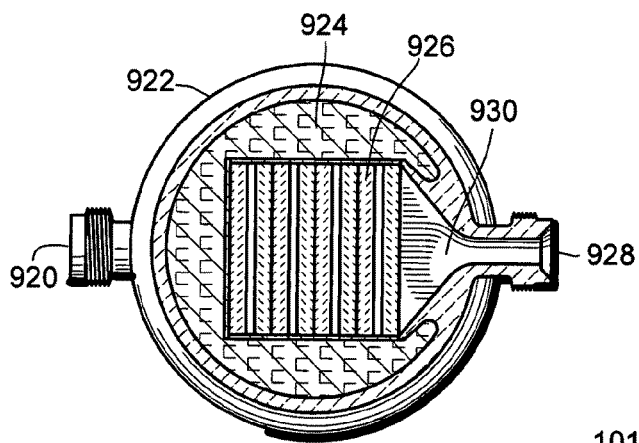
FIG. 35 shows the section of the high performance regenerator indicated in FIG. 34.

FIG. 34 is a section view of a high-performance regenerator and FIG. 35 is a section defined by FIG. 34. FIGS. 34 and 35 comprise a spherical ceramic shell 922, externally pressurized so that the stresses in the sphere are always in compression; insulation 924; low-temperature inlet 920; high-temperature inlet 928; eight segments of heat-absorbing media 926; and the high-temperature inlet fan 930. The heat absorbing media is a square plate of thickness L and area A/8. Thus, the eight heat-absorbing plates have a total gas throughput area of A.

The regenerator can perform the additional function of an oxidation catalytic converter by depositing particles of catalytic material on the heat absorbing material. Typically, noble metals are used for this purpose. A mixture of platinum and palladium is most commonly used.

3.15 Valve Assembly

Figure 36:
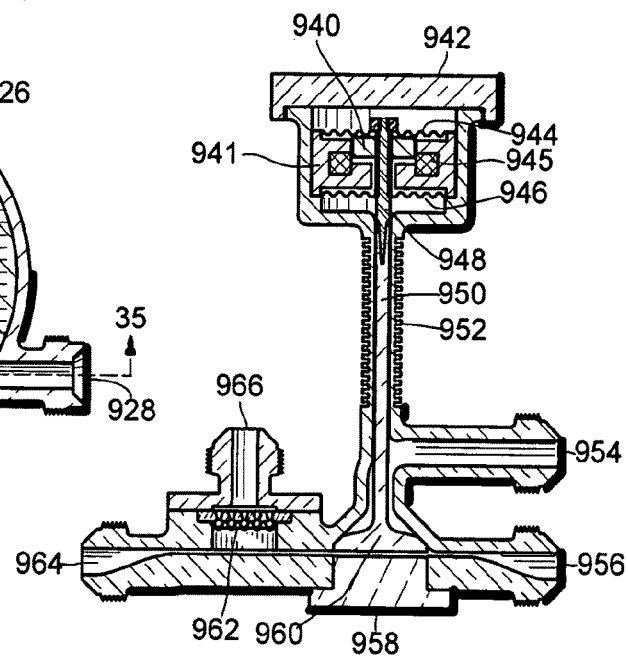
FIG. 36 shows the section for a high temperature ceramic heater valve set that uses a single electromagnetic actuator. It diverts gases through or around the heater, incorporates a dual position poppet valve and incorporates a check valve. This valve set appears in FIGS. 25 and 32.
Figure 37:
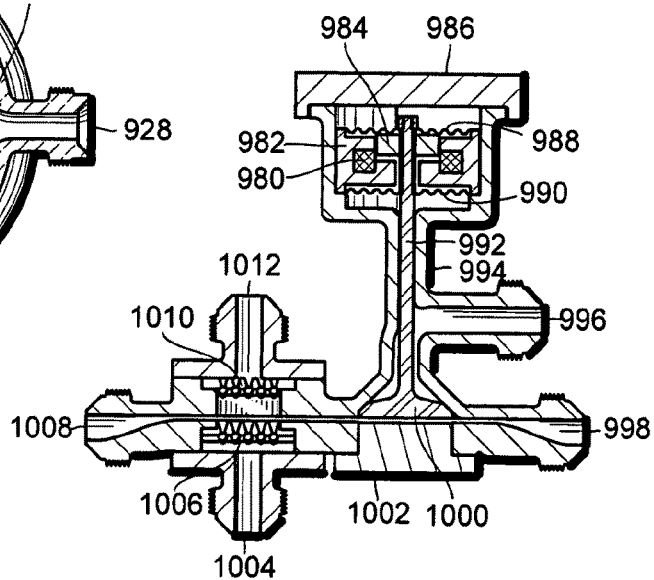
FIG. 37 shows the section for a valve set that uses a single electromagnetic actuator used to divert gases to the cooler and incorporates two compressor check valves. This valve set appears in FIGS. 25 and 32.

FIGS. 36 and 37 are enlargements of valve assemblies shown in FIG. 25. FIG. 32 is a ceramic valve assembly and corresponds to the FIG. 32 valve callout 838, and FIG. 37 is a metallic valve assembly and corresponds to valve callout 204 in FIGS. 25 and 32.

The ceramic valve assembly in FIG. 36 minimizes heat flow along the valve stem 950 and stem case 952 by minimizing the area through which heat flows, increasing the length of the stem and using materials with a low coefficient of thermal conductivity. FIG. 36 comprises a valve cover 942; upper, corrugated, disk spring 944; valve-stem iron 940; solenoid winding 945; solenoid back iron 941; lower, corrugated, disk spring 946; upper, steel, valve-stem rod 948; ceramic, valve-stem rod 950; valve case 952; heater, discharge pipe connector 954; thermal-compressor, hot-chamber pipe connector 956; valve-access cover 958; poppet valve 960; check valve 962; regenerator pipe connector 964; and heater, return-pipe connector 966.

The metallic valve assembly in FIG. 37 comprises a solenoid winding 980; back iron 982; valve-stem iron 984; upper, corrugated disk spring 988; lower, corrugated disk spring 990; valve stem 992; valve-assembly body 994; pipe-connector for pipe that discharges to cooler 996; pipe-connector for pipe that discharges to regenerator 998; poppet valve 1000; valve-access cover 1002; pipe-connector for pipe that discharges to low-pressure tank 1004; thermal-compressor, discharge check valve 1006; pipe-connector for pipe that connects to thermal-compressor cold chamber 1008; thermal-compressor, intake check valve 1010; and pipe-connector for pipe that discharges to high-pressure tank 1012.

3.16 Efficient Low-Emission Heater

Figure 38:
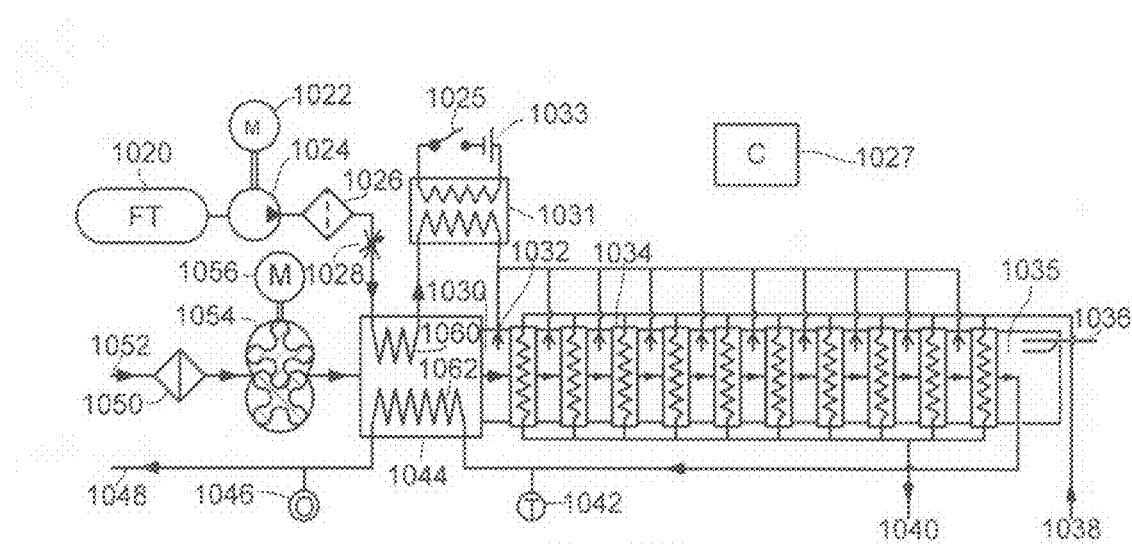
FIG. 38 shows a schematic for a heater that uses staged combustion in order to limit peak combustion temperatures while consuming most of the oxygen.

FIG. 38 is a schematic for a heater with very low emissions, high efficiency (heat transferred to working fluid)/(heat available in fuel), and low specific volume (heater volume)/(rated power).

Emissions are controlled by (1) limiting the combustion temperature to a value below where significant $NO_x$ compounds are formed and below where dissociation of $CO_2$ occurs in large amounts, (2) requiring combustion to occur with a significant excess of oxygen, (3) maintaining products of combustion at an elevated temperature for a significant time so that combustion of all fuel elements is essentially complete, and (4) lowering the temperature of the products of combustion slowly so that dissociation of $CO_2$ does not result in significant residual CO in the exhaust products.

To estimate relative exhaust NO levels as a function of combustion temperature consider the equation given in FIG. 66. A nominal operating combustion temperature of the engine in this specification is 1300° K and a nominal combustion temperature for an automotive internal combustion engine is 2700° K. The $N_2$ and $O_2$ concentration levels for both engines are nominally the same, therefore, the initial NO rate of formation for the engine in this specification relative to an automotive internal combustion engine as shown in FIG. 66 is $1.55 \times 10^{-12}$. Thus, the NO formation rate is insignificant and, unlike an automotive internal combustion engine, no catalytic converter is required to control $NO_x$ compounds.

To achieve a high efficiency, exhaust gases are used to preheat the intake air to a temperature above that required for spontaneous combustion with fuel. Adding fuel increases the temperature to the operating combustion temperature. Each combustion stage typically uses less than 10% of available oxygen. These heated gases then pass through a heat exchanger module, which will heat the thermal compressor working fluid as it cools the products of combustion. The repeated sequence adds fuel to increase the combustion temperature and then transfers heat with a heat exchanger module, to the working fluid, consuming 80% of the oxygen.

The schematic in FIG. 38 comprises a fuel subsystem with a fuel tank 1020, fuel pump 1024, fuel pump motor 1022, fuel filter 1026, and fuel adjustable flow control 1028; a fuel electrical heater 1031 which is used at start up to heat fuel to a high enough temperature so that instant combustion occurs in the combustion chamber; a switch 1025 that initiates electric fuel heating; a battery 1033 that powers the electric fuel heater; an air-feed subsystem with an intake 1052, air filter 1050, positive displacement air pump 1054 and air pump motor 1056; recuperator 1044 that transfers heat from the exhaust gases 1062 to the intake air and fuel 1060; a combustion chamber 1030 that receives preheated air from the regenerator, receives vaporized and preheated fuel also from the regenerator and through the fuel nozzle, and discharges products of combustion through the heat exchange module 1034; a series of nine additional and identical combustion chambers and heat exchange modules through which the products of combustion pass and discharge into an ignition chamber 1035; an ignition chamber with an igniter 1036 which initiates the combustion process and which receives products of combustion from the last heat exchange module and delivers them to the regenerator; a temperature sensor 1042 which measures the temperature of the products of combustion as they exit the ignition chamber and is used by the controller to regulate the fuel flow rate; an oxygen sensor 1046 which measures the oxygen level of the products of combustion just before they are discharged in the exhaust 1048 and which is used to regulate the air flow rate; and an intake 1038 for the working fluid from the thermal compressor which passes through the heat exchange modules and then is discharged back to the thermal compressor 1040.

Figure 39:
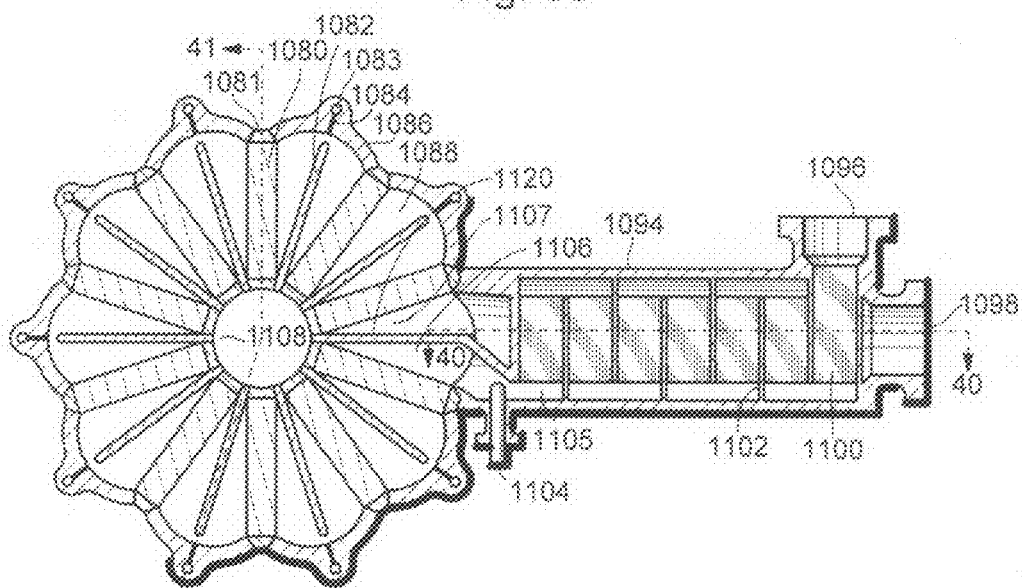
FIG. 39 shows a section view of a staged combustion heater.
Figure 40:
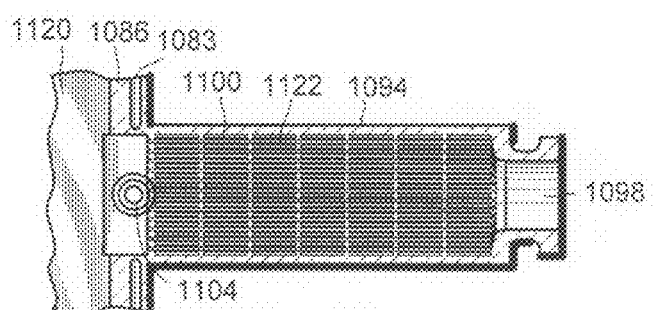
FIG. 40 shows a section view as indicated in FIG. 39.
Figure 41:
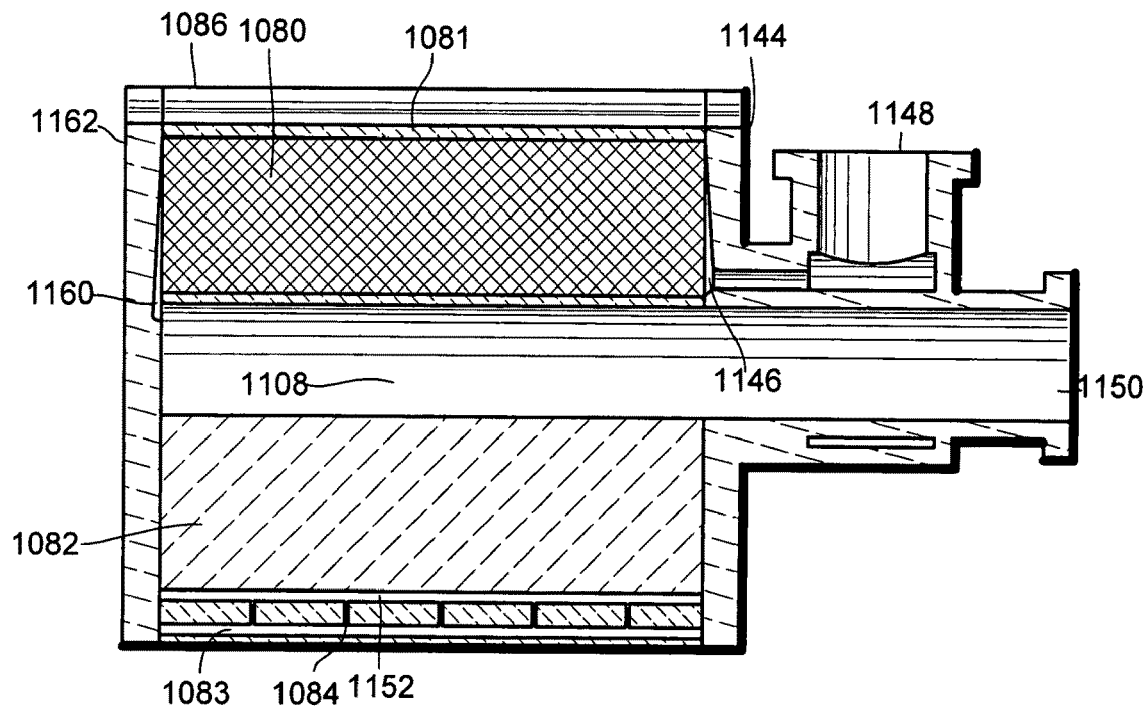
FIG. 41 shows a section view as indicated in FIG. 39.

FIG. 39 is a section view of a heater subassembly characterized by the FIG. 38 schematic and comprising an exhaust-gas, heat recuperator; ten heat exchange modules, combustion chambers and fuel injectors; and an igniter. FIG. 40 is a section of the exhaust-gas, heat recuperator defined in FIG. 39. FIG. 41 is a section view of the heater defined in FIG. 39. This heater is a monolithic structure formed by sintering a set of component parts.

The FIG. 39 heater is comprised of 10 heat exchange modules 1080; 10 baffle plates 1082 that direct gas products of combustion exiting a heat exchanger module to the fuel nozzles; 10 combustion chambers 1088; 10 fuel feed pipes 1083; 10 fuel nozzle sets 1084; 10 combustion chamber ceramic shell segment 1086; 10 heat exchanger end wedge block 1081; exhaust gas heat recuperator structure 1094; heater recuperator exhaust 1096; heater recuperator intake 1098; recuperator exhaust baffles 1102; recuperator exhaust cross channel 1100; igniter 1104; recuperator cross feed start chamber 1105; an exit chamber that feeds the recuperator 1106; an intake chamber that receives gas from the recuperator 1107; a separation plate 1120 that separates the intake; and exhaust gases; combustion-chamber and an intake tube that receives working fluid from the thermal compressor 1108.

FIG. 40 comprises a separation plate 1120 that separates the intake and exhaust gases; combustion-chamber, ceramic shell segment 1086; fuel feed pipe 1083; recuperator, exhaust cross channel 1100; intake longitudinal channels 1122; exhaust-gas-heat recuperator structure 1094; heater recuperator intake 1098; and igniter 1104.

FIG. 41 comprises a heat exchanger module 1080; a heat-exchanger, working-fluid intake channel 1160; a heat-exchanger, working-fluid discharge channel 1146; end plate 1162; intake pipe, exhaust pipe and end plate structure 1144, working-fluid exhaust pipe 1148; working-fluid intake pipe 1150; combustion-chamber ceramic shell segment 1086; heat-exchanger end wedge block 1081; baffle plates 1082; baffle-plate channel 1152; fuel nozzles 1084; and fuel feed pipes 1083.

The heat-exchanger module is a heat exchanger that transfers heat from the high temperature products of combustion typically at a pressure of one atmosphere to the thermal compressor working fluid, which is at a much higher pressure and can nominally be at 100 atmospheres. In addition, working fluids such as hydrogen can transfer heat more efficiently than the products of combustion at identical pressures. Ideally, such a heat exchanger will have a much higher area for the products of combustion to transfer heat compared to the working fluid area (nominally by a factor of 100). A unique monolithic ceramic structure formed from layers of ceramic cloth and ceramic pipe provides a large difference in area and operates at temperatures that may exceed 1100° K. The ceramic cloth fiber provides a very high surface area in a small volume.

FIGS. 42 through 46 give detailed descriptions of the heat exchanger module. This module comprises a two-element sequence of layers characterized as a ceramic cloth layer, a ceramic pipe layer, a ceramic cloth layer, a ceramic pipe layer, etc., which start and end with a ceramic cloth layer and which are sandwiched between a front and back ceramic layer. These layers are compressed and sintered to form a monolithic ceramic structure.

Figure 42:
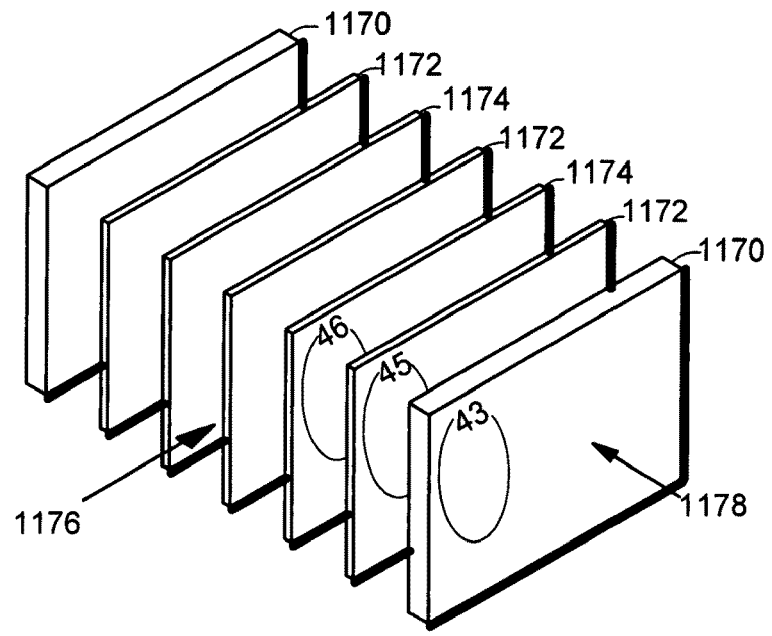
FIG. 42 shows an isometric exploded view of a high performance ceramic cloth to ceramic tube (air to working fluid) heat exchanger.
Figure 43:
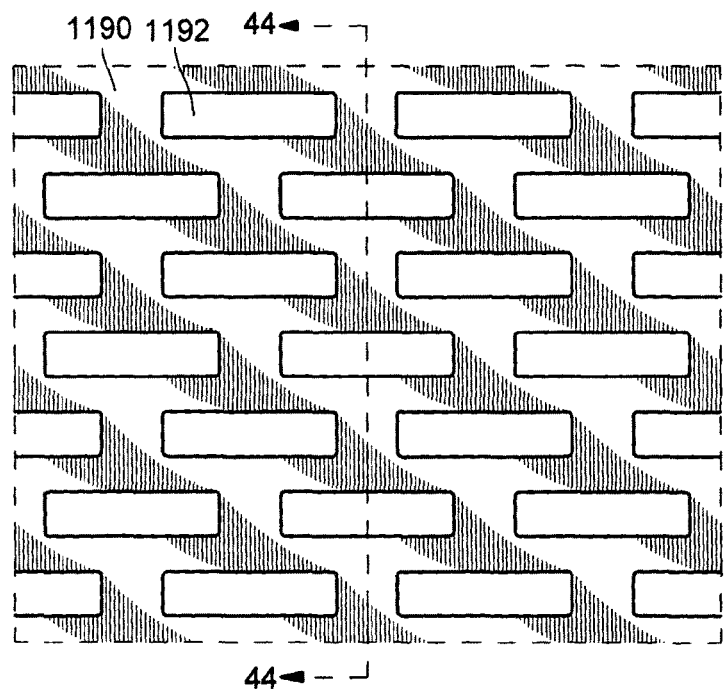
FIG. 43 shows an enlarged view of the ceramic front plate of the ceramic heat exchanger as indicated in FIG. 42.
Figure 44:
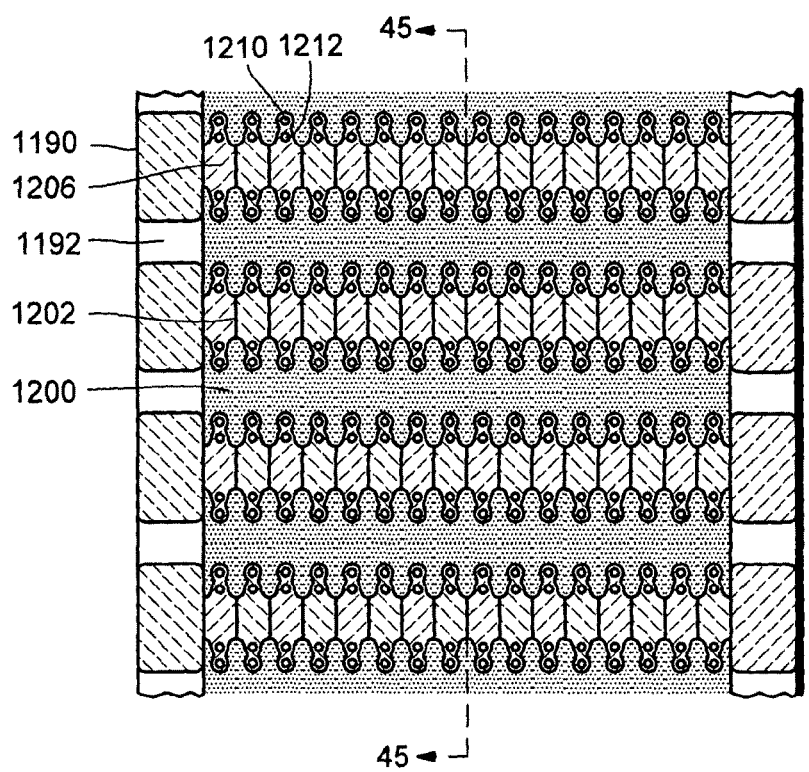
FIG. 44 shows a section view defined in FIG. 43 of the ceramic heat exchanger.
Figure 45:
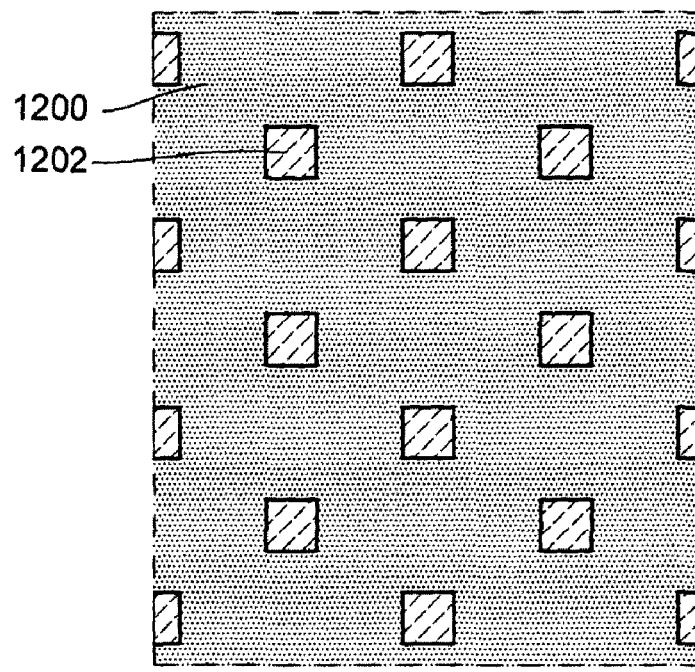
FIG. 45 shows a section view defined in FIG. 44 of the ceramic heat exchanger.
Figure 46:
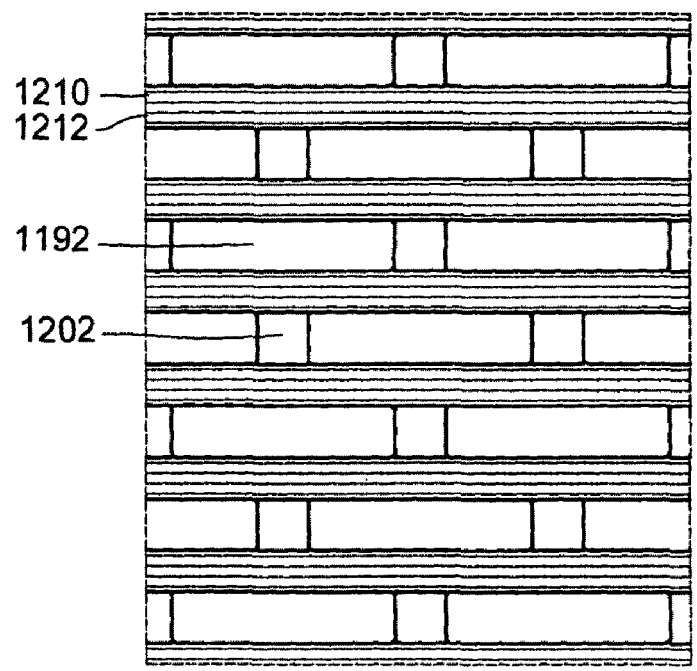
FIG. 46 shows an enlarged view of the ceramic interior tube plate of the ceramic heat exchanger as indicated in FIG. 42.

FIG. 42 is an isometric explosion of the heat exchanger structure comprising a front plate 1170; a back plate 1170; three cloth plates 1172; and two pipe plates 1174. Products of combustion flow normal to the plate in the direction 1178, and the thermal compressor working fluid flows in the orthogonal direction 1176. FIGS. 43, 45, and 46 are platelayer enlargements defined in FIG. 42. FIG. 43 is an enlargement of a small segment of the front plate, and comprises the ceramic structure 1190 and rectangular shaped gas passages 1192. The rectangular gas passages will typically be quite small with nominal dimensions of say 2 mm by 8 mm. FIG. 44 is a section view defined in FIG. 43. FIG. 44 comprises a ceramic front plate 1190; rectangular-shaped gas passages 1192; a cloth fiber structure 1200 formed from a number of ceramic fiber cloth layers; contact surface between 2 pipe plates 1202; a pipe plate 1206; a pipe plate pipe 1210; and another pipe plate pipe 1212. FIG. 45 is a section defined by FIGS. 42 and 44, and comprises contact surfaces 1202 between 2 pipe plates and cloth-fiber-structure surface 1200. FIG. 46 gives a face view of the pipe plate defined in FIG. 42, and comprises one pipe sequence 1210, another pipe sequence 1212, rectangular shaped gas passages 1192, and contact surfaces 1202.

3.17 Monolithic Ceramic Heater

A unique heater concept called a monolithic ceramic heater, configured by modifying the ceramic heat exchange module (FIG. 42) by including fuel pipe platelayers. The fuel pipe platelayer is either porous so that fuel diffuses though the pipe wall, or each fuel pipe has a set of holes through the pipe wall so that fuel diffuses throughout the monolithic structure. Thus, the monolithic ceramic heater is comprised of a three-plate sequence characterized as a cloth layer, a working fluid pipe plate layer, a fuel pipe plate layer, a cloth layer, etc, together with a front plate and an aft plate. Other equivalent sequences using the three types of interior plates exist.

3.18 Solar Receiver with Thermal Compressor

Figure 10:
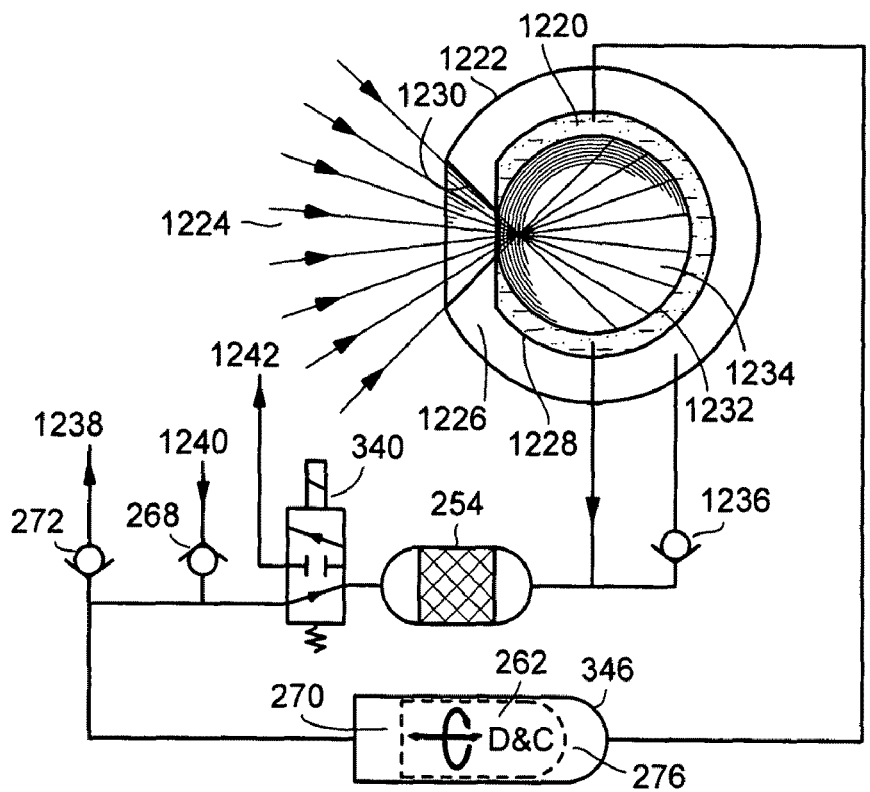
FIG. 10 shows a schematic of the invention with the embodiments of a solar energy receiver used as a heater that is part of the thermal compressor system.

A solar receiver is a heater that uses solar energy as the heat source. FIG. 9 describes a solar-energy, thermal-compressor, and gas turbine power system. FIG. 10 describes a thermal compressor integrated with a solar receiver. The receiver uses ceramic elements in order to operate at high temperatures and uses a unique design concept that maintains all ceramic components stresses in compression. FIG. 10 comprises concentrated sunlight 1224 from a parabolic mirror; solar-receiver, inner ceramic sphere 1232 that has a circular window, absorbs sunlight energy on the inner surface and is pressurized on the outer surface by the working fluid; outer ceramic sphere 1228 which is pressurized on the inner surface by the working fluid and pressurized on the outer surface by the working fluid to the peak system pressure; ceramic-fiber-filled, working-fluid cavity 1220 which diffuses energy absorbed by the inner ceramic sphere into the working fluid in the volume between the inner and outer ceramic spheres; outer, tensile stress sphere 1222 which uses a material with good tensile stress properties; thermal insulation 1226 which minimizes heat loses to the atmosphere; insulating compression cone 1230 which seals gases and transfers the unbalanced load on the inner ceramic sphere due to the circular window; a thermal compressor 346; a high-pressure discharge check valve 272; a high-pressure discharge pipe 1238; an intake check valve 268; an intake pipe 1240; a three-port, two position valve 340; a low-pressure, heat-discharge pipe 1242; a regenerator 254; and a solar-receiver, pressurization check valve 1236 which insures that the outer tensile sphere is pressurized to the peak operating pressure.

3.19 Constant-Power Turbine

The TC of the type under consideration in this specification outputs gases at temperatures that are typically below 300° C. Consequently, material strength degradation due to heating of elements subjected to these gases is not an issue. In addition, these TCs will typically input gases at a pressure of 100 atmospheres, which permits small turbines to have a high power output. The constant-power turbine is an innovative device that is especially useful for low-temperature high-pressure systems. This device outputs a constant power over a broad speed range. It exploits the concept of "velocity compounding" described in FIGS. 47 and 48.

Figure 47:
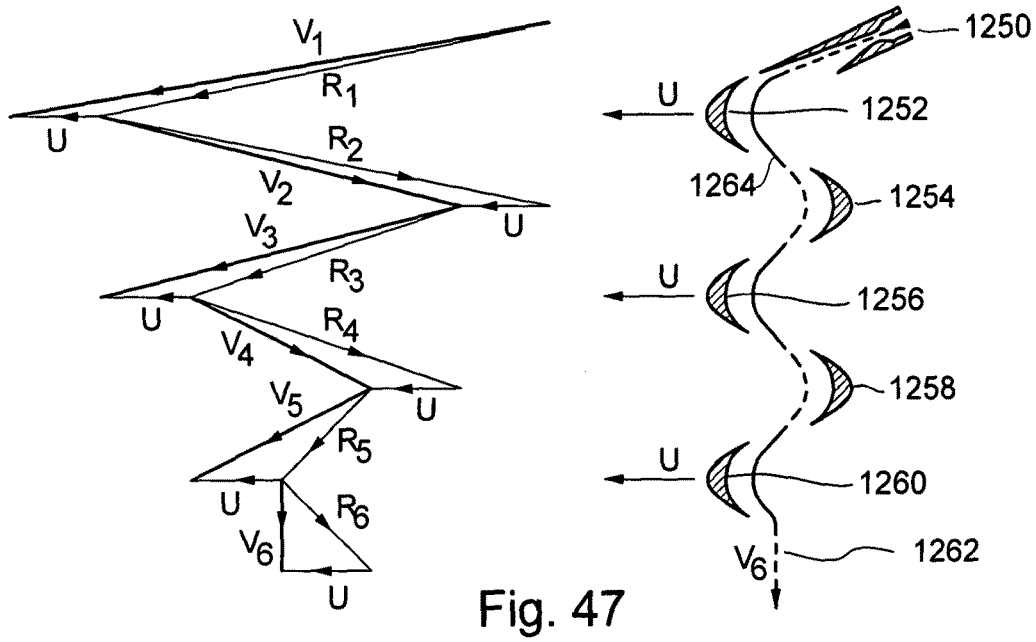
FIG. 47 describes the concept of velocity compounding, which is an integral element of the constant power turbine, and shows how torque multiplies when the turbine-blade tip speed is much lower than the gas velocity.
Figure 48:
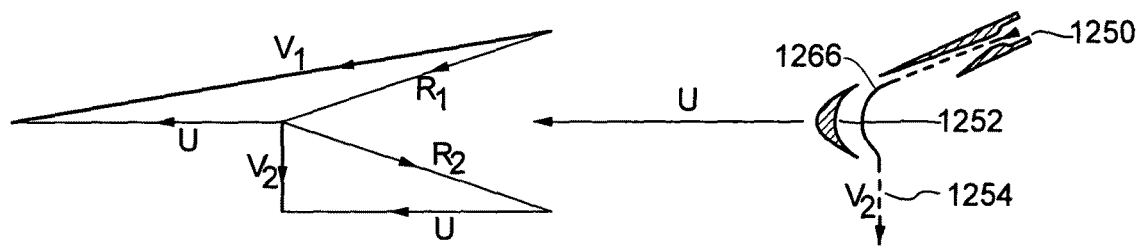
FIG. 48 shows the trajectory of a particle of gas when the turbine-blade tip velocity is half the nozzle discharge velocity, i.e., turbine optimal speed.

The right side of FIG. 47 shows three turbine blades 1252, 1256, and 1260 each belonging to a different turbine wheel but connected to a common shaft; two stator blades 1254 and 1258 each belonging to a different stator wheel; a converging diverging nozzle 1250; and the trajectory of a particle 1264 from the nozzle and through the blades. The left side of FIG. 47 is a velocity diagram for a gas particle moving through the blades. The turbine-blade velocity vector is designated by U, the velocity vector of a gas particle as it exits the nozzle is designated by $V_1$, the velocity vector of a gas particle as it exits the first turbine blade is designated by $V_2$, the velocity vector of a gas particle as it exits the first stator blade is designated by $V_3$, the velocity vector of a gas particle as it exits the second turbine blade is designated by $V_4$, the velocity vector of a gas particle as it exits the second stator blade is designated by $V_5$, and the velocity vector of a gas particle as it exits the third turbine blade is designated by $V_6$.

Note that a hold letter designates a vector. A scalar component tangent to the turbine blade trajectory $V_{jt}$ and a scalar component normal to the turbine disk plan $V_{jn}$ can represent each vector $V_j$. Then $(V_{jt}, V_{jn})$ is equivalent to $V_j$. The scalar $V_j$ designates the scalar magnitude of vector $V_j$.

The velocity diagram in FIG. 47 shows that the tangential component of the nozzle-jet gas particle $V_{1t}$ is diminished by an amount 2 U as the particle moves through a turbine wheel and that the normal component $V_{1n}$ is unchanged. Then the number of turbine disks $N_D$ required to null out the tangential component of the nozzle-jet, gas particle is equal to $V_{1t}/2$ U. In FIG. 47, the number of disks required to null out the tangential component of the nozzle jet velocity is three and in FIG. 48, the number is one. In FIG. 47 the energy per unit mass discharged by the nozzle is equal to $V_1^2/2$, and the energy per unit mass discharged by the turbine system is $V_{1n}^2/2 = V_6^2/2$. The power of the nozzle gases is $qV_1^2/2$, where q is the mass flow rate of the nozzle gases. Note that $V_1^2 = V_{1t}^2 + V_{1n}^2$. The power available to drive the turbine is $qV_{1t}^2/2$ regardless of the turbine speed if $N_D$ does not exceed the number of available disks. P=T□, where T is shaft torque and □ is turbine angular velocity, relates the power P at the turbine shaft. It follows that T□=$qV_{1t}^2/2$=constant=C if the turbine operates with 100 percent gas dynamic efficiency. Then T=C/□.

Figure 49:
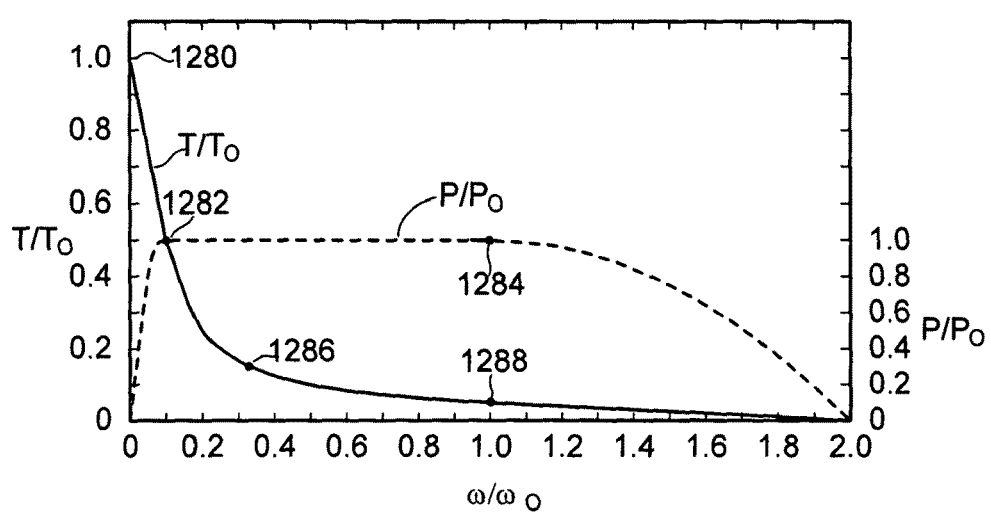
FIG. 49 shows a curve of the ratio of turbine torque (T) divided by stall torque ($T_o$) versus the ratio of turbine speed ($\omega$) divided by turbine optimal speed ($\omega_o$) and a curve of turbine power (P) divided by maximum power ($P_o$) versus the ratio of turbine speed divided by turbine optimal speed.

FIG. 49 gives a normalized torque, $T/T_O$, versus normalized angular velocity, $\square/\square_O$, curve, and a normalized power, $P/P_O$, versus normalized angular velocity curve for a 10-disk turbine system. The normalization parameters are the angular turbine velocity $\square_O$, at which one turbine wheel absorbs all the available nozzle jet energy, the maximum turbine power $P_O$ and turbine stall torque $T_O$. In the range, $0.1 < \square/\square_O < 1.0$, the turbine has a constant power output. The two points 1282 and 1284 indicate this range. The FIG. 49 points 1284 and 1288 correspond to the turbine condition defined in FIG. 48 and the point 1286 corresponds to the turbine conditions defined in FIG. 47. The point 1280 in FIG. 49 corresponds to the stall-torque conditions.

FIGS. 50 through 57 describes a constant-power turbine. This turbine is for applications where a wide speed range is required and where a wide power range at any given speed is required. The configuration is similar to that of the Terry turbine, a small steam turbine dating back to 1906. The Terry turbine is an inefficient inexpensive impulse turbine that can use more than five stages of velocity compounding in order to accommodate a pressure drop of 25-to-1. The constant-power turbine is an impulse turbine that uses a single stage most of the time except during hard acceleration when velocity compounding multiplies torque. The pressure drop when used with a thermal compressor is typically no more than 2-to-1 and often only 1.1-to-1, and consequently a single impulse stage is used. A single stage impulse turbine can operate at an efficiency of 90% and consequently a constant-power turbine can operate as an efficient turbine.

FIG. 50 is a view normal to the turbine disk of a constant-power turbine and comprises a turbine disk 1304, a stator ring 1302, 12 nozzle feed pipes 1300, and a turbine shaft 1306. FIG. 51 is a section view defined in FIG. 50 and comprises a nozzle feed pipe 1300, a stator ring 1302, a turbine disk 1304, stator return bucket 1308, turbine bucket 1310, and a turbine shaft 1306. FIG. 52 is a section view defined in FIG. 51 and comprises three converging-diverging nozzles 1316, three nozzle feed pipes 1300, 9 stator buckets 1308, a set of turbine buckets 1310, and a turbine shaft 1306. FIG. 53 is a section view of a curved surface flattened as defined in FIG. 52 and comprises a stator ring 1302, 3 nozzle outlets 1312, and 9 stator buckets 1308. FIG. 54 is a section view of a curved surface flattened as defined in FIG. 52 and comprises a turbine disk 1304 and a set of turbine buckets 1310.

Space between the stator 1302 and rotor 1304 in FIG. 51 provides the means for gas to exit the turbine rotors by moving sideways when the gas velocity drops below the tangential velocity of the turbine rotor.

Figure 55:
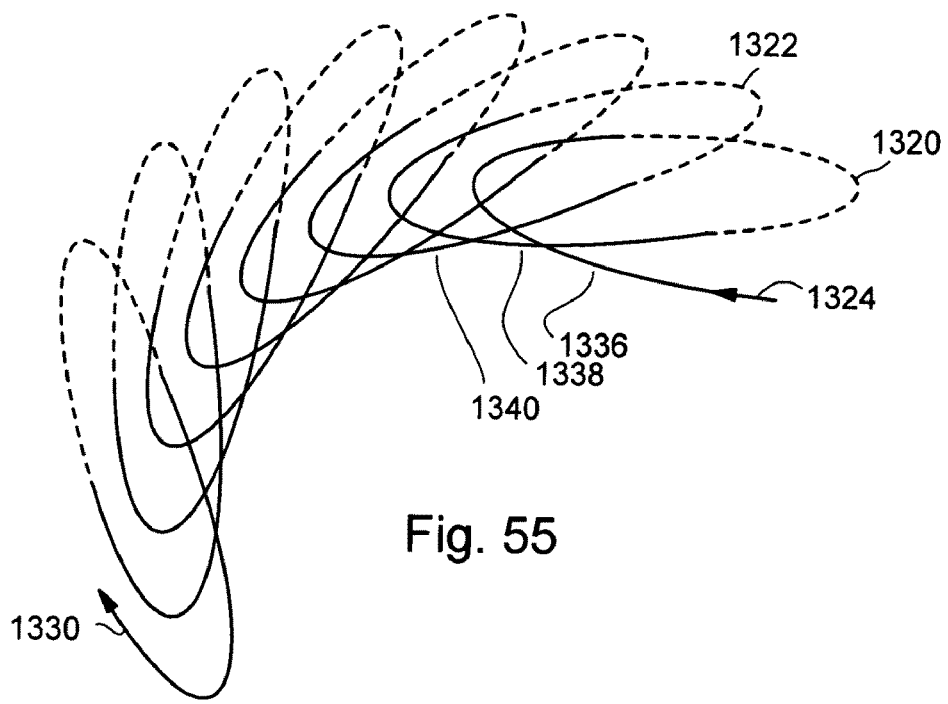
FIG. 55 shows the trajectory of a gas particle as it moves through the stator and turbine blades of a constant power turbine for the case when the turbine blade is not rotating. In this view, dashed lines indicate the portion of the trajectory in the stator blades and solid lines indicate the portion of the trajectory in the turbine blades.
Figure 56:
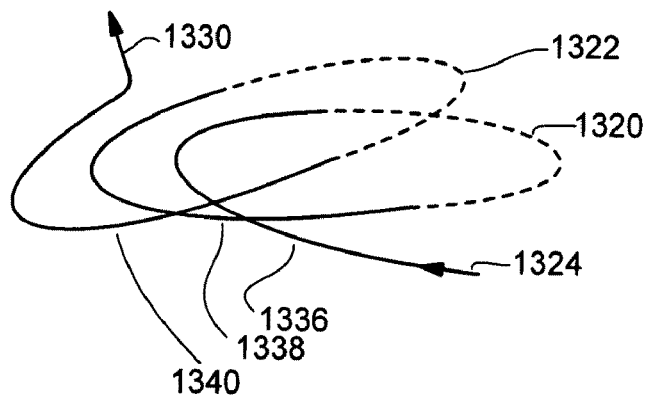
FIG. 56 shows the trajectory of a gas particle as it moves through the stator and turbine blades of a constant power turbine for the case when the turbine blade is rotating. In this view, dashed lines indicate the portion of the trajectory in the stator blades and solid lines indicate the portion of the trajectory in the turbine blades.
Figure 57:
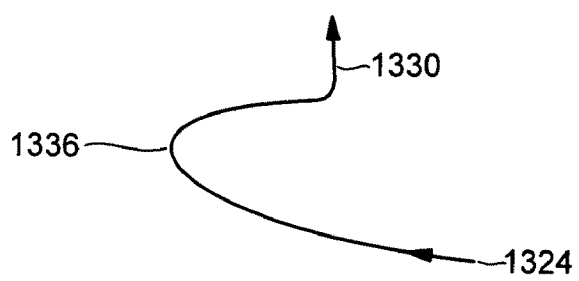
FIG. 57 shows the trajectory of a gas particle as it moves through the stator and turbine blades of a constant power turbine for the case when the turbine blade is rotating at optimal speed.

A gas particle exiting a nozzle of the constant-power turbine described above will follow a trajectory characterized as a helix with the axis of the helix lying on an arc. FIGS. 55, 56 and 57 shows the particle trajectories for three different turbine angular velocities. In these figures the solid line corresponds to that portion of the gas particle trajectory in the turbine buckets and the dashed lines corresponds to that portion of the gas particle trajectory in the stator buckets. FIG. 55 is the gas particle trajectory for a stationary turbine, FIG. 56 is for the case where the turbine blade velocity is one-sixth the nozzle gas velocity and FIG. 57 is for the case where the turbine blade velocity is one-half the nozzle gas velocity. The most energy efficient condition is a single pass as described in FIG. 57. Note that the condition in FIG. 57 can correspond to a high turbine velocity with a high nozzle gas velocity or to a low turbine speed with a low nozzle gas velocity. Multiple passes through the turbine of the gas particle allows the turbine torque to increase as the turbine speed decreases and thus approximate the constant-power curve shown in FIG. 49.

In FIGS. 55, 56, and 57 the particle enters the turbine from the nozzle at 1324 and exits at 1330. The path through the first, second and third turbine blades is respectively designated by 1336, 1338 and 1340. The callouts 1320 and 1322 respectively designated the path through the first and second stator blades.

Figure 78:
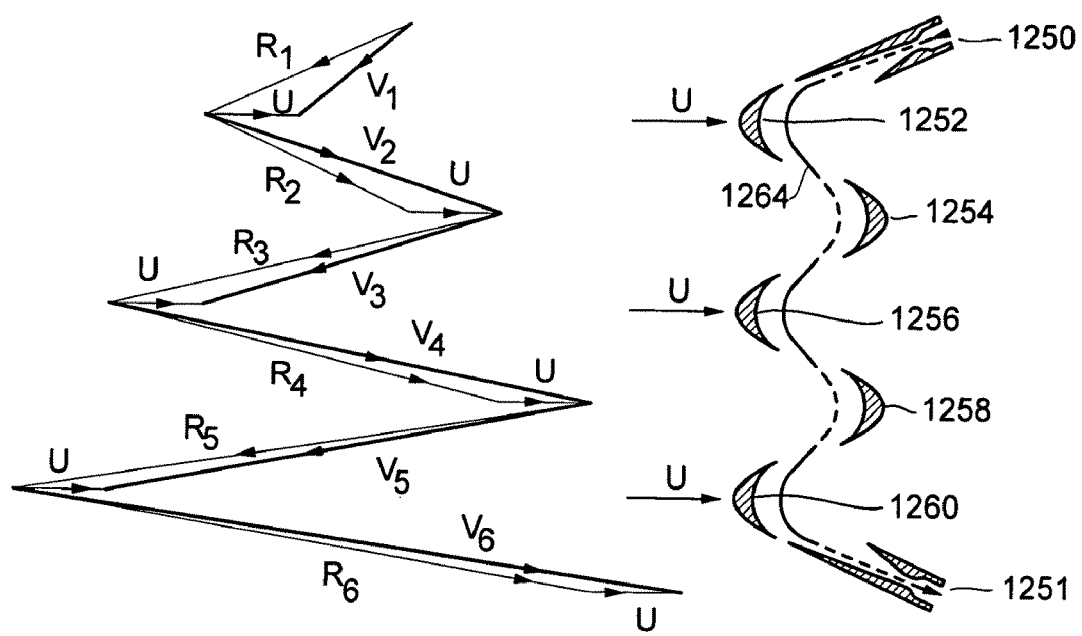
FIG. 78 describes the concept of velocity compounding in reverse, which enables the conversion of vehicle kinetic energy to compressed gas energy by taking a jet of gas increasing its velocity and compressing it by having it enter a converging-diverging nozzle.

The constant power turbine may be configured so it can operate in reverse, i.e., it can convert mechanical energy into compressed gas energy. FIG. 78 describes how velocity compounding is used to increase the jet velocity of the discharge nozzle before injecting it into the intake nozzle. Thus the pressure of the gas at a point just before it enters the discharge nozzle can be somewhat less than the pressure of the gas at a point downstream of the intake nozzle. Note that in FIG. 78, as opposed to FIG. 47, the direction of the gas exiting the discharge nozzle is opposite to the direction of the turbine blade. The following discussion assumes an inviscid fluid (gas dynamic friction loses can be ignored).

The right side of FIG. 78 shows three turbine blades 1252, 1256, and 1260 each belonging to a different turbine wheel but connected to a common shaft; two stator blades 1254 and 1258 each belonging to a different stator wheel; a converging diverging discharge nozzle 1250; a converging diverging intake nozzle 1251; and the trajectory of a gas particle 1264 from the discharge nozzle, through the blades and then into the intake nozzle. The left side of FIG. 78 is a velocity diagram for a gas particle moving through the blades. The turbine-blade velocity vector is designated by U, the velocity vector of a gas particle as it exits the discharge nozzle is designated by $V_1$, the velocity vector of a gas particle as it exits the first turbine blade is designated by $V_2$, the velocity vector of a gas particle as it exits the first stator blade is designated by $V_3$, the velocity vector of a gas particle as it exits the second turbine blade is designated by $V_4$, the velocity vector of a gas particle as it exits the second stator blade is designated by $V_5$, and the velocity vector of a gas particle as it exits the third turbine blade and just before it enters the intake nozzle is designated by $V_6$.

The velocity diagram in FIG. 78 shows that the tangential component of the nozzle-jet gas particle $V_{1t}$ is increased by an amount 2 U as the particle moves through a turbine wheel and that the normal component $V_{1n}$ is unchanged. Then the tangential component can increase by an additional 2 U for each additional turbine disk. In FIG. 78 the energy per unit mass exiting the discharge nozzle is equal to $V_1^2/2$, and the energy per unit mass discharged by the turbine system is $[(V_{1t}+6U)^2 + V_{1n}^2]/2 = V_6^2/2$. FIG. 79 gives the associated relations for pressure and velocity assuming a perfect gas and a reversible adiabatic compression.

3.20 Integrated Automotive Turbine Drive

Figure 58:
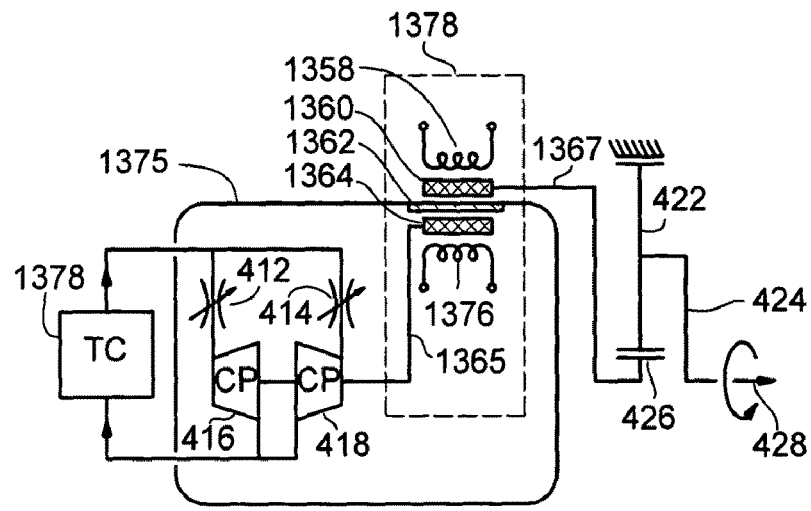
FIG. 58 shows a schematic of a drive system for automotive applications that uses a thermal compressor as the power source.

The FIG. 58 schematic describes a unique drive that exploited the characteristics of the thermal compressor and incorporates functions required of an automotive drive. This drive performs the forward, reverse and retard functions. FIG. 2, FIG. 4A or FIG. 6 excluding the turbine 328 or 329 and generator 324, characterizes the thermal compressor block 1378 in FIG. 58. It uses two constant-power turbines with variable-flow controls, one turbine 416 for forward motion with variable-flow control 412 and one turbine 418 for reverse with variable-flow control 414. It incorporates an electromagnetic, torque-transfer system 1378 that transfers torque from a high-pressure chamber 1375 to atmospheric pressure without the need for a high-pressure seal. The turbine output rotor 1365 transfers its torque through a magnetic window 1362 to the atmospheric-pressure rotor 1367. The atmospheric-pressure rotor 1367 drives a planetary gear train with sun gear 426, planet gear 422, link arm 424 and output shaft 428. The electromagnetic, torque-transfer system uses an inner stationary exciter 1376 that excites an electromagnetic torque ring 1364 attached to the turbine-output rotor 1365, and it uses an outer exciter 1358 which excites an electromagnetic torque ring 1360 attached to the atmospheric-pressure rotor 1367.

Figure 59:
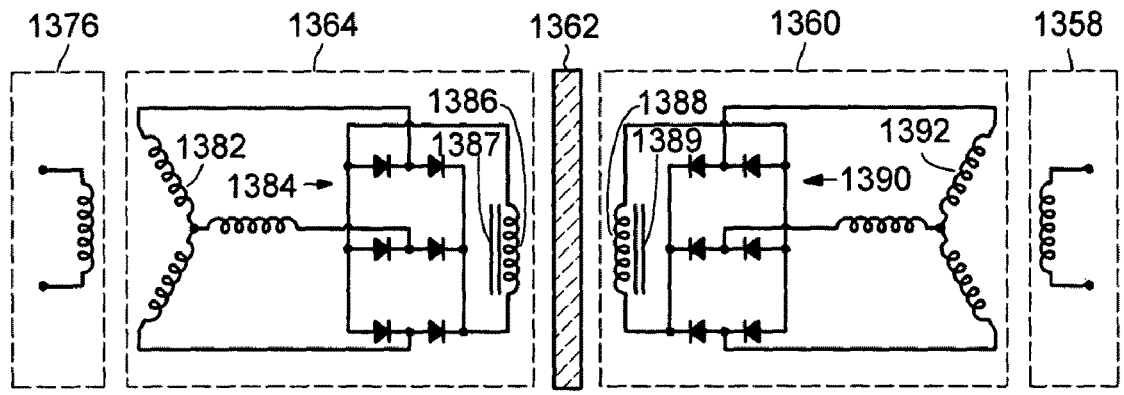
FIG. 59 shows a wiring schematic for the drive system shown in FIG. 58.

FIG. 59 is an electrical schematic of the electromagnetic, torque-transfer system. This system can be divided into five groups, e.g., inner, stationary, exciter circuit 1376; inner, electromagnetic, ring circuits 1364; magnetic window 1362; outer, electromagnetic ring circuits 1360; and outer, exciter circuit 1358. Both the inner and outer exciters 1376 and 1358 form two-poll stators, and the inner and outer electromagnetic ring circuits 1382 and 1392 form three-phase, alternating-current dynamos whose currents are respectively rectified by means of rectifier banks 1384 and 1390 which in turn respectively drive the coupling coils 1386 and 1388. The inner and outer coupling coils 1386 and 1388 transfer torque across the magnetic window 1362. This figure shows the inner and outer coupling coils 1386 and 1388 respectively embedded in iron cores 1387 and 1389.

Figure 60:
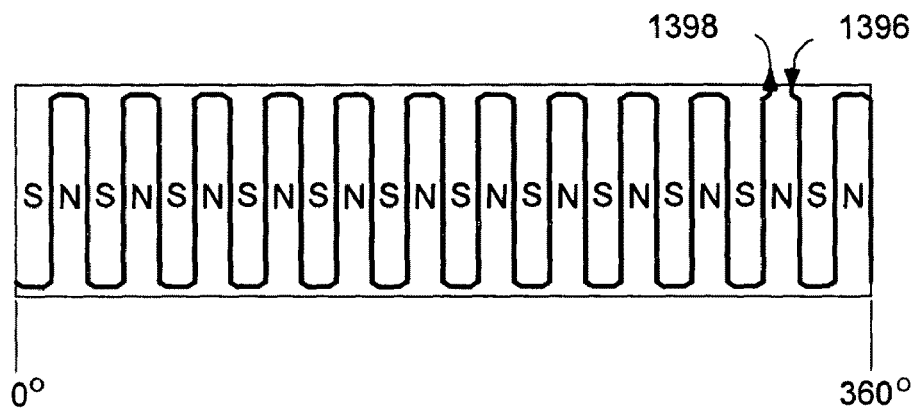
FIG. 60 shows the geometric arrangement of a coupling coil with a view of the coil unfolded from the surface of a cylinder and placed on a flat plane. This coil is for the system shown in FIGS. 58 and 59.

FIG. 60 shows the geometric arrangement for both coupling coils by showing a view of the coil unfolded from the surface of a cylinder and placed on a flat plane. In FIG. 60, the 0° line and the 360° line coincide on the cylinder. The coil has two contacts 1396 and 1398 through which current enters and exits the coil. The flow of current induces magnetic polls in the iron cores as shown in FIG. 60. The magnet poles of the inner electromagnetic ring will align itself with the outer electromagnetic ring so that a south pole is adjacent to a north pole across the magnetic window. This insures that there is no slippage between the inner and outer electromagnetic rings as long as the transferred torque is below some defined threshold. Increasing the current in the exciter coils increases the flux density of the magnetic field across the magnetic window and in turn, the threshold torque is increased.

If only one exciter is activated then one electromagnetic ring will induce hysteresis currents in the other electromagnetic ring and the system will operate as an electric clutch. Such a clutch will transfer torque with some slippage.

3.21 Wheel-Mounted, Automotive, Turbine-Drive System

Figure 61:
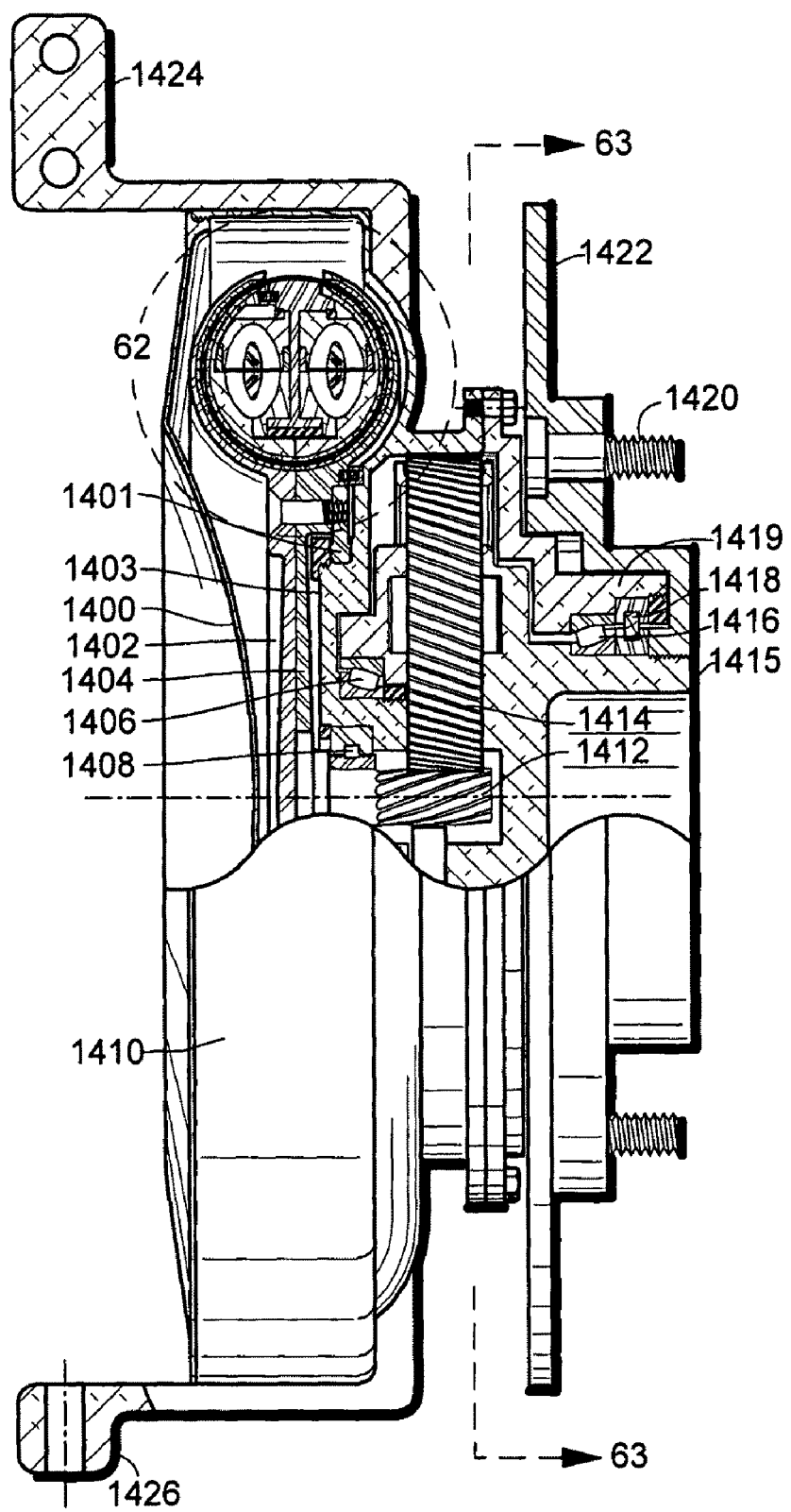
FIG. 61 shows a section view of a wheel mounted automotive drive system.
Figure 62:
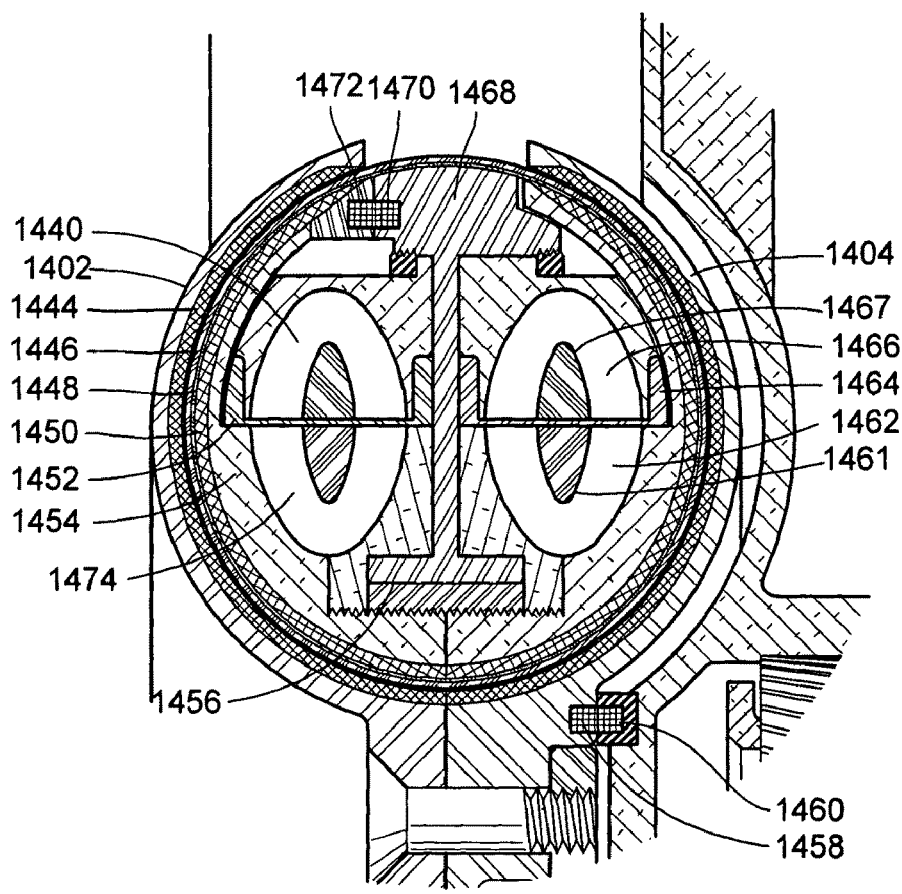
FIG. 62 shows an enlargement as indicated in FIG. 61.
Figure 63:
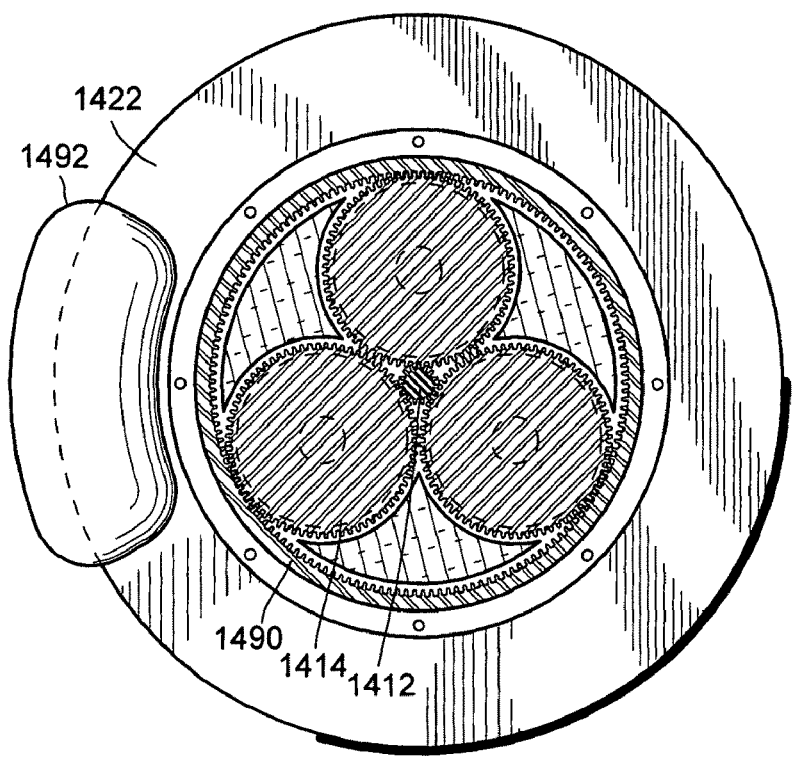
FIG. 63 shows a scaled down section view of the wheel mounted drive system showing the planetary gears as indicated in FIG. 61.

FIG. 61 described an automotive wheel-mounted drive system partly characterized by the FIG. 58 schematic. FIG. 62 is an enlargement defined in FIG. 61 and FIG. 63 is a scaled down section view defined in FIG. 61. In addition, the turbines described in FIG. 61 have a relationship to the one described in FIGS. 53 through 57.

In FIG. 61, the inner dust cover 1400 prevents dirt or water from contaminating the part of the system at atmospheric pressure; the air bearing 1401 supports the high-speed inner rotor 1402 and outer rotor 1404 that operates at atmospheric pressure, and are attached to the sun gear 1412 and the electromagnetic, torque toroid (see FIG. 62); no contact magnetic seal 1408; wheel, inner roller bearings 1406; planet gear 1414; wheel, outer roller bearings 1416; grease seal 1418; primary support disk and ring gear 1403; output torque and planetary gear support structure 1415; disk brake rotor 1422; wheel lugs 1420; and outer bearing support structure 1419.

In FIG. 62, the inner rotor disk and toroidal segment 1402 supports a segment of the atmospheric-pressure, electromagnetic torque toroid 1444; the high-pressure, toroidal nonmagnetic and dielectric container 1448 that contains all the high-pressure elements; the high-pressure, electromagnetic, torque-toroid segment 1450; forward-drive, stator blade mask 1452, a device that minimizes gas-dynamic retarding forces when the forward turbine drive is off; forward turbine blades 1474; forward drive stator blades 1440; turbine-blade gas guide 1461; reverse-drive turbine blades 1462; reverse-drive, stator-blade mask 1464; reverse-drive stator blades 1466; stator-blade gas guide 1467; an outer, stationary exciter circuit 1460; an outer, electromagnetic ring circuits 1458; an inner, stationary exciter circuit 1470; an inner, electromagnetic ring circuits 1472; an inner, turbine gas bearing 1456; and a stationary, inner support ring 1468.

FIG. 63 shows the disk brake rotor 1422; a disk brake caliper assembly 1492; planetary gear 1414; sun gear 1412; and ring gear 1490.

4. How the Invention is Used

The engine of the present invention has many applications. There are various versions of engine components. The preferred engine configuration depends on application requirements. The following are some requirements and their applicability to various versions of engine and engine component:

4.1 Scale—engine size

Decoupled cooler: Analyses indicate that a decoupled cooler is lower in cost and more efficient than a cooler that is not decoupled for all but the smallest engines that may use passive cooling. The decoupled cooler requires a valve set but self propels gases to the cooler, however, a cooler that is not decoupled also requires a system to remove heat.

Decoupled heater (ECH or ICH): Decoupling the heater requires a valve system that adds complexity. When designing a high-output heater it is desirable, with regard to cost and overall system efficiency, to be unconstrained by heater volume. The effect on design of a decoupled heater is to make the TC smaller and the heater larger. The smaller TC has lower thermal losses, lower gas dynamic losses and lower mechanical losses. A larger heater can use lower cost materials, it is easier to manufacture, can operate at a lower combustion temperature and need not have significantly higher thermal losses.

ICTC: The ICTC engine does not require a heater and as such is very compact.

Scaling law: FIG. 67 defines a scaling law that correlates well with many physical processes including engines. In addition, this figure presents deduced relationships. This law shows trends and not absolute values since it does not correlate well with some viscous processes. Note that specific power diminishes with scale. The structural design of larger engines is typically more efficient, with regard to weight, but the underlying trend in the scale law does not change. This infers that multiple units are lighter than a single unit of equal power. Complexity and operating efficiency dictates toward fewer units.

4.2 Durability

Electromagnetic displacer drive: An electromagnetic displacer drive used with the combined small clearance seal and gas bearing operates without wear surfaces. Electrical coils have a very long service life, but are subject to fatigue failures. Thus, this drive is very good for long durability applications.

Center-rod-type displacer: The center-rod-type displacer with a motorized bushing and labyrinth displacer seal can operate as a near wear-free configuration after the initial wear-in period. The pressure across the center-rod oil seal is essentially zero so that maintaining continuous oil film between the seal surface and center rod is not difficult. This insures very low, center-rod, oil seal wear.

Crank displacer drive: At low speed, the forces acting on the displacer are small. The pressures across the pushrod and displacer seals are small and crank-bearing loads are small. Thus, this drive also is very good for high-durability, continuous-service applications; however, it is not as maintenance-free as the electromagnetic displacer drive.

Turbine output drive: Turbines can operate with fluid bearings having a film thickness thick enough to preclude significant wear. The invention powers turbines with warm gas at a temperature typically below 300° C. and consequently high-temperature, turbine-blade creep and fatigue failures are not a problem.

Direct drive: A multistage reaction turbine operating with a low-pressure ratio and warm gases lend themselves to designs that directly drive a 60 Hz generator and preclude the need for reduction gears or higher speed operation that require the use of costly power conditioning electronics. Thus, such a system is very durable.

4.3 Emissions

All versions of the engine can meet stringent emission requirements.

4.4 Efficiency

Cycle efficiency: The cycle efficiency of the various versions is ideal since they come close to the Carnot cycle efficiency (see FIG. 64).

Thermal compressor: In a typical design, TC efficiency peaks near one-half rated output. The most important element in limiting TC efficiency is the regenerator thermal and gas dynamic losses. At low speeds, thermal losses dominate and at high speeds, gas dynamic losses dominate by requiring high displacer drive power. A system that operates at low output for long periods will preferably use multiple TCs of different sizes. Efficiency maximizes by starting and stopping TCs as required.

Multistage reaction turbine: Reaction turbines can operate at efficiency above 90%. The low-pressure-ratio gas outputted by the TC is ideal for driving a multistage reaction turbine operating at a low speed. The low-temperature gases allow a low-cost turbine. This approach is better suited to large direct drive systems. For constant speed systems, varying system pressurization varies output torque.

Single-stage, impulse turbines: Single-stage, impulse turbines can operate near 90% efficiency. The low-pressure-ratio gas outputted by the TC allows this design. This approach is better suited to small higher speed applications; however, a 0.5 m diameter impulse turbine with $N_2$ or air as the working fluid can directly drive a 60 Hz generator at optimal efficiency.

Constant-power turbine: Multi-pass impulse turbines can operate at efficiencies as low as 50%. The constant-power turbine can operate as a single-stage impulse turbine or as a multi-stage impulse turbine. A good design will operate the constant-power turbine as a single-stage impulse turbine as much as practical.

System efficiency: FIG. 68 characterizes and estimates system efficiency.

4.5 Specific power

ECH verses ICTC: For engines below 100 kW, the ECH engine is competitive with the ICTC engine in terms of specific power; however, for large engines the ICTC engine will be much lighter. In essence, this is a tradeoff between the weight of the heater and the weight of the compressor-expander module.

Decoupled heater: The innovative concept of decoupling the heater significantly improves ECH engine specific power and makes practical its use in large power systems.

Monolithic ceramic heater: The monolithic heater is much smaller and lighter then its alternative and thus improves specific power.

4.6 Cost

Pressurized ceramic structure: The innovative concept of using pressurized ceramic structures for high temperature elements allows the use of low cost ceramics.

60 Hz direct drive: Small gas turbines usually drive generators at high speeds and use costly, power-conditioning electronics to transform high frequency power into a 60 Hz output. The low-pressure ratio and low gas temperatures of the current invention can directly drive a 60 Hz generator with a turbine even for small engines.

Decoupled heater: A decoupled heater can be designed independent of heater interior volume and does not affect volumetric efficiency. This simplifies design and manufacture and consequently reduces cost.

Warm gas turbines: The fact that turbines experience only warm gases allows low-cost manufacture.

Solar power: By integrating a solar energy system into a cogeneration system the cost of solar energy is substantially lowered, i.e., the incremental cost of adding solar energy to a power system is much less then a stand alone solar system.

4.7 Fuel type

Coal: An external combustion heater best processes a dirty fuel like coal. A coal heater is a device similar to a coal boiler for a steam power plant.

Distillates: An external combustion heater best processed distillates that leave a residue after combustion. A continuous internal combustion engine using a replaceable regenerator can use a fuel that leaves a residue.

Clean distillates and natural gas: Continuous internal combustion engines can use these fuels as can external combustion engines.

4.8 Output variability

Variable system pressurization: One very efficient method of varying turbine output is to vary system pressurization. This method is applicable to reaction turbine, impulse turbines or positive displacement drives.

Variable flow nozzle: A variable flow rate nozzle is applicable to single stage impulse turbines. Such a system is applicable to either fixed or variable pressurization.

Constant power turbine: A constant power turbine is ideal when very high low speed torque is required for short periods.

Multiple TCs: The use of multiple TCs is ideal when the system operates for long period at an output that is a small fraction of rated output.

4.9 Start up time

ICTC: The hot chamber of the ICTC ignites almost instantaneously and for small engines achieves full power in a small fraction of a second. This engine does not have low speed combustion instabilities as does spark ignition or compression ignition engines. Thus, it operates at a very slow speed, and is stopped or started almost instantly.

ECH: The ECH engine requires the heater to heat up before the engine can power up. Minimizing heater mass and maximizing heater heat-diffusion rate minimizes the start-up time. Small engines will typically require almost a minute to start while very large engines may require 15 minutes or more.

Monolithic ceramic heater: The monolithic ceramic heater is an innovative concept that minimizes heater mass and maximizes heater heat-diffusion rate.

4.10 Output responsiveness

Decoupled displacer drive and output drive: Since a motor independently drives the displacer, the engine can speed up or slow down very quickly.

Variable system pressurization: Varying pressurization varies output torque. Systems, which use variable pressurization, are very responsive. The system can quickly pressurize by opening a valve and quickly reduce output torque by slowing the TC. Depressurizing is slow but brings the system to optimal operating efficiency.

5. Specific Embodiments and Examples

Given below are examples of some specific applications for these devices.

5.1 Home-Cogeneration, 20 kW, TC, Turbo-Generator

The table in FIG. 69 contains the specifications for a small home cogeneration unit that generates electricity and uses rejected heat to provide space heating and hot water. It uses a linear electromagnetic displacer drive, which obviates the problem of the pushrod seal. As a result, this electromagnetic drive thermal compressor (EMTC) system can operate at a high, 7.0 MPa, system pressure. In addition, it uses a monolithic ceramic heater with an interior heater volume that is small relative to its heat throughput.

A long, maintenance-free service life while operating continuously is an important requirement for a home cogeneration unit. Annual replacement of an air filter does not significantly influence this requirement; however, annual or regular servicing can add costs that limit the utility of the unit. The TC turbo-generator with a linear electromagnet drive can have a very long, continuous-use service life. It does not have any wear surfaces. The turbine blades do not experience high temperatures.

The combination of a 30 cm diameter turbine, nitrogen as the working fluid and a system pressure ratio of 1.4 allows the turbine to drive the generator directly at 60 Hz. This is desirable because it lowers the system cost and enhances system durability by eliminating the need for power-conditioning electronics.

To be useful as part of a home cogeneration system an engine needs to be very durable, nominally have an efficiency of more than 30% at 10% of rated output, be low cost and have very low emissions. The EMTC can meet these requirements.

5.2 Solar Receiver, 2 kW, TC System

The table in FIG. 70 contains the specifications for a solar receiver TC system that can operate with the home cogeneration unit described above. FIG. 10 is a schematic of the solar receiver and TC and described in Section 3.18. One or more solar TCs operate in parallel with the natural gas heated TC and all drive one turbo-generator as shown in FIG. 9.

A solar collector that uses a parabolic mirror that tracks the sun collects and concentrates the solar energy in the solar receiver. The solar receiver and TC converted the solar energy into warm gas and compressed warm gas as discussed in Section 3.7. Solar energy costs are minimized by making the solar energy system an adjunct to a natural gas, TC turbo-generator.

A clean parabolic mirror gives a solar energy collection efficiency of 80%. A value of 70% may be more realistic for most applications. Warm gas used to heat water (90% transfer efficiency to the water) transfers 40% of the energy; and compressed gas that is used to generate electricity (75% turbine and generator conversion efficiency) transfers 60% of the energy. Thus of the solar energy striking the parabolic mirror, 31% can be converted to electricity and 25% can be used to heat water. Therefore, the overall efficiency of the solar thermal system is approximately 56%.

5.3 Space Solar Thermal Power System

The table in FIG. 71 contains the specifications for a space solar thermal power system. The primary objective of this system is a very long, continuous-use, maintenance-free service life. It uses an electromagnetic thermal compressor drive. Heat not required for other purposes is radiated into space using the back of the parabolic mirror as a radiating surface.

5.4 Continuous-Internal-Combustion, TC, 200 kW, Gas-Turbine Cogeneration System The table shown in FIG. 72 contains the specifications for a continuous internal combustion TC (ICTC) turbo-generator used as a cogeneration unit. It uses a displacer center rod with electromagnetic drive. This unit uses a labyrinth displacer seal and natural gas as its fuel.

The turbo generator is a variable load constant velocity (60 Hz) system. It uses a reaction turbine to drive the generator. At rated output, back work consumes 13% of fuel energy and only 5% at 30% of rated output. This system uses variable pressurization as a means of varying the turbine torque. It uses a 10 cm radius turbine, a 1.4 system pressure ratio and a four-stage reaction turbine, which directly drive a 60 Hz generator.

5.5 Central Power 100 MW ICTC, Base-Load Turbo-Generator

The table in FIG. 73 contains the specifications for a base-load (constant output) central-power-plant, turbo-generator that uses continuous internal combustion TCs. This system is the same as the FIG. 7A schematic with the gas drive 329 replaced with a turbine and generator. In addition, use is made of multiple TCs operating in parallel. To achieve high efficiency axial flow reaction turbines are used that can operate at 91% efficiency and axial flow compressors that can operate at 89% efficiency. As shown in FIG. 7A, air compression uses three stages of cooling and uses three stages of heating when the products of combustion expand back down to atmospheric pressure. This reduces back work by half. Without the cooling and heating the compression and expansion would be approximately adiabatic and with the cooling and heating the compression and expansion is approximately isothermal. When adiabatic compression is used 10% of energy performs back work, whereas, when isothermal compression is used only 5% of the energy performs back work. Back work is much less than the back work required of a gas turbine, which can require 40% of the energy. Incorporating cooling and heating as used in this system increases system energy efficiency from 58% to 61%. A modern natural-gas-fired steam turbo-generator plant can operate at an efficiency of 42% and a modern gas turbo-generator with intercooler and regenerator can operate at an efficiency of 47%. The difference for the steam plant relative to the ICTC is the advantage of the gas cycle, which for the ICTC is almost equivalent to the Carnot cycle (see FIG. 64), the higher working fluid temperature, 1300° C. verses 600° C. and combustion heat utilization that for the ICTC is 10 to 20 percent better. The difference for the gas turbine plant is due to its departure from the Carnot cycle and greater amount of back work. The steam plant has the benefit of essentially no back work.

Durability constraints include wear, creep failure and fatigue failure. Gas turbines and steam turbines can essentially operate without wear if they use fluid (air or oil) bearings. Seal replacement is required for steam turbines. The balanced-pressure-crank displacer drive used with this ICTC system has two notable wear items, e.g., displacer pushrod seal and the displacer seal. The pushrod-balanced-pressure concept insures that the pressure across the pushrod seal is always near zero. The pressure drop across the regenerator is approximately proportional to the pressure drop across the displacer seal. With a well-designed system, this pressure drop can be limited to 0.2 MPa. This is very low when compared to diesel engines, which can operate with a pressure drop of 4.0 MPa. A thick oil film on a lubricated surface follows from a low displacer ring-seal load. Thus, slow wear occurs and a seal service life of 50,000 hours follows.

Above a temperature of 700° C., turbine blades can undergo creep failure. For steam turbines, this is not a problem; however, creep failure limits gas turbine service life and typically requires blade replacement before 10,000 hours. Steam boiler tubes are subject to creep failure and require servicing at intervals of 20,000 hours or less. The compressor and turbine blades for the ICTC turbo-generator experience temperatures below 170° C. and consequently creep failure is not an issue.

The ICTC uses a combustion temperature (1300° C.), which is low enough to preclude the formation of $NO_x$ compounds and oxygen-rich combustion in order to minimize CO formation. A steam boiler operates oxygen-rich. In principal, they can use the same combustion temperature as the ICTC; however, in practice most gas-fueled steam boilers operate at higher temperatures in order to improve heat transfer efficiency. Gas turbines operate at much higher combustion temperatures, which result in the formation of significant amounts of $NO_x$ compounds.

The ICTC is ideally suited as a base-load turbo-generator—offering advantages in efficiency, durability, emissions, cost, space and noise. The material costs to manufacture the ICTC turbo-generator are low. When multiple TCs are used, a TC can be serviced without stopping the rest of the system. The ICTC only requires a low-silhouette, small-footprint building since it does not require discharging of high temperature gases or use of a boiler that tend to be large. The absence of a high-temperature gas discharge simplifies noise reduction.

5.6 Auto, 270 kW, ICTC, Gas-Turbine Engine

The table shown in FIG. 74 contains the specifications for a continuous internal combustion auto, 270 kW, ICTC gas-turbine engine. FIG. 7 shows a schematic of an ICTC system that this automotive engine uses. In this schematic a three-stage, centrifugal compressor, and a three-stage, radial-flow, turbine expander is implied; however, other types of compressors and expanders are available. Both the centrifugal compressor and radial-flow turbine need to operate within a narrow flow-rate range for any given compressor-expander speed. If the flow rate is too high, it will choke and if it is to slow it will surge (be unstable). To maintain ideal flow conditions for both the compressor and the expander over the entire engine operating range, from low output to rated power, both intake and exhaust chokes are used. To control the compressor-expander subsystem, two choke motors, pressure sensors and/or flow sensors (not shown on the FIG. 7 schematic) are required.

Automotive application ideally uses several ICTCs in parallel. Consider an engine with four ICTCs and a rated power of 280 kW. When driving at a steady 100 km/h the power requirements can be as little as 15 kW. One unit can efficiently deliver this power while three units are off. Each unit uses a continuously hot igniter. The units that are off can come up to full power quickly. They can have a time constant (63% of rated speed) of 0.1 second. The engine quickly achieved full power and has small thermal losses. The largest thermal loss is associated with the regenerator, which requires a large regenerator presented area and short regenerator length in order to handle a 70 kW unit. Other important ICTC unit losses include the mechanical loss and the loss related to the drop in pressure across the regenerator. It is not ideal from efficiency point of view to use one unit at rated output. At a 35 kW output, for example it is more efficient to operate two units in order to reduce the losses due to the pressure drop across the regenerator. Optimal efficiency results from the use of different size TCs.

Different types of drive systems are available such as a gas turbine or positive displacement motor driving a conventional transmission. The pressure in the turbine cavity can be up to 100 atmospheres and the problem of transferring power from this high-pressure region to a one-atmosphere region poses a difficult seal problem. The automotive ICTC engine will operate most of the time with a turbine cavity pressure of only two or three atmospheres and can be limited to 30 or 40 atmosphere peak pressures so that seal wear is not a serious problem, and since the working fluid, air, is continuous replenished, a small amount of leakage is not a problem. FIG. 58 shows a drive schematic that uses two constant-power turbines and a planetary type reduction gear. This drive provides the forward, reverse and retard functions. Another type of drive is the wheel mounted drive similar to that shown in FIG. 61; however, for the ICTC engine the turbine can directly drive the planetary gear system and consequently not require a magnetic field to transfer the torque from a high-pressure region to an ambient one.

The internal-combustion thermal compressor (ICTC) has a very short startup time since it does not use a heater. FIG. 7B is a schematic of an ICTC engine. Other ICTC engine system schematics are possible. This engine is for high power applications requiring a small specific weight. Emissions are not significantly different from that of an external-combustion thermal compressor engine if peak temperatures are identical. Unlike the spark ignition and diesel engines, the ICTC is a continuous combustion system that can operate at a much lower peak temperature.

Fuels that leave a residue after combustion or condensates that result when products of combustion cool pose a problem for the ICTC engine because the regenerator can clog up. The ICTC engine can use a replaceable or cleanable regenerator for engines that use fuels with a small amount of residue. Gaseous or clean distillates are preferred fuels for the ICTC engine.

The automotive ICTC engine discussed here uses a ceramic design, a displacer center rod, electromagnetic drive and uncoupled cooler. It can have much lower wear characteristics than spark ignition or diesel engines.

The ICTC engine achieves very low emissions without the need for a catalytic converter. A catalytic converter is costly and can degrade over time. The combustion temperature is below where $NO_x$ compounds can form and consequently has lower emissions than spark-ignition, diesel or gas turbine engines. The use of a regenerator in the ICTC engine allows it to approach the efficiency of the Carnot cycle. This allows the ICTC engine to be more efficient than a spark ignition engine. Further efficiency advantages for multi-TC engines accrue from the ability to start and stop any one TC as discussed above.

There are no pulsating combustion noises like those associated with a spark ignition or compression ignition engine. The ICTC engine can be almost noise and vibration free.

The material costs for this engine are low and do not require many high precision components. The compressor and turbine blades only experience low temperatures. Therefore, in quantity production this engine is cost-wise competitive with current spark ignition engines.

5.7 Heavy Truck, 500 kW, ICTC, Gas-Drive Engine

The heavy truck ICTC engine described in the table in FIG. 75 is similar to the auto engine described above except that this engine design stresses maximum efficiency, tolerates a higher weight for a given output and is less influenced by cost. In place of a turbine, a helical (Lysholm) type gas motor is used. This drive is both heavy and costly; however, it is more efficient over the power range of this application. Stall torque is high and by varying the pressurization from 0.1 MPa to 5.0 MPa, torque varies proportionately. A large number of gears common in heavy diesel trucks are not required. A three-speed transmission deals with all requirements. The engine uses four TCs. Optimal engine performance for a particular condition can requires some TCs to shut down.

The ICTC helical drive engine offers significant advantages over the diesel engine in the area of life-cycle costs and emissions. The cost advantages are in the area of fuel efficiency, maintenance and durability. The material costs for this engine is low and do not require high precision components with the exception of the helical drive. A heavy-duty, truck-size diesel engine will typically not exceed efficiency of 45%, whereas, the ICTC can achieve 54%. This translates into a 20% advantage in fuel mileage. Because the ICTC engine can shut down one or more TCs and optimize fuel consumption for any given driving condition, the fuel consumption advantage is more than 20%. As discussed above, emissions for the ICTC engine are very low and, in particular, do not produce particulates or $NO_x$ compounds as diesel engines do.

5.8 Railroad, 5 MW, ICTC, Gas-Turbine Engine

An ICTC gas-turbine engine can replace the railroad diesel engine and be used to drive the generator. The table shown in FIG. 76 describes such an ICTC engine.

The ICTC three-stage, reaction-turbine-drive engine offers significant advantages over the diesel engine in the area of life-cycle costs and emissions.

5.9 Coal Heater, 200 MW, TC Electric Power System

With small modifications, a modern coal fueled boiler for use with steam power plants can be used as a heater for an uncoupled TC electric power system. By varying the pressurization, the TC system can operate as a variable output power plant while maintaining a very high efficiency. The table in FIG. 77 describes such a TC engine A power system with a variable output can better meet overall power requirements.

6. Advantages of the Invention

Responsive Engine: The Invention Comprises a Gas Cycle Engine with Responsive Controls. By driving the thermal compressor displacer with a motor (FIG. 2) or linear drive (FIG. 4) that is independently powered, the displacer can quickly speedup or stop. Spark ignition and diesel engines are responsive; however, gas turbine and Stirling engines are not.

Very-Low Emission: The invention comprises a gas cycle engine with very-low emission. The engine emissions are controlled by (1) limiting the combustion temperature to a value below where significant $NO_x$ compounds are formed and below where dissociation of $CO_2$ occurs in large amounts, (2) requiring combustion to occur with a significant excess of oxygen, (3) maintaining products of combustion at an elevated temperature for a significant time so that combustion of all fuel elements is essentially complete, and (4) lowering the temperature of the products of combustion slowly so that dissociation of $CO_2$ does not result in significant residual CO in the exhaust products. Thus, the invention comprises a gas cycle engine with ideal combustion conditions resulting in very low emissions without the need for a catalytic converter.

Very-Low Specific Fuel Consumption: The invention comprises a gas cycle engine with very-low specific fuel consumption. The engine cycle closely approximately the Carnot cycle and can operate down to zero speed i.e., the engine can start or stop almost instantly. These features allow it to achieve very-low specific fuel consumption.

Excellent Volumetric Efficiency: The invention comprises a gas cycle engine with excellent volumetric efficiency. A system of valves effectively decouples the heater and/or cooler interior gas volumes. The heater and/or cooler are designed for maximum efficiency independent of interior volume. Heat first transferred from the heater to the regenerator directly compresses gas. The concept of decoupling the heater and/or cooler is an important element in achieving small, high-powered gas cycle engines.

Unique, Integral, Small-Clearance Displacer Seal and Gas Bearing: The invention comprises a unique, integral, small-clearance displacer seal and gas bearing. Two concentric cylinders with a small clearance between them form an integral seal and gas bearing. The significance of this innovation is that large temperature differences and large pressure fluctuations do not nullify the small clearance. This concept maintains an excellent seal without a wear surface.

Very Long Maintenance-Free Service Life: The invention comprises a gas cycle engine without sliding wear surfaces and consequently an engine with a very long maintenance-free service life. By using the integral small clearance seal and gas bearing, together with an electromagnetic displacer drive and spin motor, the thermal compressor can operate without sliding wear surfaces. In essence, the displacer floats in the closed containment structure without contacting the walls. This turbo-generator unit can operate with gas or liquid bearings without contact wear. A very long fatigue life designed for all components insures a very long maintenance-free service life. A gas dynamic bounce at the end of each stroke increases displacer speed and system performance.

Problem of a High-Pressure Pushrod Seal Circumvented: The invention comprises a gas cycle engine that uses a displacer pushrod but obviates the problem of a high-pressure pushrod seal. This problem is solved by the use of a crankcase that is completely flooded with oil and use of a bellow that causes the pressure in the crankcase and cold chamber to be equal during operation.

Displacer Center Rod Version: The invention comprises a gas-cycle engine version with a displacer center rod and electromagnetic drive resulting in a simple, inexpensive and durable engine. This is the simplest version of the engine. A lubricated center rod supports the displacer and a dry labyrinth displacer seal is used.

Low-Cost Ceramic Heat-Exchange Module: This heater uses a set of monolithic ceramic heat-exchange modules formed by sintering a stack of ceramic plates. The heater incorporates the resulting structure and operates at the highest desirable combustion temperature.

Low-Specific-Volume Ceramic Heater: The invention comprises a ceramic, low-specific-volume heater for mobile applications. This heater is a sintered monolithic ceramic structure comprised of a three-plate sequence which is repeated numerous times and characterized as a cloth layer, a working fluid pipe plate layer, a fuel pipe plate layer, a cloth layer, etc, together with a front plate and an aft plate.

Ceramics High Temperatures Elements: The invention comprises a gas cycle engine that can operate at high temperatures without the use of costly metals or costly ceramics. The invention achieves a configuration that uses low-cost ceramic parts for all parts subjected to high temperature by encapsulating them in a pressurized chamber.

High-Performance Regenerator: The invention comprises a high-performance, high-temperature, gas-cycle regenerator with a low-pressure drop. The regenerator uses a large regenerator area, a short regenerator length and monolithic ceramic structure encapsulated in a pressurized structure.

Home Cogeneration System with Ten-Year Maintenance-Free Service Life: The invention comprises an external-combustion, gas-cycle engine that is inexpensive and can achieve a ten-year maintenance-free service life for applications such as home cogeneration electric power unit. A home cogeneration unit makes economic sense only if it is maintenance-free for a long period with the exception of simple maintenance such as an annual air filter change. The invention accomplishes this by using an uncoupled TC without surfaces that wear and a turbo-generator without surfaces that wear. The engine-rejected heat provides space heating and heats water.

Thermal Compressor with a Solar Receiver: The invention comprises a small thermal compressor and solar receiver with a minimum ten-year maintenance-free service life. The invention uses a sun-following parabolic mirror to concentrate solar radiation and deliver it into a solar receiver that acts as a heater for a TC. This TC receives gas from a low-pressure tank, and discharges compressed gas to a high-pressure tank and low-pressure warm gas to heat water.

Coal-Fueled Gas Cycle Engine: The invention comprises a coal-fueled, external-combustion, gas-cycle engine that operates efficiently at rated output and down to a small fraction of rated output. With small modifications, a modern coal-fueled boiler for use with steam power plants converts to a heater for an uncoupled TC electric power system. By varying the pressurization, the TC system can operate as a variable output power plant while maintaining a very high efficiency. Thus, the power plant can operate when peak power is required and reduce its output as demand declines.

Internal-Combustion Gas-Cycle Engine: The invention comprises an internal-combustion, regenerative, gas-cycle engine with high performance, high efficiency and low maintenance. An ICTC gas-turbine engine differs from ECTC engines by using air as the working fluid, using continuous internal combustion in place of a heater, using a compressor to bring high-pressure air into the system and using an expander to extract energy from high-pressure exhaust gases before discharging them into the atmosphere.

Base-Load Central Power Plant: The invention comprises a natural gas, continuous internal-combustion TC (ICTC), central-power, base-load turbo-generator optimized for efficiency, durability and low emissions. The ICTC is ideally suited as a base-load turbo-generator—offering advantages in efficiency, durability, emissions, cost, space and noise.

Low Specific Weight Automobile Engines: The invention comprises a low specific weight internal-combustion, gas-cycle engine with low emissions and significantly higher efficiency than current automobile engines. The engine uses a three-stage, centrifugal compressor and a three-stage, radial-flow, turbine expander.

Gas-Cycle Truck Engine: The invention comprises an internal-combustion, gas-cycle truck engine with low emissions and very high efficiency. The heavy truck engine is similar to the auto engine except that this engine concept stresses maximum efficiency and not cost. In place of a turbine, a helical (Lysholm) type gas motor is used.

Constant Power Gas Turbine: The invention comprises a gas turbine that does not require a transmission to increase low speed torque, can operate as a constant power motor and fully exploit the thermal compressor. The thermal compressor outputs gases at temperatures that are typically below 300° C. and at pressures of 100 atmospheres, which permits small turbines manufactured from low-temperature materials to have a high power output. The constant-power turbine is an innovative device that is especially useful for low-temperature high-pressure systems. This device outputs a constant power over a broad speed range.

Full Function Automotive Drive Turbine: The invention comprises a full function automotive drive turbine including forward, reverse and retard functions and fully exploits the characteristics of the thermal compressor. This unique drive exploits the thermal compressor and incorporates functions required of an automotive drive.

Automotive, Wheel-Mounted, Turbine-Drive: The invention comprises a full-function, automotive, wheel-mounted, turbine-drive system for use with thermal compressors. This wheel hub-mounted drive-motor has many advantages including (1) a larger swivel angle than can be obtained with a constant velocity joint, (2) the elimination of constant velocity joints, (3) more road clearance for off-road vehicles and (4) elimination of differentials without a large increase in complexity, cost and unsprung suspension mass.

7. Alternatives and the Closing

Although the present invention has been described in considerable detail with reference to certain preferred versions thereof, other versions are possible. For example:
 1. a Stirling engine with a decoupled cooler,
 2. a Stirling with decoupled heater, and
 3. a Stirling with decoupled cooler and heater.

Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112. ¶ 6. In particular, the use of "step of" in the claims herein is not intended to invoke the provisions of 35 U.S.C. §112, ¶ 6.

What is claimed is:

1. A constant-power, variable-speed gas turbine assembly wherein the assembly converts a portion of an energy of a high pressure gas into mechanical spinning shaft power, maintains near constant power output over a specified turbine rotational speed range, eliminates a need for a separate transmission and with means for magnetically transferring a torque of a turbine contained in a high pressure turbine housing to a region with a different pressure comprising:
 (a) a gas nozzle for receiving low-velocity, high-pressure gas and discharging high-velocity, low-pressure gas;
 (b) a first turbine blade mounted on a shaft downstream of the nozzle for receiving gas from the nozzle and discharging the gas at a lower velocity thereby generating a first impulse which imparts torque to the shaft;
 (c) a stator mounted in the gas turbine assembly downstream from the first turbine blade for changing the direction of gas flow;
 (d) a second turbine blade mounted on the shaft for receiving the gas flow from the stator when the gas velocity is greater than a velocity of the second turbine blade and reducing the gas velocity thereof generating a second torque producing impulse and thereby maintaining near constant torque on the shaft;
 (e) an internal discharge which receives and discharges gas from the stator when the velocity of the gas is less than the velocity of the second turbine blade;
 (f) a high-pressure turbine housing enclosing the gas turbine assembly;

(g) a nonmagnetic and dielectric window in the high pressure turbine housing;
(h) means attached to spinning elements of the turbine for inducing a magnetic field positioned in close proximity to the nonmagnetic and dielectric window; and
(i) means for coupling a magnet field attached to a turbine spinning magnet to a shaft which is external to the high-pressure containment turbine structure.

2. A gas turbine according to claim 1, including means to maintain a near uniform torque output while the intake pressure at a turbine nozzle is fluctuating and further comprising:
(a) means to vary the gas flow rate at the turbine nozzle;
(b) a pressure gauge that measures the pressure upstream of the turbine nozzle; and
(c) a nozzle controller that modulates the nozzle flow.

3. A gas turbine assembly according to claim 2, further comprising:
(a) a planetary reduction gear attached to a turbine output; and
(b) a disk brake system attached to the turbine output thereby enabling the turbine assembly to be utilized in a vehicle-wheel-mountable device.

* * * * *